United States Patent
Naranjo-Briceño et al.

(10) Patent No.: US 12,467,171 B2
(45) Date of Patent: Nov. 11, 2025

(54) LARGE-SCALE PRODUCTION OF MYCELIUM-BASED TEXTILES AT MUSHROOM FARM FACILITIES

(71) Applicant: Spora Cayman Holdings Limited, O'Higgins Region (CL)

(72) Inventors: Leopoldo Naranjo-Briceño, O'Higgins Region (CL); Keyla M. Fuentes, O'Higgins Region (CL); Diego Valdes-Puga, O'Higgins Region (CL); Carlos Gil-Durán, O'Higgins Region (CL); Maximiliano Venegas, O'Higgins Region (CL); Melissa Gómez, O'Higgins Region (CL); Rodrigo Vera, O'Higgins Region (CL); Stalin Bermúdez-Puga, O'Higgins Region (CL); Hernán Rebolledo De Lima, O'Higgins Region (CL); José Miguel Figueroa, O'Higgins Region (CL); Pablo Zamora, O'Higgins Region (CL)

(73) Assignee: Spora Cayman Holdings Limited, Vitacura (CL)

( * ) Notice: Subject to any disclaimer, the term of this patent is extended or adjusted under 35 U.S.C. 154(b) by 0 days.

(21) Appl. No.: 18/595,392

(22) Filed: Mar. 4, 2024

(65) Prior Publication Data
US 2025/0122653 A1  Apr. 17, 2025

Related U.S. Application Data

(60) Provisional application No. 63/590,397, filed on Oct. 13, 2023.

(51) Int. Cl.
| | | |
|---|---|---|
| *A01G 18/00* | (2018.01) | |
| *C12N 1/14* | (2006.01) | |
| *D04H 1/4266* | (2012.01) | |
| *D06M 11/49* | (2006.01) | |
| *D06M 15/05* | (2006.01) | |
| *D06M 15/15* | (2006.01) | |
| *C12R 1/645* | (2006.01) | |
| *D06M 101/06* | (2006.01) | |

(52) U.S. Cl.
CPC ............. *D04H 1/4266* (2013.01); *C12N 1/14* (2013.01); *D06M 11/49* (2013.01); *D06M 15/05* (2013.01); *D06M 15/15* (2013.01); *C12R 2001/645* (2021.05); *D06M 2101/06* (2013.01); *D06M 2400/01* (2013.01)

(58) Field of Classification Search
CPC ....... D04H 1/4266; C12N 1/14; D06M 11/49; D06M 15/05; D06M 15/15; D06M 2101/06; D06M 2400/01; C12R 2001/645; A01G 18/00; A01G 18/60
See application file for complete search history.

(56) References Cited

U.S. PATENT DOCUMENTS

| | | |
|---|---|---|
| 4,125,708 A | 11/1978 | Masri et al. |
| 5,486,474 A | 1/1996 | Bradley et al. |
| 5,583,041 A | 12/1996 | Bradley et al. |
| 5,939,065 A | 8/1999 | Bradley et al. |
| 8,227,224 B2 | 7/2012 | Kalisz et al. |
| 8,227,225 B2 | 7/2012 | Rocco et al. |
| 8,227,233 B2 | 7/2012 | Kalisz et al. |
| 8,283,153 B2 | 10/2012 | Rocco et al. |
| 8,298,809 B2 | 10/2012 | Kalisz et al. |
| 8,298,810 B2 | 10/2012 | Rocco et al. |
| 9,447,477 B2 | 9/2016 | Gamarino et al. |
| 9,485,917 B2 | 11/2016 | Bayer et al. |
| 9,555,395 B2 | 1/2017 | Araldi et al. |
| 9,714,180 B2 | 7/2017 | McIntyre et al. |
| 10,537,070 B2 | 1/2020 | Betts et al. |
| 10,561,587 B2 | 2/2020 | Koide et al. |
| 10,687,482 B2 | 6/2020 | Ross et al. |
| 11,015,059 B2 | 5/2021 | Smith et al. |
| 11,135,287 B2 | 10/2021 | Brito et al. |
| 11,331,305 B2 | 5/2022 | Dreher |
| 2009/0307969 A1 | 12/2009 | Bayer et al. |

(Continued)

FOREIGN PATENT DOCUMENTS

| | | |
|---|---|---|
| AU | 212399 A | 5/1999 |
| AU | 2013251269 B2 | 10/2015 |

(Continued)

OTHER PUBLICATIONS

Cruz-Luna, A. et al. Engineered Metal Oxide Nanoparticles as Fungicides for Plant Disease Control, Jun. 27, 2023, Plants, 12(2461): 1-16 (Year: 2023).*

Deeg et al.; Greener Solutions: Improving performance of mycelium-based leather; Final Report to MycoWorks; pp. 1-54; 2017.

Genbank JN164989.1; Trametes cubensis voucher CRM90 18S ribosomal RNA gene, partial sequence; internal transcribed spacer 1, 5.8S ribosomal RNA gene, and internal transcribed spacer 2, complete sequence; and 28S ribosomal RNA gene, partial sequence; 1 page; retrived from the internet ( https://www.ncbi.nlm.nih.gov/nuccore/JN164989.1) on May 22, 2023.

(Continued)

*Primary Examiner* — Satyendra K Singh
(74) *Attorney, Agent, or Firm* — Shay Glenn LLP

(57) ABSTRACT

Methods and apparatuses, including systems, for forming mycelium fabrics, manufacturing and/or production in large-scale mushroom farm facilities (e.g., commercial scale under an agroecological approach). These methods and apparatuses may allow the scaling-up of manufacturing of mycotextiles in a manner that is both cost-effective and respectful of the environment, including minimizing the production of harmful byproducts. These methods and apparatuses include adding a stabilized formulation containing growth inducers and functionalized nanoparticles to allow both fungal mycelium growth and in situ and in vivo nanocrosslinking.

20 Claims, 50 Drawing Sheets

(56) References Cited

U.S. PATENT DOCUMENTS

| | | |
|---|---|---|
| 2010/0218878 A1 | 9/2010 | Wang et al. |
| 2011/0306107 A1 | 12/2011 | Kalisz et al. |
| 2012/0135504 A1 | 5/2012 | Ross |
| 2012/0227899 A1 | 9/2012 | McIntyre et al. |
| 2013/0263500 A1 | 10/2013 | McIntyre et al. |
| 2014/0097008 A1 | 4/2014 | Bayer et al. |
| 2014/0120602 A1 | 5/2014 | Winiski et al. |
| 2015/0247115 A1 | 9/2015 | Bayer et al. |
| 2015/0293076 A1 | 10/2015 | Widmaier et al. |
| 2015/0376565 A1 | 12/2015 | Schaak et al. |
| 2016/0002589 A1 | 1/2016 | Winiski |
| 2016/0264926 A1 | 9/2016 | Winiski et al. |
| 2016/0302364 A1 | 10/2016 | Lucht et al. |
| 2017/0253852 A1 | 9/2017 | Bayer et al. |
| 2018/0216260 A1 | 8/2018 | Breslauer et al. |
| 2018/0282381 A1 | 10/2018 | Kittleson et al. |
| 2018/0282937 A1 | 10/2018 | Bainbridge et al. |
| 2019/0169242 A1 | 6/2019 | Boulet-Audet et al. |
| 2019/0338240 A1 | 11/2019 | Carlton et al. |
| 2019/0359931 A1 | 11/2019 | Mueller et al. |
| 2019/0389916 A1 | 12/2019 | Rice et al. |
| 2019/0390156 A1 | 12/2019 | Bayer et al. |
| 2020/0022451 A1 | 1/2020 | Smith et al. |
| 2020/0024577 A1 | 1/2020 | Carlton et al. |
| 2020/0025672 A1 | 1/2020 | Scullin et al. |
| 2020/0032434 A1 | 1/2020 | Resneck et al. |
| 2020/0102429 A1 | 4/2020 | Smith et al. |
| 2020/0131694 A1 | 4/2020 | Scullin et al. |
| 2020/0196541 A1 | 6/2020 | Ross et al. |
| 2020/0239830 A1 | 7/2020 | O'Brien et al. |
| 2020/0268031 A1 | 8/2020 | Macur et al. |
| 2020/0283750 A1 | 9/2020 | Gamboa et al. |
| 2020/0330378 A1 | 10/2020 | Friedman |
| 2020/0362295 A1 | 11/2020 | Kozubal et al. |
| 2020/0399328 A1 | 12/2020 | Breslauer et al. |
| 2020/0399824 A1 | 12/2020 | Stewart et al. |
| 2021/0059287 A1 | 3/2021 | Kozubal et al. |
| 2021/0171896 A1 | 6/2021 | Harney et al. |
| 2021/0177754 A1 | 6/2021 | Keller et al. |
| 2021/0317433 A9 | 10/2021 | Schaak |
| 2021/0388558 A1 | 12/2021 | Stewart et al. |
| 2022/0073865 A1* | 3/2022 | Attias ................. C08L 1/04 |
| 2023/0014203 A1 | 1/2023 | Kozubal et al. |
| 2023/0265606 A1* | 8/2023 | Picaut ................ C08L 99/00 427/392 |
| 2023/0356501 A1 | 11/2023 | Naranjo-Briceno et al. |
| 2024/0269962 A1 | 8/2024 | Naranjo-Briceño et al. |

FOREIGN PATENT DOCUMENTS

| | | | | |
|---|---|---|---|---|
| AU | 2019201553 A1 | 3/2019 | | |
| AU | 2019219768 A1 | 9/2019 | | |
| AU | 2020201013 A1 | 9/2020 | | |
| BR | 102013028238 B1 | 3/2021 | | |
| CN | 103171823 A | 6/2013 | | |
| CN | 108503858 A | 9/2018 | | |
| CN | 113166709 A * | 7/2021 | ............. | C12N 1/14 |
| IN | 201921004709 A | 5/2019 | | |
| JP | 2006124267 A | 5/2006 | | |
| JP | 5131676 B2 | 1/2013 | | |
| KR | 20150014560 A | 2/2015 | | |
| WO | WO92/13960 A1 | 8/1992 | | |
| WO | WO-9300793 A1 * | 1/1993 | ............. | A01G 18/70 |
| WO | WO95/010597 A1 | 4/1995 | | |
| WO | WO97/023416 A1 | 7/1997 | | |
| WO | WO2008/118543 A2 | 10/2008 | | |
| WO | WO2010/005476 A1 | 1/2010 | | |
| WO | WO2012/148995 A1 | 11/2012 | | |
| WO | WO2014/031810 A2 | 2/2014 | | |
| WO | WO2015/042164 A2 | 3/2015 | | |
| WO | WO2016/073453 A1 | 5/2016 | | |
| WO | WO2016/168563 A1 | 10/2016 | | |
| WO | WO2017093759 A1 | 6/2017 | | |
| WO | WO2018/014004 A1 | 1/2018 | | |
| WO | WO2018/053204 A1 | 3/2018 | | |
| WO | WO-2018037072 A1 * | 3/2018 | ............... | C09C 1/30 |
| WO | WO2018/132821 A2 | 7/2018 | | |
| WO | WO2018183735 A1 | 10/2018 | | |
| WO | WO2019/046480 A1 | 3/2019 | | |
| WO | WO2019/060921 A1 | 3/2019 | | |
| WO | WO2019/099474 A1 | 5/2019 | | |
| WO | WO2019/178406 A1 | 9/2019 | | |
| WO | WO2019/222633 A1 | 11/2019 | | |
| WO | WO2019/226823 A1 | 11/2019 | | |
| WO | WO2020/006133 A1 | 1/2020 | | |
| WO | WO2020/033970 A2 | 2/2020 | | |
| WO | WO2020/072140 A1 | 4/2020 | | |
| WO | WO2020/086907 A1 | 4/2020 | | |
| WO | WO2020/087033 A1 | 4/2020 | | |
| WO | WO2020/102552 A1 | 5/2020 | | |
| WO | WO2020/106743 A1 | 5/2020 | | |
| WO | WO2020/112742 A1 | 6/2020 | | |
| WO | WO2020/115690 A1 | 6/2020 | | |
| WO | WO2020/176758 A1 | 9/2020 | | |
| WO | WO2020/186068 A1 | 9/2020 | | |
| WO | WO2020/237201 A1 | 11/2020 | | |
| WO | WO2020/243431 A1 | 12/2020 | | |
| WO | WO2021/011431 A1 | 1/2021 | | |
| WO | WO2021/035184 A1 | 2/2021 | | |
| WO | WO2021/055440 A1 | 3/2021 | | |
| WO | WO2021/092051 A1 | 5/2021 | | |
| WO | WO2021/124164 A1 | 6/2021 | | |
| WO | WO2021/136883 A1 | 7/2021 | | |
| WO | WO2023/172999 A2 | 9/2023 | | |
| WO | WO2023/199285 A2 | 10/2023 | | |

OTHER PUBLICATIONS

Genbank JX416577.1; Basidiomycota sp. FPF38a internal trascribed spacer 1, partial sequence; 5.8S ribosomal RNA gene, complete sequence; and internal transcribed spacer 2, partial sequence; 2 pages; retrieved from the internet (https://www.ncbi.nlm.nih.gov/nuccore/JX416577.1) on May 22, 2023.

Genbank KX515895.1, Uncultured fungus cione ZMTDH201308-27 small subunit ribosomal RNA gene, partial sequence; internal transcribed spacer 1, 5.8S ribosomal RNA gene, and internal transcribed spacer 2, complete sequence; and large subunit ribosomal RNA gene, partial sequence; 1 page; retrieved from the internet (https://www.ncbi.nim.nih.gov/nuccore/1121643866) on May 22, 2023.

Nam et al.; Role of phosphate-modified mesoporous silica nanoparticles for altering biomimetic metal-induced aggregation process of pluronic F127 block copolymer, Materials Letters; vol. 110, pp. 176-179, Aug. 13, 2013.

Sojka-Ledakowicz et al.; Functionalization of textile materials by alkoxysilane-grafted titanium dioxide; Journal of materials science; vol. 44, pp. 3852-3860; May 15, 2009.

Wijayarathna et al.; Fungal textile alternatives from bread waste with leather-like properties; Resources, Conservation and Recycling: 179:106041; Apr. 1, 2022.

Elsacker et al.; Recent technological innovations in mycelium materials as leather substitutes: a patent review, Frontiers in Bioengineering and Biotechnology; 11:1204861; 12 pages; Aug. 7, 2023.

Naranjo-Briceño et al.; U.S. Appl. No. 18/811,742 entitled "Nanoemulsions for internal humectation of mycelium-based textiles," filed Aug. 21, 2024.

* cited by examiner

FIG. 1B

| Nomenclature Spora Biotech's Culture Collection | GenBank Database | | | | | | UNITE Community Database | | | Molecular Identification |
|---|---|---|---|---|---|---|---|---|---|---|
| | E value | Coverage (%) | Id (%) | Taxa matched GenBank Accession Number | Score (Bits) | Taxa matched GenBank Accession Number | Score (Bits) | Taxa matched UNITE Species Hypothesis code | | |
| 1 | SCC-0006 | 0 | 100 | 100 | Cuturomyces nusitesi strain CBM-BRFM-1781 OL885332.1 | 1070 | Lelotrametes menziesii BRFM 1369 JN645103.1 | 992.6 | Trametes juberisis SH1231367.0 9FU | Unclassified Polyporaceae SCC-0006 |
| 2 | SCC-0050 | 2E-142 | 90.97 | 85.4 | Ganoderma australe isolate DWZH01 MW385596.1 | 232 | Ganoderma applanatum complex MLQLAG40b AF255135.1 | 696.9 | Ganoderma applanatum SH1146739.0 9FU | Ganoderma sp. SCC-0050 |
| 3 | SCC-0052 | 0 | 100 | 99.6 | Ganoderma tornatum voucher TH501AMY009 KX434108.1 | 1053 | Ganoderma applanatum complex MLQLAG40b AF255135.1 | 851.4 | Ganoderma applanatum SH1146739.0 9FU | Ganoderma tornatum SCC-0052 |
| 4 | SCC-0053 | 0 | 100 | 99.8 | Ganoderma cf. sessile voucher Mushroom Observer 326665 MT324215 | 993 | Ganoderma sessile isolate IV 0109/TM KF605640.1 | 885.7 | Ganoderma resinaceum UDB076724 9FU | Ganoderma resinaceum SCC-0053 |
| 5 | SCC-0054 | 0 | 100 | 99.2 | Fomitopsis bieticolo B1C 01147/ NR_176124.1 | 1033 | Fomitopsis pinicola MR-03-036 AFTOL-ID 7 AY954063.1 | 925.2 | Fomitopsis pinicola SH1172211.0 9FU | Fomitopsis abieticola SCC-0054 |
| 6 | SCC-0055 | 0 | 100 | 100 | Trametes polyzona isolate 605177H1 MZ100XG0 | 950 | Coriolopsis polyzona voucher JJ819468 EF672435.1 | 736.4 | Trametes hirsuta SH1122461.0 9FU | Trametes polyzona SCC-0055 |
| 7 | SCC-0056 | 0 | 100 | 99.81 | Trametes villosa isolate FP-86553-Sp OG639605.1 | 1019 | Trametes villosa voucher FP169745 JN164969.1 | 863.4 | Trametes hirsuta SH1122467.0 9FU | Trametes villosa SCC-0056 |
| 8 | SCC-0058 | 0 | 100 | 100 | Bjerkandera adusta isolate 58_145 OR065979 | 993 | Bjerkandera adusta vH7 (AB096737.1) | 901.2 | Bjerkandera adusta SH1173901.0 9FU | Bjerkandera adusta SCC-0058 |
| 9 | SCC-0059 | 0 | 100 | 100 | Bjerkandera adusta isolate 94_702 OR065932 | 993 | Bjerkandera adusta vH7 (AB096737.1) | 885.7 | Bjerkandera adusta SH1173901.0 9FU | Bjerkandera adusta SCC-0059 |

FIG. 1C1

| # | SCC ID | | | | Match 1 | Score 1 | Match 2 | Score 2 | Match 3 | Name |
|---|---|---|---|---|---|---|---|---|---|---|
| 10 | SCC-0062 | 0 | 100 | 100 | Ganoderma australe strain M.L. Boucher KGMX07 (MK271269) | 1001 | Ganoderma australe complex PKB94/065 (AF255160.1) | 813.6 | Ganoderma australe SH1249139.0 (sf1) | Ganoderma australe SCC-0062 |
| 11 | SCC-0065 | 0 | 100 | 99.6 | Ganoderma australe strain NLB 1548 Boucher NLB 1548 (MT371112) | 1007 | Ganoderma australe complex PKB94/065 (AF255160.1) | 811.9 | Ganoderma australe SH1249139.0 (sf1) | Ganoderma australe SCC-0065 |
| 12 | SCC-0066 | 0 | 100 | 99.6 | Ganoderma australe strain NLB 1548 Boucher NLB 1548 (MT371112) | 1007 | Ganoderma australe complex PKB94/065 (AF255160.1) | 811.9 | Ganoderma australe SH1249139.0 (sf1) | Ganoderma australe SCC-0066 |
| 13 | SCC-0067 | 0 | 100 | 99.6 | Ganoderma australe strain NLB 1548 Boucher NLB 1548 (MT371112) | 995 | Ganoderma australe complex PKB94/065 (AF255160.1) | 801.6 | Ganoderma australe SH1249139.0 (sf1) | Ganoderma australe SCC-0067 |
| 14 | SCC-0068 | 0 | 100 | 99.45 | Ganoderma australe strain NLB 1548 Boucher NLB 1548 (MT371112) | 989 | Ganoderma australe complex PKB94/065 (AF255160.1) | 798.2 | Ganoderma australe SH1249139.0 (sf1) | Ganoderma australe SCC-0068 |
| 15 | SCC-0070 | 0 | 100 | 100 | Stereum hirsutum strain L.L.4BN.4794 CPSC(0.11) | 954 | Saravakis kyadudidea isolate GO.1.1.01.B.1 KC180755.1 | 920 | Stereum hirsutum BG935.27.0 (sf1) | Stereum hirsutum SCC-0070 |
| 16 | SCC-0076 | 0 | 100 | 99.6 | Ganoderma australe strain NLB 1548 Boucher NLB 1548 (MT371112) | 1007 | Ganoderma australe complex PKB94/065 (AF255160.1) | 811.9 | Ganoderma australe SH1249139.0 (sf1) | Ganoderma australe SCC-0076 |
| 17 | SCC-0077 | 0 | 100 | 100 | Trametes versicolor isolate SIY-2 (HN151195) | 1005 | Trametes versicolor isolate A109 JN164906.1 | 885.7 | Trametes versicolor BG935.27.0 (sf1) | Trametes versicolor SCC-0077 |
| 18 | SCC-0078 | 0 | 100 | 99.5 | Ganoderma australe strain KGMX07 (MK271269) | 977 | Ganoderma australe complex PKB94/065 (AF255160.1) | 798.2 | Ganoderma australe SH1249139.0 (sf1) | Ganoderma australe SCC-0078 |
| 19 | SCC-0079 | 0 | 100 | 99.5 | Ganoderma australe strain NLB 1548 Boucher NLB 1548 (MT371112) | 1007 | Ganoderma australe complex PKB94/065 (AF255160.1) | 811.9 | Ganoderma australe SH1249139.0 (sf1) | Ganoderma australe SCC-0079 |
| 20 | SCC-0080 | 0 | 100 | 100 | Ganoderma strain KGMX07 (MK722289) | 1001 | Ganoderma australe complex PKB94/065 (AF255160.1) | 813.6 | Ganoderma australe SH1249139.0 (sf1) | Ganoderma australe SCC-0080 |

FIG. 1C2

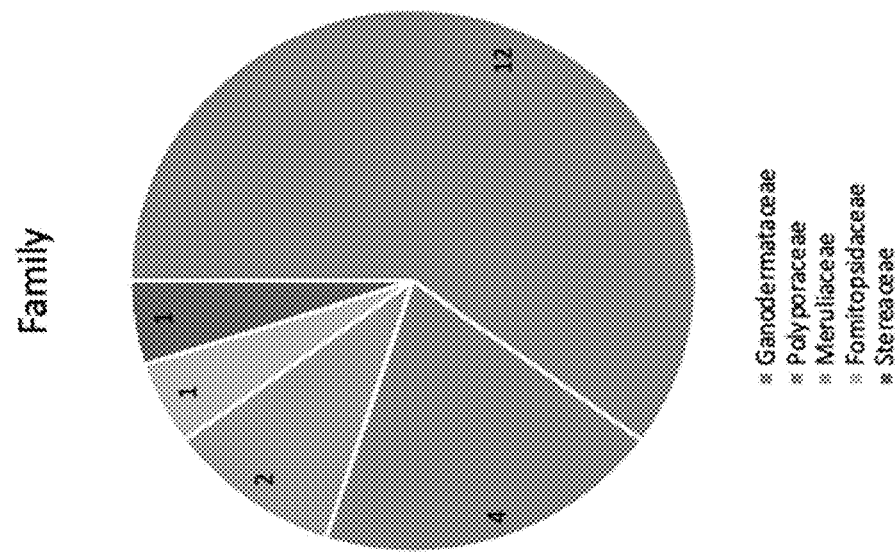
FIG. 2A3
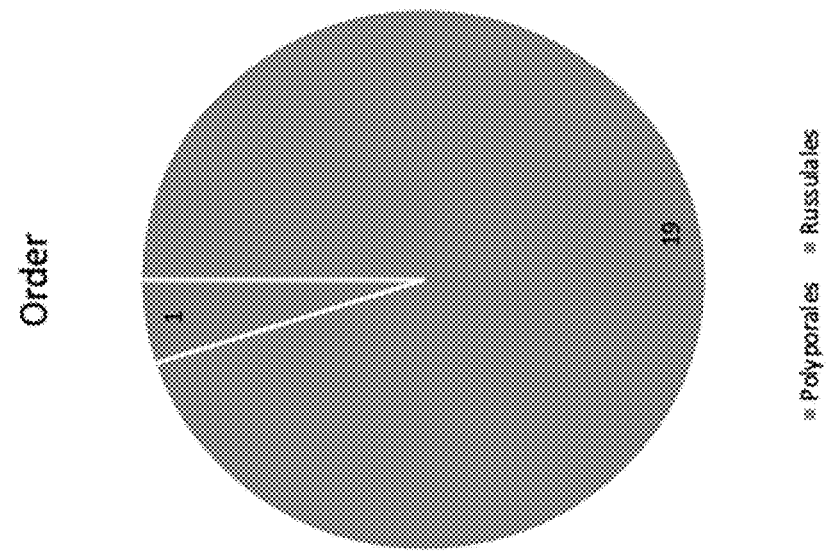
FIG. 2A2
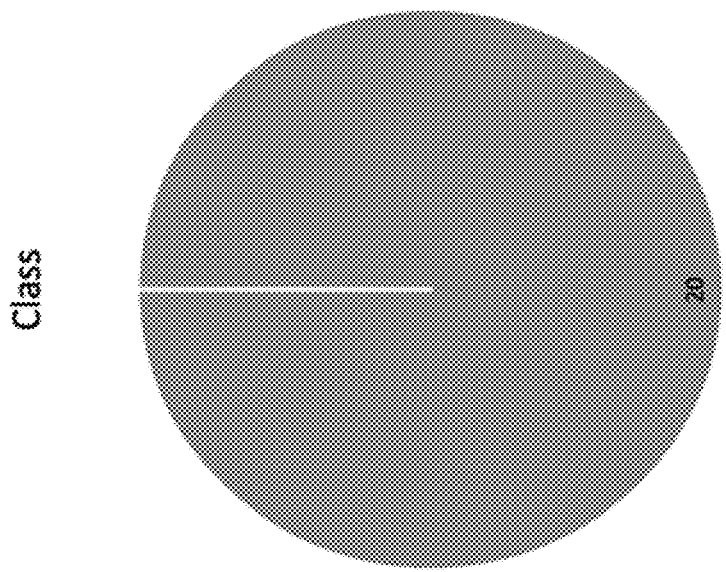
FIG. 2A1

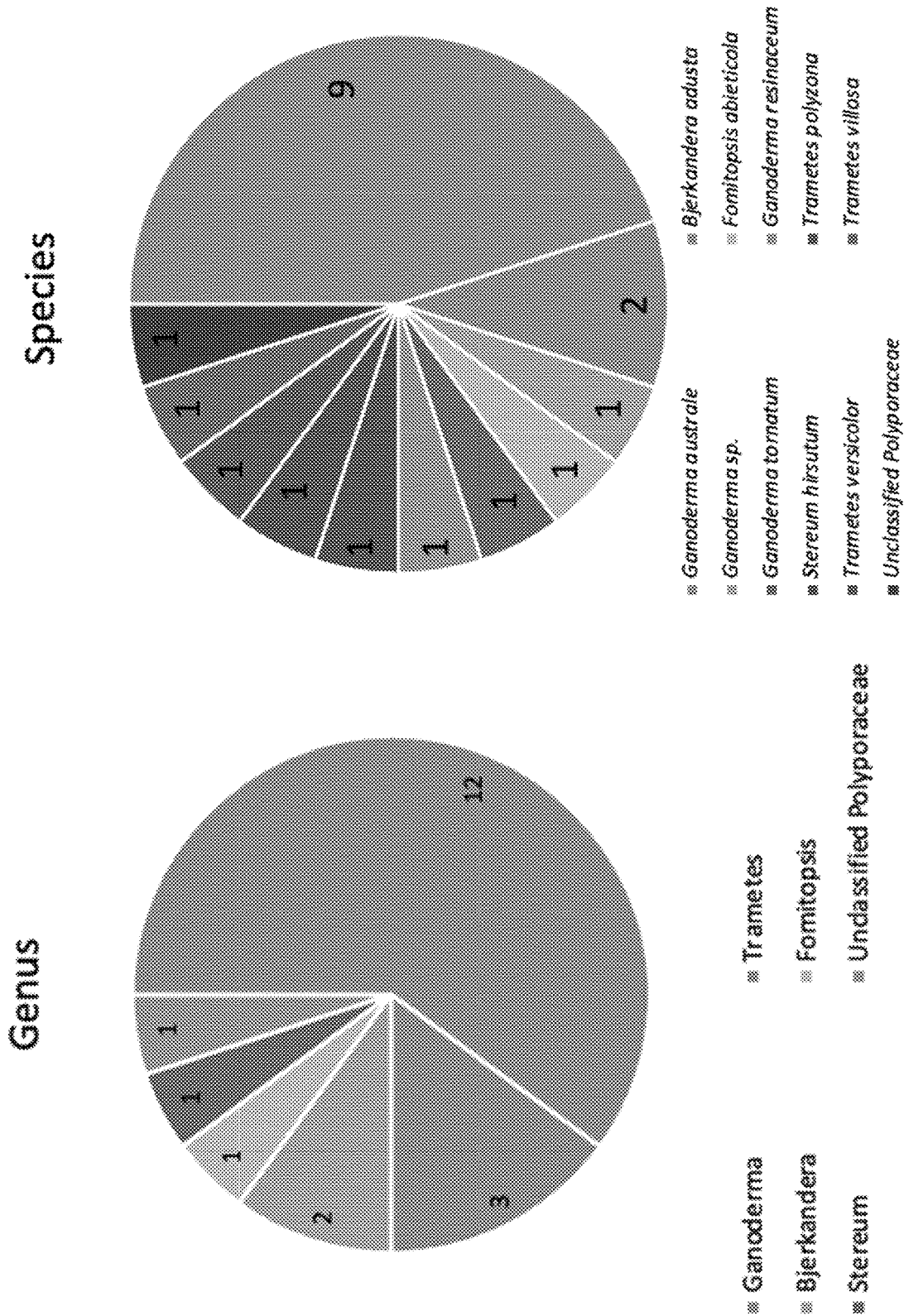
FIG. 2B1
FIG. 2B2

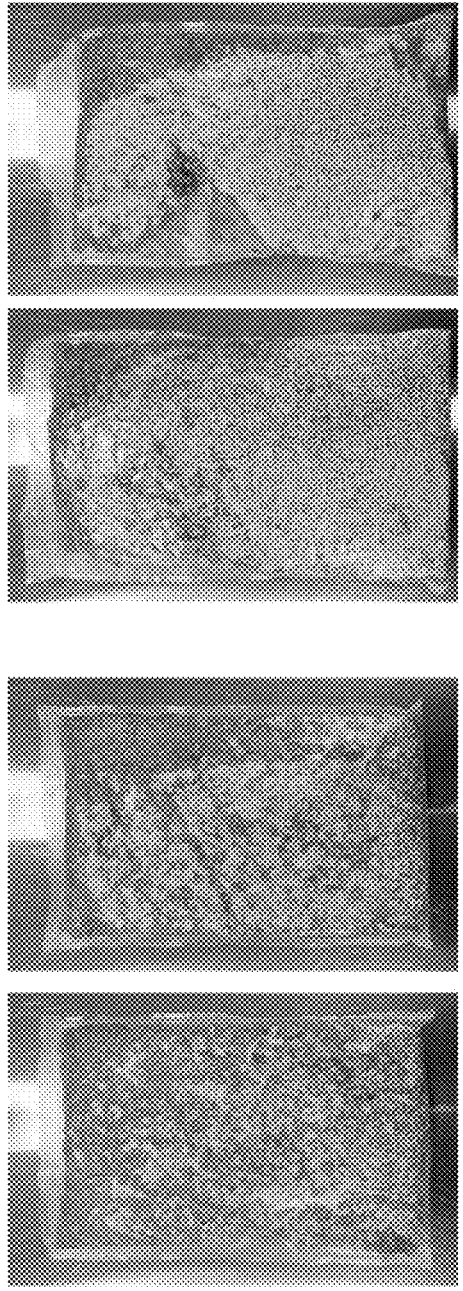
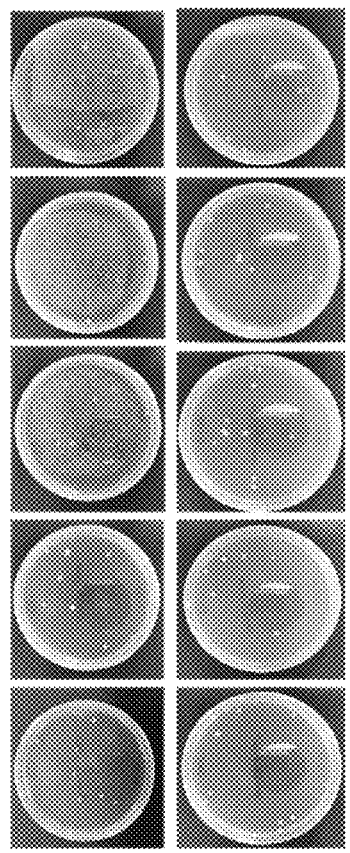

50 seeds were sown on SB Agar and LB Agar culture medium and incubated at 25 °C and 30-37 °C, respectively, to detect fungal or bacterial contamination (*Bacillus* spp. or Coliforms strains)

Parameters of Quality Control:
37,3 % Final Humidity in grains
5,82 pH
Microbiology control at 7, 15 and 21 days

Plate contamination incidence: 0%
Bag contamination incidence: 0%
Reproducibility: 100%
Higher humidity of grains: from 28.15 to 37,3 %
Days needed for treatment: 1 1/2 days Fungi: SB Agar (7 days of incubation)
Bacteria: LB Agar (7 days of incubation)

FIG. 5B

Viability of the grains was assessed by seeding by triplicate 100 grains on PDA Petri dishes and calculating the viability percentage (%) based on seed germination after 72 hours of incubation at 28-30°C in darkness

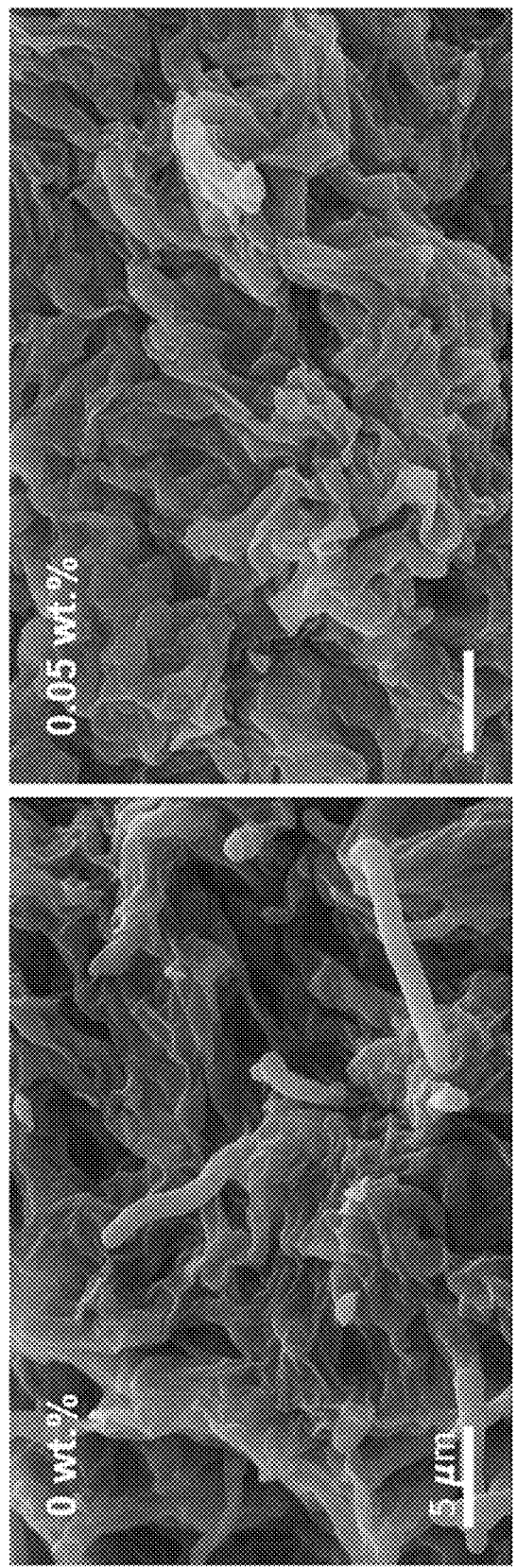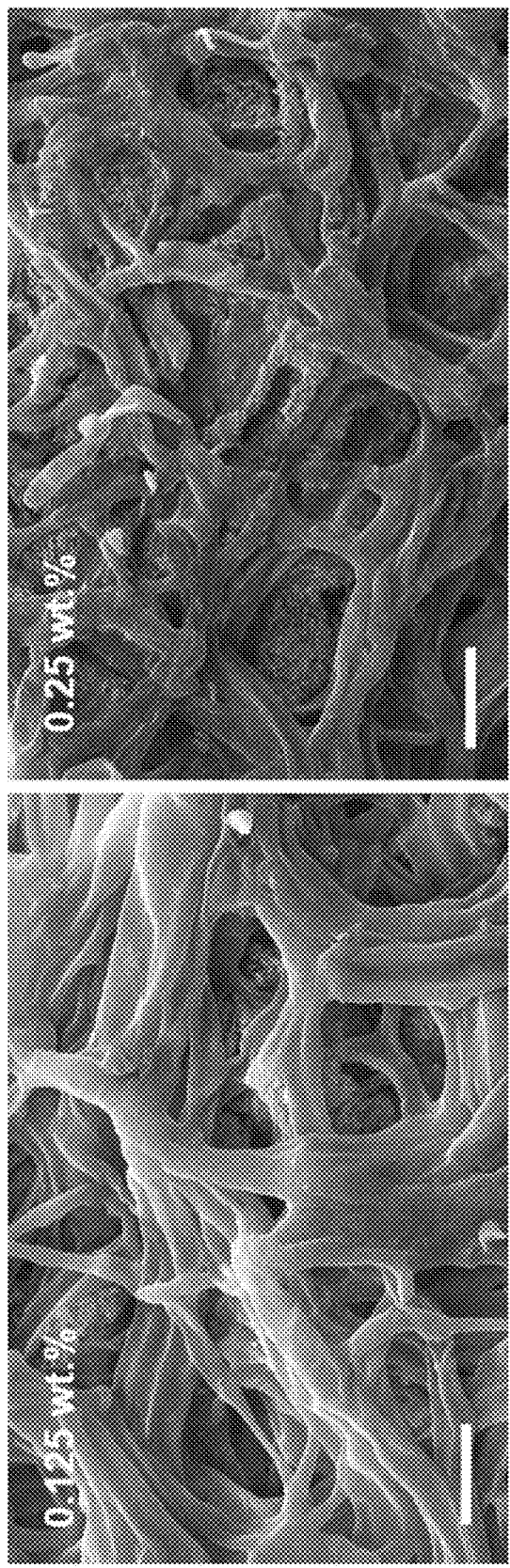
FIG. 16

Mixed with
the medium
nC-1
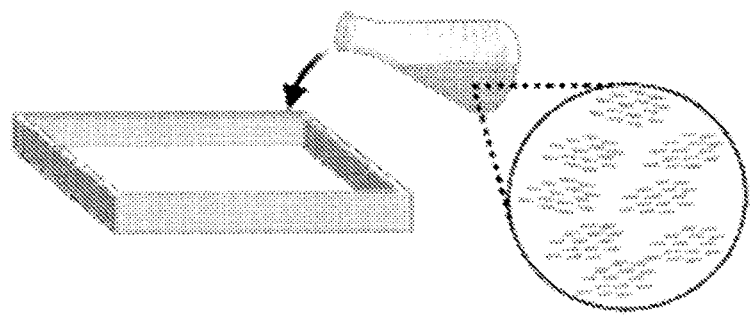
Sprayed
Scaffold
nC-2
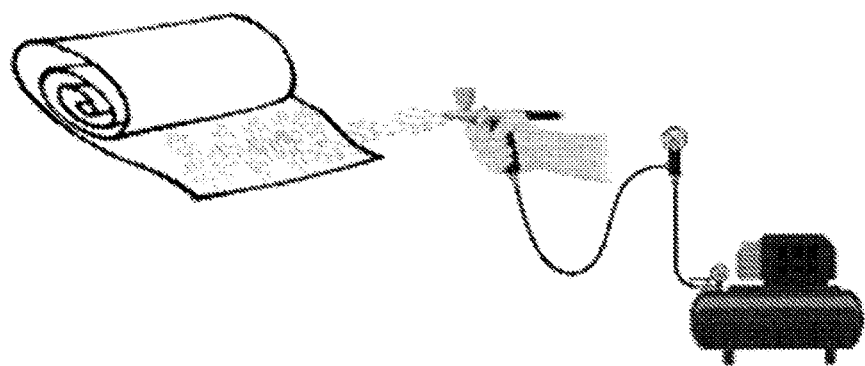
Sprayed
mycelium
nC-3
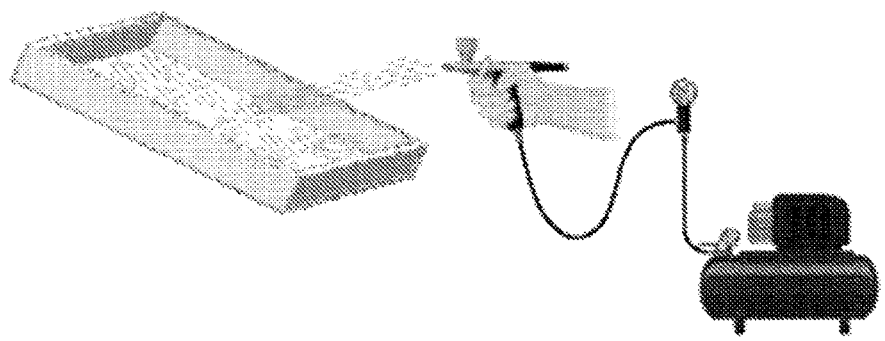
FIG. 26

LARGE-SCALE PRODUCTION OF MYCELIUM-BASED TEXTILES AT MUSHROOM FARM FACILITIES

CLAIM OF PRIORITY

This patent application claims priority to U.S. Provisional Patent Application No. 63/590,397, titled "PRODUCTION OF MYCELIUM-BASED TEXTILES," filed on Oct. 13, 2023, and herein incorporated by reference in its entirety.

REFERENCE TO A DEPOSIT OF BIOLOGICAL MATERIAL

This application contains a reference to a deposit of biological material. Specifically SCC-0006, a *Cubamyces menziesii* strain was deposited on Nov. 13, 2024, under the access code RGM 3672, under the terms of the Budapest Treaty on the International Recognition of the Deposit of Microorganisms for the Purposes of Patent Procedure at the Chilean Collection of Microbial Genetic Resources (CChRGM), Avenida Vicente Mendez 515, Chillan, Chile.

BACKGROUND

One effective strategy for combating climate change involves replacing commodities or products that are significant contributors to environmental pollution in both their production and consumption with environmentally friendly alternatives that respect nature. Currently, the textile industry stands out as a major environmental offender. Therefore, it is imperative to develop the next generation of biomaterials, ensuring they adhere to the principles of a sustainable economy across the entire value chain. Among potential alternatives, the utilization of fungal mycelium for textile production holds promise as a valuable and cost-effective solution. However, scaling such alternatives has proven to be exceptionally challenging.

Scaling up mycelium fabric production requires careful consideration of numerous parameters to add value to products and processes throughout the entire value chain. This endeavor necessitates the integration of various disciplines, including biotechnology, nanotechnology, microbiology, materials science and engineering, process engineering, green chemistry, synthetic biology, and genome editing, among others.

The strategic convergence of the longstanding edible mushroom industry with the emerging biotextile industry, based on mycelium technology, holds the potential to facilitate the industrial scaling-up of this new, cultivable, and sustainable material.

SUMMARY OF THE DISCLOSURE

Described herein are methods and apparatuses, including systems, for forming mycotextiles. In particular, described herein are methods and apparatuses for forming mycotextiles that are adapted or configured for large-scale manufacture and/or production (e.g., commercial scale under an agroecological approach). In practice, it has proven difficult to scale the manufacture of previously described mycotextiles. In particular, it has proven difficult to scale the manufacturing of mycotextiles in a manner that is both cost-effective and respectful of the environment, including minimizing the production of harmful byproducts.

In general, these methods may be incorporated or used by any of the mycotextiles, and methods described in U.S. Publication No. US 2023/0356501 A1, and corresponding International Patent Application PCT/IB2023/053847 and European Patent Application No. 23168316.0 (the three entitled "MYCOTEXTILES INCLUDING ACTIVATED SCAFFOLDS AND NANO-PARTICLE CROSS-LINKERS AND METHODS OF MAKING THEM,") filed on Apr. 14, 2023, each of which is herein incorporated by reference in its entirety. This application described an "end to end" process to produce mycelium-based textiles, indicating its main stages as follows: 1) Pre-Fermentation, 2) Fermentation, and 3) Post-fermentation. However, adjusting the Fermentation stage (2) of the process may be useful to converge in the intersection with mushroom farm facilities. A method using a foam fabrication that may be used to scale-up the fungal-derived textile production using a hybrid fermentation substrate (HFS), referred to as BIOrganic foam, was described. In this case, the transition to mushroom farm facilities may use solid-state fermentation substrates (SSFS). In some cases, however, may be particularly helpful to include several modifications focused on the mycelium growth on a new and innovative scaffold (e.g., a scaffolding that is both nutritionally selective by the fungi and includes nanobiocide properties to fight against environmental contamination) instead of on the fruit bodies or basidioma production (as in current commercial edible mushroom production). The method and apparatuses described herein may provide these improvements, including an improved harvesting process.

Although the methods and apparatuses described herein may be used with a variety of mushroom strains, which may be individually used, or may be combined with each other, as is shown in Table 1, describe below, and/or any of the fungal strains previously reported, e.g., in the U.S. Publication No. US 2023/0356501 A1, incorporated by reference above. These strains may be particularly useful with the strain referred to herein as the "Gold Standard SCC-0006 strain" (previously referred to as Unclassified Polyporaceae strain SCC-0006, e.g., in U.S. Publication No. US 2023/0356501 A1, or simply as SCC-0006, for convenience). Described herein are methods and compositions that use fungi from the Polyporaceae family (e.g., such as the unique working strains described herein) that may offer better results than fungal species from the Ganodermataceae family, some of which have been previously used in generating mycotextiles. As described herein, the use Polyporaceae family strains may provide high-quality and high-performance final products.

The transition to mushroom farm facilities may include the adjustment of the ex-situ nano-crosslinking strategy as described in the U.S. Publication No. US 2023/0356501 A1 patent application, including cross-linking of the incorporated nanoparticles which may take place once the mycotextiles have been harvested (e.g., in the post-fermentation stage), and/or during the fermentation stage while the mycelium is growing within and on the scaffold. The nano-crosslinking of biomaterials may dramatically enhance the stability and mechanical properties of the fungal-derived textiles, including the tensile strength and modulus, as well as the tear strength, abrasion resistance and elongation. The functionalized nanoparticles to promote nano-crosslinking may be added to the material by automated spraying (atomization) during the fermentation stage, when the mycelium is growing concomitant with the self-generation of mycotextiles by the fungus, which may be referred to as an "in situ nano-crosslinking strategy." This in situ strategy may be considered an environmentally friendly nano-crosslinking scheme that saves a high volume of water and functionalized products, reducing production costs and waste effluents generated in the post-treatment stage mycotextiles process and simplifying the operational logistics.

Described herein generally are sustainable methods and apparatuses for industrial production of mycelium-based textiles at mushroom farm facilities that are supported by the use of helpful and cost-effective features that may include (but are not limited to): (i) the use of an eco-friendly cellulosic paper (e.g., biodegradable), which may equalize the mycelium colonization on the scaffold, preserving adequate moisture in the substrate, and facilitate the harvesting process, (ii) the use of a selective and nanobiocide scaffolds to induce a high density and homogeneity of mycelial colonization and to mitigate environmental contamination, (iii) the application of an in situ nano-crosslinking scheme while the material is self-generated (growing) by the fungus, (iv) the placing of a cover (e.g., foil) around the shelves to regulate moisture conditions and the oxygen and carbon dioxide gas concentrations, and (v) a useful mycotextiles industrial harvest system established in the growing room to ensure gentle and efficient extraction of the long mycotextiles mats. Any of these may be strategically implemented in the Fermentation stage (stage 2) of the bioprocess (e.g., in a mushroom farm facility).

For example described herein are methods of forming a mycotextile at an industrial scale, the method comprising: generating a substrate seeded with a selected fungal strain; placing a solid-state fermentation substrate on a shelf; placing a sheet of cellulosic paper over the solid-state fermentation substrate; placing a nutritionally-enriched and nanobiocidal scaffold onto the sheet of cellulosic paper; growing the selected fungal strain into the scaffold to form a mycelium mat; adding functionalized nanoparticles on the growing mycelium mat; placing a cover over the growing mycelium mat; harvesting the mycotextile mat; and processing the mycelium mat to form the mycotextiles.

The shelf may refer to any surface appropriate to grow the fermentation substrate. The shelf may be continuous and large (e.g., multiple square meters in area). The method may be expanded to include multiple shelves. The shelf may refer to a stack of shelves, e.g., that may be arranged vertically.

The nanobiocidal scaffold may be a selective scaffold that is nutritionally enriched. Examples of selective scaffolds are described herein, and may be matched to the strain of fungi being used.

Adding functionalized nanoparticles may include adding additives containing growth inducers and functionalized nanoparticles on the growing mycelium mat, wherein the additive may be configured and/or selected to enable both the increase of fungal growth and the in situ nano-crosslinking.

As used herein, placing a cover over the growing mycelium mat may comprise placing a cover around the shelf. A cover may refer to any thin cover, including (but not limited to) a sheet of material, such as a polymeric or metallic material (e.g., aluminum) that may be folded or compressed to conform to a desired shape/size. The cover may provide a moisture barrier. Placing the cover may include placing the cover vertically around the shelf to control humidity levels and the oxygen and carbon dioxide concentrations inside the shelf. The cover may have a thickness of between about 0.1 to 40 microns of thickness within 0.1 to 200 micro-perforations per sqft, based on the moisture balance between a growing room and the substrate.

Harvesting the mycotextile mat may include harvesting an elongated length of mycelium mat using an automated system. Relatively large and/or long elongated lengths of mycelium mat may be harvested, either manually or using an automated system. The area of the mycelium mat to be grown is not typically size liming for the methods and systems described herein. For example, the elongate length of the mycelium mat may be between 50 cm and 100 meters or more (e.g., between 1 meter and 100 meters, between 1 meters and 75 meters, between 1 meter and 50 meters, between 1 meter and 40 meters, between 1 meter and 30 meters, between 1 meter and 25 meters, between 1 meter and 20 meters, between 1 meter and 15 meters, etc. greater than 2 meters, greater than 3 meters, greater than 4 meters, greater than 5 meters, greater than 8 meters, greater than 10 meters, greater than 12 meters, greater than 15 meters, etc.). The size of the shelf may be configured to accommodate these long lengths. Similarly, any appropriate width may be used (e.g., between 10 cm and 10 meters, between 20 cm and 9 meters, between 20 cm and 8 meters, between 20 cm and 7 meters, between 20 cm and 6 meters, between 20 cm and 5 meters, between 20 cm and 3 meters, between 20 cm and 2 meters, between 20 cm and 1.5 meters, between 20 cm and 1 meter, etc.).

Generating the substrate seeded with the selected fungal strain comprises generating the substrate seeded with SCC-0006 fungal strain. The SCC-0006 fungal strain is described herein, and is characterized in, e.g., PCT/IB2023/053847, titled "MYCOTEXTILES INCLUDING ACTIVATED SCAFFOLDS AND NANO-PARTICLE CROSS-LINKERS AND METHODS OF MAKING THEM," herein incorporated by reference in its entirety. In some examples, the preferred fungal strain, such as but not limited to SCC-0006 ("0006") may generally be enriched for the percentage of chitin and additional reactive sites, as compared to other fungal strains, such as the commercial strain G. lucidum. For example, these preferred fungal strains may have a chitin fraction of 45% or greater, and with mechanical properties, such as tensile strength of >6 MPa (e.g., TS>6.5 MPa). The preferred fungal strain may have a slightly larger diameter of the hyphae, higher chitin content and additional reactive carbonyl group as compared to G. lucidium, including a greater number of crosslinking sites. The preferred strain may have a chitin fraction ((1-6)-β-D-glucans plus chitin) of between about 45% to 80% and may be enriched for acetamide and/or amide groups. The chitin polymer may be a target component for cross-linking as described herein (e.g., nanoparticle cross-linking) and may provide structural rigidity to the cell wall. The preferred strain may have β-(1,4)-D-Polyglucuronic acid existing in some fungi cell walls. These are polysaccharides containing carboxyl groups that could be present and could also be partly esterified as methyl esters. The presence of other chemical reactive groups other than chitin/chitosan is highly desirable to increase crosslinking options. Thus, the preferred fungal strains may be selected as being enriched for β-(1,4)-D-Polyglucuronic acids in the fungi cell walls, which may be present in the final product (e.g., as part of the crosslinked mycelium layer). (e.g., 0.1% or greater of the polysaccharides within the mycelium layer(s), 0.2% or greater, 0.5%, or greater, 0.7% or greater, 1% or greater, 2% or greater, 5% or greater, etc.).

The substrate may comprise a lignocellulosic material. Examples of lignocellulosic materials include plant-based materials derived from virgin biomass, bioenergy crops, residues, and byproducts from agricultural production (e.g., eucalyptus, wheat straw, corn fiber and stalks, rice straw and hulls, sweet sorghum, sawdust, and sugarcane). For example, the lignocellulosic material may comprise one or more organic amendments and/or additives as a mycelium growth inducer.

Placing the sheet of cellulosic paper over the substrate may comprises equalizing mycelium colonization on the scaffold and preserving adequate moisture in the substrate.

The sheet of cellulosic paper may be any appropriate thickness, e.g., from between about 0.02 mm to about 1.20 mm (e.g., between about 0.02 to about 0.7 mm, between about 0.02 to about 0.6 mm, between about 0.02 to about 0.5 mm, between about 0.02 to about 0.4 mm, between about 0.02 to about 0.3 mm, between about 0.02 to about 0.2 mm, between about 0.02 to about 0.1 mm, between about 0.05 to about 1.2 mm, between about 0.1 to about 1.2 mm, etc.). In some examples the sheet of cellulosic paper placed over the substrate comprises a sheet of cellulosic paper between about 0.1 to about 1 mm thickness.

The nanobiocide scaffold layer may contain specific growth inducers and biocide nanoparticles to induce, respectively, a high density and homogeneity of mycelial colonization onto the scaffold and the mitigation of environmental contamination in the fermentation processes.

The functionalized nanoparticles may be added by spraying. For example, adding the functionalized nanoparticles onto the growing mycelium mat may comprise promoting in situ and in vivo nano-crosslinking by spraying a stabilized nanoparticle dispersion onto the growing mycelium mat. In some cases adding the functionalized nanoparticles onto the growing mycelium mat comprises adding functionalized nanoparticles comprising a protein-functionalized iron oxide nanoparticles.

The formulated stabilized nanoparticle dispersion may include a dispersing agent, a thickener and/or a liquid phase. The formulated stabilized nanoparticle dispersion may be automatically sprayed onto the growing mycelium mat during the fermentation process at a determined frequency, volume, flux and concentration. For example, any of these methods may include inducing a twofold increase in the aerial mycelium density and mechanical strength by improving the interconnection of the hyphae network.

Processing the harvested mycelium mat may include one or more of: applying an internal wetting composition to the mycelium mat, dyeing the mycelium mat, applying an external barrier composition to the mycelium mat, and applying high pressure to add determined patterns.

For example, a method of forming a mycotextile at an industrial scale may include: generating a substrate seeded with a selected fungal strain (e.g., a preferred strain); placing a solid-state fermentation substrate on a shelf; placing a sheet of cellulosic paper over the solid-state fermentation substrate; placing a nutritionally-enriched and nanobiocidal scaffold onto the sheet of cellulosic paper; growing the selected fungal strain into the scaffold to form a mycelium mat; adding one or more additives containing growth inducers and functionalized nanoparticles on the growing mycelium mat to enable both the increase of fungal growth and the in situ nano-crosslinking; placing a cover over the growing mat; harvesting the mycotextile mat; and processing the mycelium mat to form the mycotextiles.

In some examples a method of forming a mycotextile at an industrial scale may include: generating a substrate seeded with a selected fungal strain; placing a solid-state fermentation substrate on a bed on each of a plurality of shelves; placing a sheet of cellulosic paper over the solid-state fermentation substrate; placing a nutritionally-enriched and nanobiocidal scaffold onto the sheet of cellulosic paper; growing the selected fungal strain into the scaffold to form a mycelium mat on each bed of the plurality of shelves; adding one or more additives as growth inducers containing functionalized nanoparticles on the growing mycelium mat to enable both the increase of fungal growth and the in situ nano-crosslinking; placing one or more covers over the plurality of shelves; harvesting the mycotextile mat as elongated strips from each bed of the one or more shelves; and processing the mycelium mat to form the mycotextiles.

Also described herein, and in greater detail below, are methods and apparatuses for preparing the substrate (as well as the prepared substrate), methods and apparatuses for preparing the selective and/or nanobiocidal scaffold, methods and apparatuses for the substrate fermentation process, methods and apparatuses for pasteurization of the material, methods and apparatuses for inoculating the substrate, methods and apparatuses for preparing and/or positioning the cellulosic paper, methods and apparatuses for incubating the material, and methods and apparatuses for impregnating with nanoparticles.

All of the methods and apparatuses described herein, in any combination, are herein contemplated and can be used to achieve the benefits as described herein.

BRIEF DESCRIPTION OF THE DRAWINGS

A better understanding of the features and advantages of the methods and apparatuses described herein will be obtained by reference to the following detailed description that sets forth illustrative embodiments, and the accompanying drawings of which:

FIG. 1B shows a phylogenetic tree of ITS region sequences of strains belonging to the SCC as described herein, including referential strains that are closely representative (50 fungal strains in total). Maximum-Likelihood phylogenetic tree based on ITS region sequences obtained from previous and current information. According to Bayesian Information Criterion, the best criteria for the substitution model is HKY+F+G4. Circular graphs indicate the number of species. ITS sequences were aligned using MAFFT. The tree is built by IQtree, using 1000 bootstrap replicates with the substitution model generated by the same tool.

FIGS. 1C1-1C2 show a table (Table 1) including a list of taxa of wild fungal strains.

FIGS. 2A1-2A3 show examples of distributions of fungal isolates according to Class, Order, and Family, respectively.

FIGS. 2B1-2B2 show examples of a distribution of fungal isolates according to Genus and Species, respectively. Note that the Unclassified Polyporaceae SCC-0006 strain is clearly separated from the rest of the clades.

FIG. 5B shows an example of pre-inoculum substrates without incidence of contamination. Seeds with 7 days of incubation after the treatment using food preservatives.

FIG. 10A shows an in situ synthesis of Ag nanoparticles. FIG. 10B shows an ex-situ synthesis of Cu nanoparticles and application onto the scaffolds.

FIG. 11A shows AgNPs and FIG. 11B shows CuNPs.

FIG. 16 shows Scanning Electron Microscopy (SEM) images using secondary electrons of SCC-0006 when growing in different concentrations of IO-Zein NPs. The scale bar in each main image corresponds to 5 micrometers (images collected at 5 kX).

FIG. 26 schematically describes the application of functionalized nanoparticles in the obtention of mycotextiles using agar culture medium. Approximation nC-1 (tray), approximation nC-2 (scaffold), approximation nC-3 (spray).

FIG. 27A shows approximation nC-1 (tray), FIG. 27B is approximation nC-2 (scaffold), FIG. 27C illustrates an approximation nC-3 (spray).

FIG. 31A shows nanoparticles dispersed in Marillion's activator solution, FIG. 31B shows nanoparticles dispersed in BIO Organic CHAI, FIG. 31C shows nanoparticles dispersed in the modified BIO Organic CHAI.

FIG. 40A shows the preparation of a shelf's bed and placing the net pulling (1). FIG. 40B shows placing the organic substrate inoculated with the selected fungal strain (2). FIG. 40C shows the placing of the cellulosic paper (3). FIG. 40D shows the placing of the cover (e.g., foil) around the shelf (4); and FIG. 40E shows the mycelium growing at third day onto the selective and nanobiocide scaffold at industrial scale (5).

DETAILED DESCRIPTION

Figure 1A:
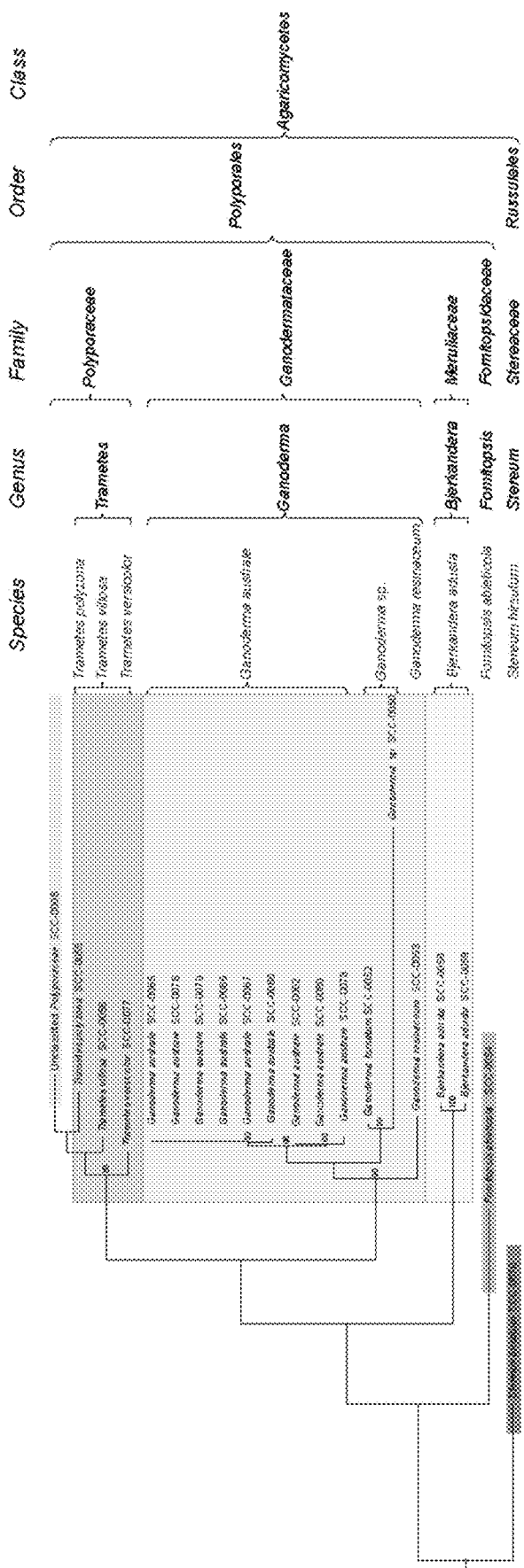
FIG. 1A shows a Phylogenetic tree of ITS sequences of strains belonging to a private ("Spora") Culture Collection (SCC) studied herein (e.g., 20 wild fungal strains). Maximum-Likelihood phylogenetic tree based on ITS region sequences obtained from previous and current information. According to Bayesian Information Criterion, the best criteria for the substitution model is HKY+F+G4. Circular graphs indicate the number of species. The classification of species, genus, family, order, and class is included for representatives (right side). ITS sequences were aligned using MAFFT. The tree is built by IQtree, using 1000 bootstrap replicates with the substitution model generated by the same tool.

Described herein are methods and apparatuses for forming mycotextiles. Any appropriate fungal strains may be used herein, particularly those with cell walls that are more enriched with amide groups. As mentioned, the methods and apparatuses described herein, a wide variety of fungal strains may be used, which are indicated in Table 1 at the present disclosure but also in the U.S. Publication No. US 2023/0356501 A1, the International Patent Application PCT/IB2023/053847 and the European Patent Application No. 23168316.0. They may be particularly useful with the SCC-0006 strain (previously referred to as Unclassified Polyporaceae strain SCC-0006, e.g., in U.S. Publication No. US 2023/0356501 A1).

Sampling and Isolation of Promising Strains for Mycotextile Purposes

Expeditions to pristine high biological diversity ecosystems were made to identify white-rot Basidiomycete fungi, those fungi capable of degrading all the polymers of the plant cell wall, including the lignin, often leaving behind lighter-colored cellulose. The fungi were identified in the jungle by the morphological characteristics and saprophytic habits, such as the presence of fruiting bodies on decomposing lignocellulosic substrates and decayed woods. A little fraction of the lamellae or gill (the most common type of hymenophore in mushrooms as a means of spore dispersal) was taken with a bite opener, promoting a non-invasive/non-destructive sampling and leaving the fruiting body intact in its original natural place. Each collected sample was labeled, transported in a cooler, and stored at 4° C.

Once in a portable field laboratory, in a vertical laminar flow chamber, the samples were washed with sterile distilled water to remove impurities and soil and later suspended in 5% sodium hypochlorite for 5 minutes. Later, the samples are atomized with 70% ethanol and washed with abundant autoclaved distilled water. With the help of dissection forceps and a scalpel, three segments of internal tissue between 2-5 mm were cut and sown by duplicate in Petri dishes with a modified culture medium supplemented with broad-spectrum antibiotics (e.g., ampicillin, amoxicillin, etc.) and incubated at 28° C. for 3-7 days. The plates were evaluated every three days and repeated until isolation was achieved without fungal or bacterial contamination to obtain strains in axenic culture. Finally, each strain was stored in the Spora Culture Collection (SCC) for subsequent characterization, research and innovation activities. A total of 20 fungal morphotypes were isolated in axenic culture. We also include in this patent the SCC-0006 strain, previously described as an Unclassified Polyporaceae, in the U.S. patent application No. US 2023/0356501-A1. This unique white-rot strain was believed to belong to the Polyporaceae family. It was identified to have improved characteristics that provide superior features for developing mycelium fabric than those provided by other reported species within the Ganodermataceae family.

Molecular Identification of Isolated Fungal Strains

The strains were identified by taxonomical, phenotypical, biochemical, and molecular analysis. Molecular identification allows determining what kind of strain it is, if it belongs to previously described taxa, and infer its physiological, nutritional, phenotypic, and biochemical characteristics. Molecular identification was performed by PCR amplification and SANGER sequencing of the Internal Transcribed Spacer Region (ITS) as a universal barcode for fungi (650-700 bp). The DNA sequences were edited and assembled with SnapGene Software (https://www.snapgene.com) and compared with several databases to confirm the results obtained: i) GenBank (http://www.ncbi.nlm.nih.gov/Genbank/) using BLASTN (https://blast.ncbi.nlm.nih.gov/Blast.cgi), ii) MycoBank Database (https://www.mycobank.org/), iii) Fungene-db (http://www.fungene-db.org), and iv) UNITE Community Reference Sequence (https://unite.ut.cc). Table 1 shows information about the fungal strains isolated and molecularly identified.

Figure 1B:
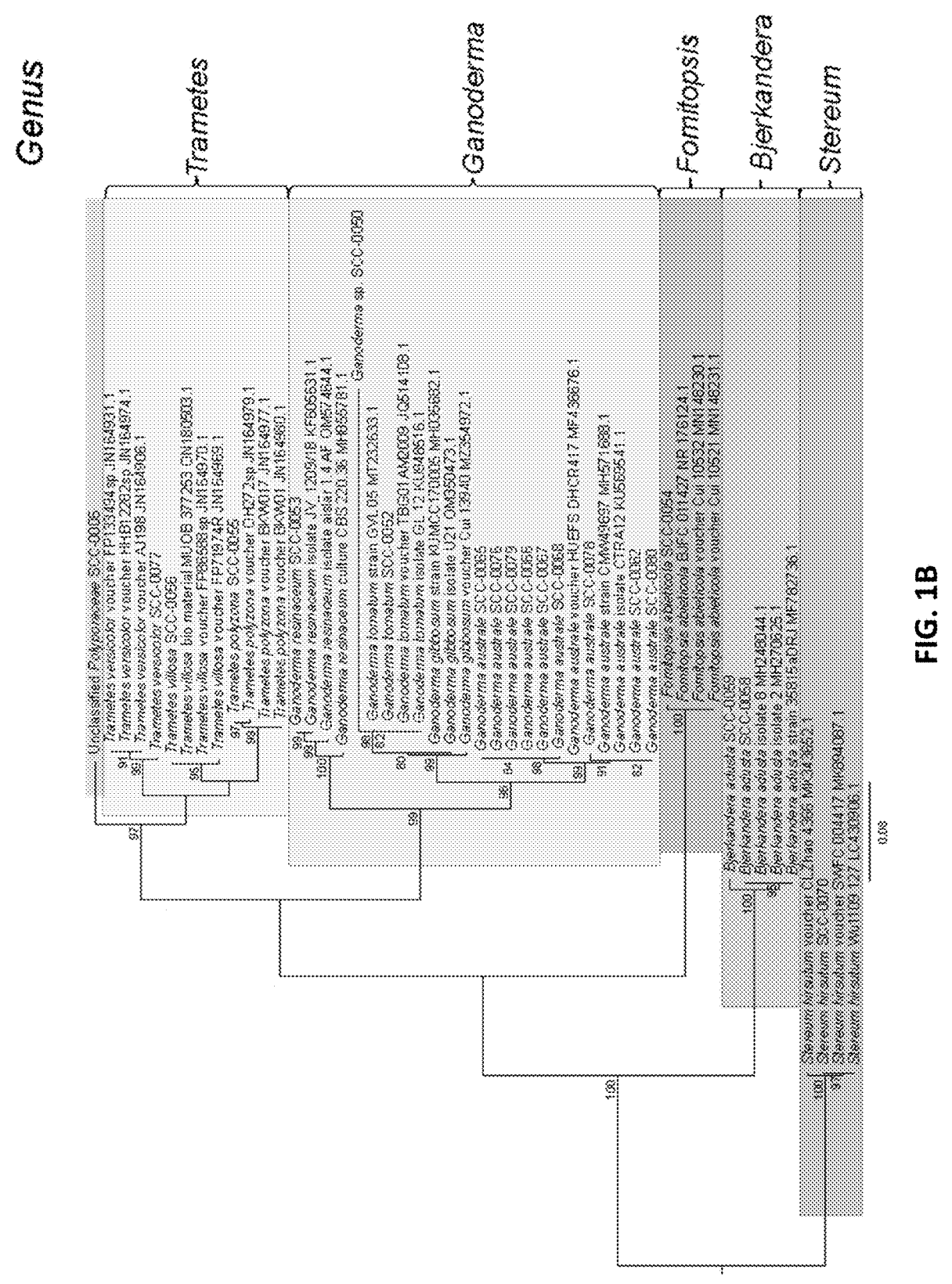

The results obtained through molecular identification (Table 1) and the constructed phylogenetic trees (FIG. 1A and FIG. 1B) show that, of the total number of specimens studied (20 strains), 100% belong to Agaromicetes Class, and 95% belong to Polyporales order, of which 60%, 20%, 10%, 5%, and 5% belongs to Ganodermataceae, Polyporaceae, Meruliaceae, Stereacac, and Fomitopsidaceae family, respectively (FIGS. 2A1-2A3), suggesting a vast majority of *Polyporales* species which are efficient saprotrophs in wood decomposition with a significant contribution to the carbon cycle in forest soils. Regarding the genus taxa, 60%, 15%, and 10% of the studied fungal strains belong to *Ganoderma*, *Trametes*, and *Bjerkandera*, respectively (FIGS. 2B1-2B2). The remaining specimens, with 1% each, belong to the *Stereum* and *Fomitopsis* genus and the Unclassified Polyporaceae SCC-0006.

Within the *Ganoderma* genus, there were 4 different species with a total of 13 strains: 9 of them belong to *G. australe* (69.23% of the total in this genus), 1 strain corresponds to *G. tornatum* SSC-0052 (7.69%), 1 strain belongs to *G. resinaceum* SCC-0053 (7.69%), and 1 corresponds to the new species *Ganoderma* sp. SCC-0050 (7.69%). Besides, there are 2 strains of *Bjerkandera adusta* (SSC-0058 and SCC-0059) and 3 different species of the *Trametes* genus: *T. polyzona* SCC-0055, *T. villosa* SCC-0056, and *T. versicolor* SCC-0077. Finally, the group comprises 1 species of *Stereum hirsutum*, 1 species of *Fomitopsis abieticola*, a common brown-rot fungal species, and 1 strain of Unclassified Polyporaceae SCC-0006.

The phylogenetic trees obtained (FIGS. 1A and 1B) revealed that Unclassified Polyporaceae SCC-0006 is a unique strain that is clearly separated from the rest of the clades but is phylogenetically closed to the *Trametes* and *Cubamyces* genus (formerly Leiotrametes). Remarkably, it is separated from the clade formed by species of the Ganodermataceae family. This strain was used as a Gold Standard in all the experimental tests at the present patent. However, the rest of the fungal strains, or a combination of them, are not excluded from the development of mycelium-based textiles, regardless of the order to which they belong. Also, the 16 fungal strains described in the U.S. Publication No. US 2023/0356501 A1, a combination of them or a combination with the strains described herein could be used. FIGS. 1C1-1C2 shows Table 1, including a list of taxa of wild fungal strains. In table 1, the GenBank Database (https://blast.ncbi.nlm.nih.gov/Blast.cgi), Fungene Database (http://www.fungene-db.org), and UNITE Community Reference Sequence Database (https://unite.ut.cc) are all referenced.

Morphology and Chemical Composition of the Cell Wall of Fungal Strains

To study the morphology and chemical composition of the cell wall of the fungal strains selected as promising in comparison with the Gold Standard SCC-0006 strain, a Zeiss Scanning Electron Microscope, Model EVO I MA10 was used with additional backscatter detector and Elemental semi-quantification system by Energy Dispersive Spectroscopy (EDS). The aerial mycelium was deposited on aluminum supports covered with carbon tape to prevent its detachment during the analysis, and a 30 nm sputtered gold layer was deposited to avoid an excessive charge of the sample. The images were collected using an accelerating voltage of 20 KV and a magnification of 1000×. For mycotextile's development, the morphological characteristics determine the material's behavior because longer and thicker hyphae provide higher mechanical resistance.

Figure 3A:
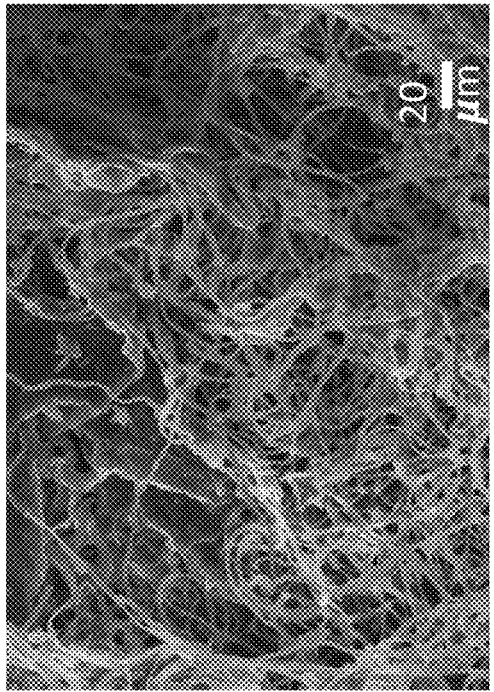
FIGS. 3A-3C show scanning electron microscopy images of three representative strains using secondary electrons. Each image's scale bar shown as an inset corresponds to 20 micrometers.
Figure 3C:
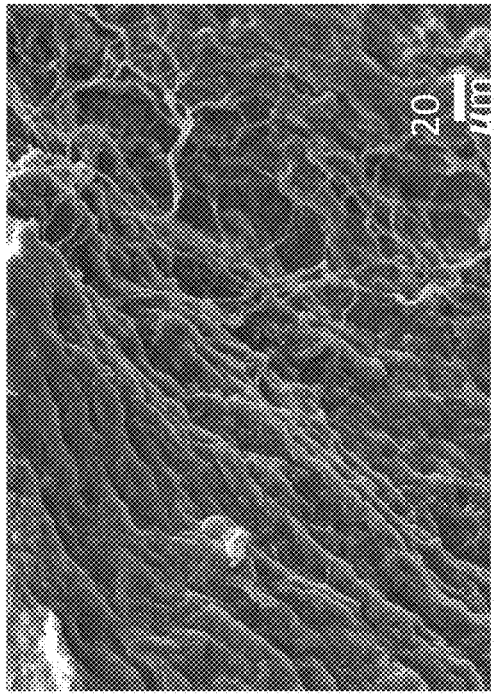
Figure 3B:
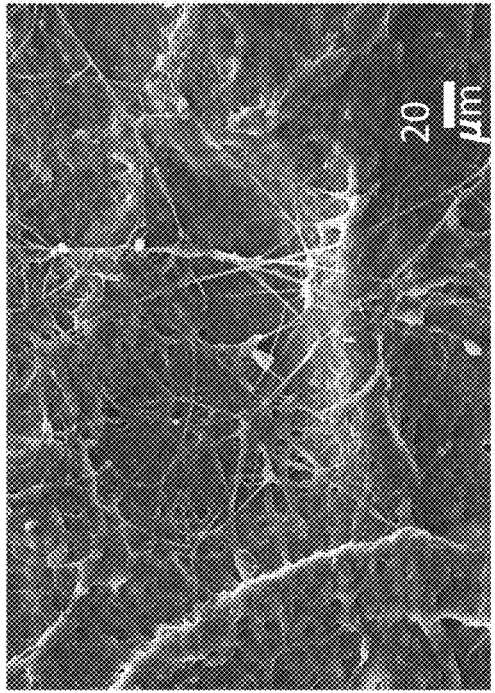

FIGS. 3A-3C show representative images of each strain to compare the mycelium development in each case. The SCC-0006 strain showed a well-developed and network-like fibrillar structure with elongated hyphae, in contrast with the SCC-0053 strain, which presents a much more compact structure with some individual hyphae at the surface. This compact structure in the Ganoderma strain may inhibit the penetration of reagents or colors during the post-fermentation stage, limiting the preparation of high-quality material. In the case of the *Trametes versicolor* (SCC-0077 strain), it presents longer hyphae that grow unidirectionally. However, this type of isotropic orientation may cause differences in the material's mechanical properties regarding the direction of the applied force, which could be unfavorable for the development of mycotextiles.

Figure 4:
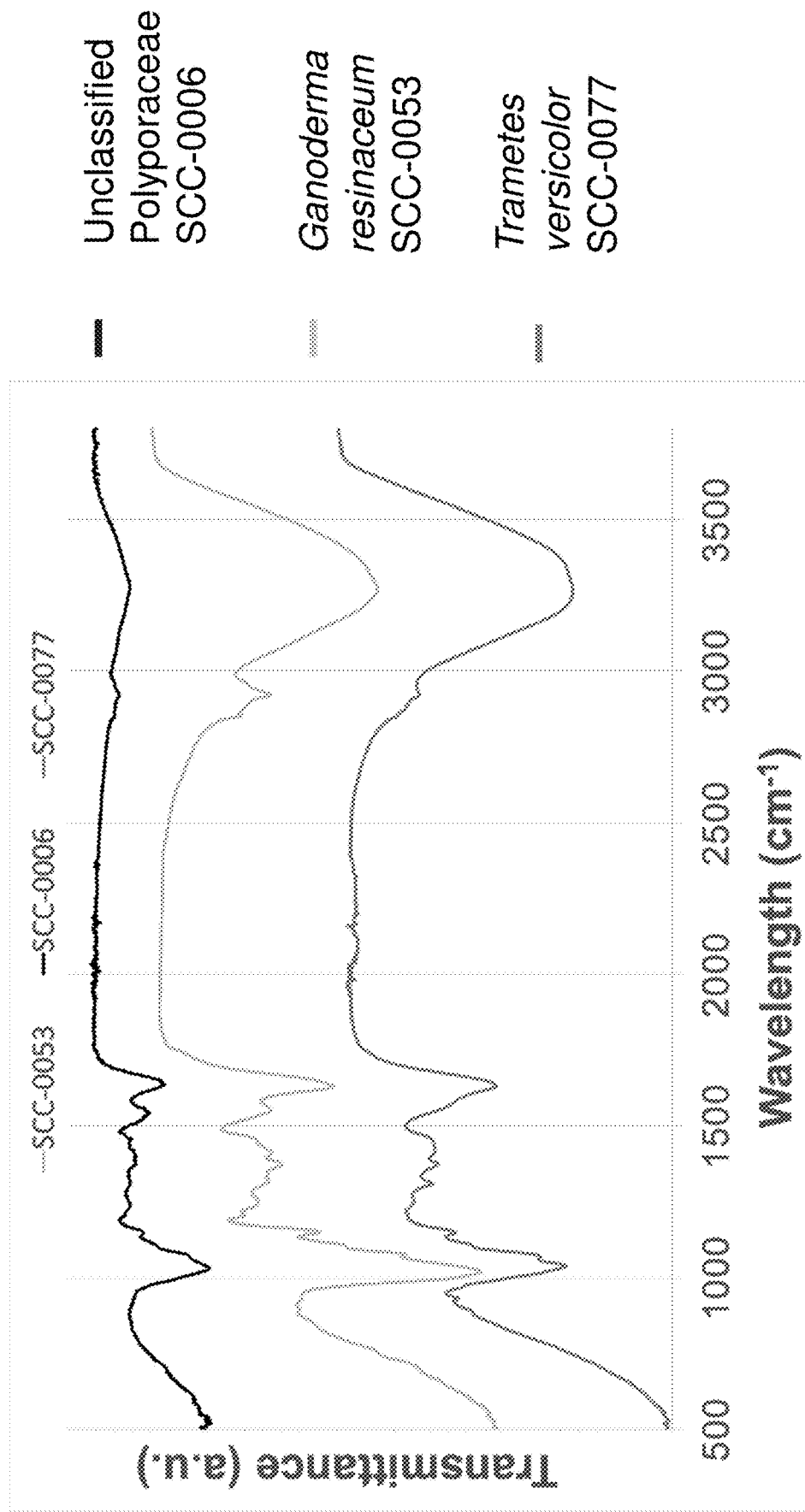
FIG. 4 shows an FT-IR spectrum in ATR mode for the three representative strains in the 500 to 3800 cm$^{-1}$ spectral range.

Spectroscopic characterization of promising strains was performed by measuring the ATR/FT-IR spectrum. The normalized spectra are shown in FIG. 4, covering a spectral range from 500 to 3800 $cm^{-1}$. Analyzing the region between 2700 and 3800 $cm^{-1}$, the following signals can be observed: (1) A broadband around 3270 $cm^{-1}$ in all samples, with the presence of a small shoulder around 3360 $cm^{-1}$ for strains *Ganoderma resinaceum* SCC-0053 and *Trametes versicolor* SCC-0077. The stretching vibration for the N—H bond in the amide groups ($CONH_2$ or CONRH) appears between 3200 and 3400 $cm^{-1}$ in primary secondary amides, respectively. Thus, this signal in all the samples could be assigned to the amide groups present in the chitin of the fungal cell wall. Likewise, O—H stretching of the alcohol groups in the polysaccharide backbone may appear in this region. The presence of adsorbed water is ruled out due to the absence of any band between 3600 and 3700 $cm^{-1}$. Next, the bands observed at 2940, 2920, 2890, and 2850 $cm^{-1}$ correspond to the symmetric and asymmetric stretching of the ethylene (—$CH_2$) and methylene (—$CH_3$) groups of the polysaccharides, respectively, showing a higher relative intensity in the spectrum of *Ganoderma resinaceum* SCC-0053. Observing the region between 1200 and 1700 $cm^{-1}$ approximately, other characteristic signs of the biopolymers conforming the cell wall appear. For instance, around 1630 $cm^{-1}$, a medium-intensity peak can be observed in all the cases that could be attributed to the stretching of the carbonyl bond (C=O) in the amide groups. It appears approximately in the same wavenumber for all the cases and is associated with secondary amides (e.g., chitin). In the case of SCC-0006 and *Ganoderma resinaceum* SCC-0053 strains, a small shoulder is observed at 1734 $cm^{-1}$, suggesting the presence of another type of carbonyl compound. The position of this band could be associated with the presence of an anhydride or an ester. The band assigned to the N—H bending in secondary amides appears at 1540 cm$^{-1}$ in strain SCC-0006 and at 1530 cm$^{-1}$ in strains SCC-0053 and SCC-0077. The weak bands around 1540, 1370, and 1240 cm$^{-1}$ are present in all the strains and correspond to the bending vibrations of the O—H, C—H, and C—N bonds, respectively, all related to the polysaccharides conforming the fungal cell wall. The band assigned to the C—O—C stretching vibration of the biopolymers appears around 1030 cm$^{-1}$ for SCC-006, 1020 cm$^{-1}$ for the SCC-0053 strain, and 1040 cm$^{-1}$ for the SCC-0077 strain. Likewise, the peak at 1150 cm$^{-1}$ is much more intense in the SCC-0053 and SCC-0077 strains. The shoulder at 1070 cm$^{-1}$ is attributed to C—O—H stretching in primary alcohols and occurs at approximately the same frequency for all strains. Finally, the bands at 970, 930, and 880 cm$^{-1}$ are assigned to the bending vibrations of C—H bonds and appear with greater intensity in the strains SCC-0053 and SCC-0077. All these observations suggest possible differences between the polysaccharides present in the cell walls of all strains analyzed. One of the main differences in the strain SCC-0006 is the higher ratio between the relative intensity of the N—H bending vibration band (located around 1550 cm$^{-1}$) and the relative intensity of the C—O stretching band (around 1630 cm$^{-1}$), suggesting a cell wall more enriched with amide groups. This functional group may act as binding sites for several approximations during the post-fermentation stage and provide a higher mechanical resistance of the cell wall of fungi.

Preparation of Inoculum Substrate (Spawn)

The process may begin with the sown of the fungus in Petri dishes with a modified culture medium supplemented with a broad-spectrum antibiotic and incubated at 28° C. for 7 days. The culture medium may be supplemented with organic growth inducers, including a lignocellulosic component (e.g., cellulose, hemicellulose, lignin, etc.) and a protein component (e.g., corn, wheat, sawdust, etc.) to activate the saprophytic extracellular oxidative multi-enzymatic system. After obtaining the desired growth (5-7 days), these plates are used to sow seeds (e.g., millets, corn, wheat, etc.) in bags with a 0.2 um type 3B filter (Unicorn Bags). Also, using an innovative matrix to replace seeds to grow the fungal strains can reduce the impact on food security.

Figure 5A:
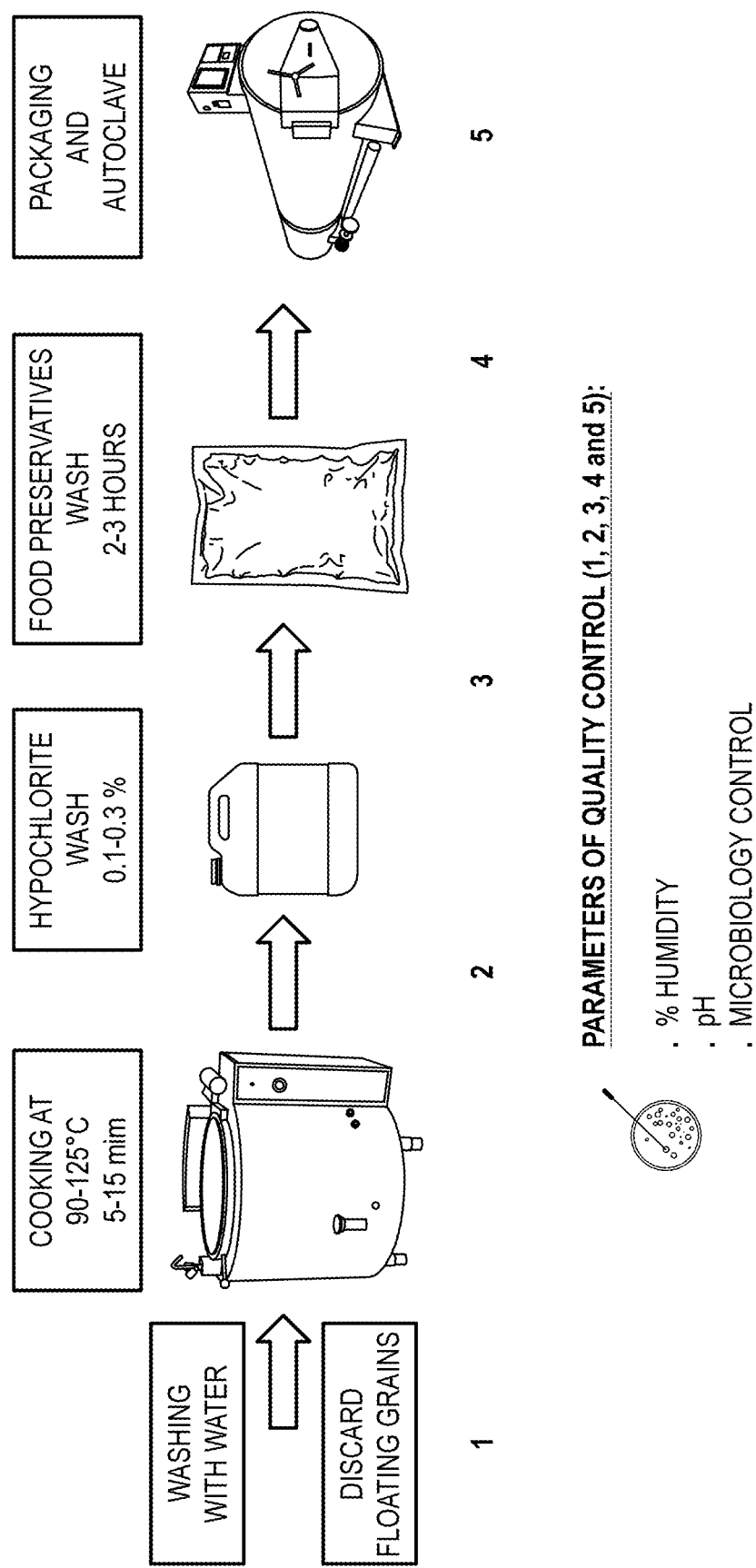
FIG. 5A illustrates an example of a flow process of grains treatment for pre-inoculum substrates preparation. Note that the process includes 2 physical and 2 chemical treatments of the grains.

However, before starting the process of the inoculum substrate preparation (spawn), the grain may pass an appropriate physicochemical sterilization treatment, as shown in FIG. 5A. The cleaning process begins with removing floating material, for which the seed is washed with potable water. In this case, the amount of water used will correspond to two times its weight in volume of water (e.g., for every kilogram of grain, two liters of water may be added). The grain may be soaked for an hour. During this first hour of washing, the grain may be stirred to clean it well, and it is important to eliminate floating grains, sticks, and other impurities accompanying the grain. Once the soaking hour is over, the water used for washing will be removed, and the grain will be cooked. The grain will not be dried or spun, as this excess of water will help the cooking process and increase moisture in the grain. Cooking will occur in a kettle for 5-15 minutes at 90-125° C.

Once the cooking is finished, a disinfection process is carried out using sodium hypochlorite with 0.1-0.3% at final concentration, at least during the first 4 hours, in agitation, and at room temperature (RT). Once the first disinfection step was finished, the grains were washed 3 times with potable water to eliminate hypochlorite excess. The volume of water may preferably be in the ratio 1:2 water:grain. The washing may end when the smell of hypochlorite is not perceived. Then, the second disinfection step is performed by soaking in a solution with adjusted concentrations of one or a mix of the following food preservatives (e.g., potassium sorbate, sodium ascorbate, sodium benzoate, potassium metabisulfite, sulfite, among other agents) for 120-180 minutes. The 1:2 weight-volume ratio is maintained and shaken for this soaking every 30 minutes. After soaking, the preservative agent may be removed like in the previous step; finally, the grain is packed in bags with a 0.2 um type 3B filter. These may be sealed using heat with the sealing machine; the volume of the grain may not exceed 50% of the bag height. The sealed bags may pass sterilization by moist heat using the autoclave. One example of sterilization conditions is 121° C., 15 psi for 60 minutes. Once the bag's sample (1 kg of seed: 1 plate) is inoculated, it is incubated in darkness at 28-30° C. with 40% humidity for 7 to 10 days. The colonization of fungal mycelium may be achieved between 95 and 100%.

Samples of grain are collected in each step of the flow process (e.g., 1, 2, 3, 4, and 5) to evaluate the pH, humidity, and microbiological analysis (mesophilic aerobics, filamentous fungi, and yeasts) in Agar Sabouraud (Sigma) and LB (Luria Bertani, Sigma) culture medium for fungi and bacteria analysis, respectively (FIG. 5B). The final seed pH should be 5.5-6.5 pH units, humidity 36-39%, and the bacterial and fungal contaminants count should be zero or less of <10 CFU/gram of grains (FIG. 5B).

Solid-State Fermentation Substrate (SSFS) for Mycelium Fabric Production

A foam manufacturing method may be used to scale up the fungal-derived textiles production using a hybrid fermentation substrate (HFS) named BIOrganic Foam to ensure efficiencies and reproducibility and scalability under controlled environmental conditions. However, the transition to mushroom farm facilities implies preparing and using solid-state fermentation substrates (SSFS) and adapting the technology described above to the reality of mushroom farms.

Preparation of Substrate

Among the various factors involved in the production of mycotextiles, substrate preparation may be one of the most critical steps. This process is highly influenced by the availability of consistent lignocellulosic raw material conditions throughout the year and composting management techniques, ensuring structure and nutrient selectivity of the substrate by reducing the availability of simple sugars to decrease the incidence of competitive fungi and bacteria as contaminants. Additionally, having access to advanced technology in infrastructure, machinery, and equipment are crucial factors based on funding resources.

Figure 6:
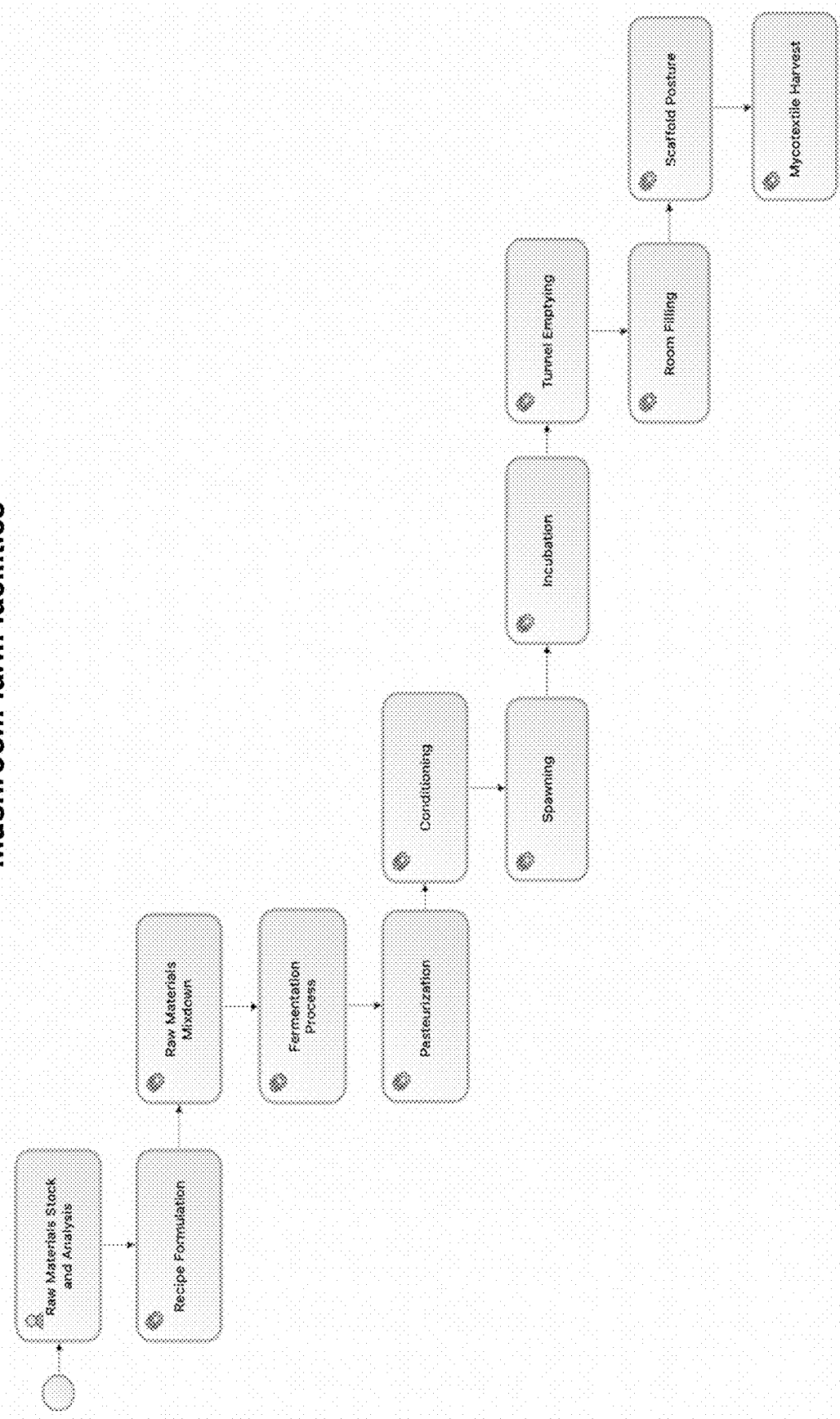
FIG. 6 illustrates an example of a process flow diagram of mycotextiles industrial production in mushroom farm facilities.

Within the objectives to be addressed, our substrates are produced through agro-industrial processes that allow us to handle large quantities at competitive costs, primarily using waste from other agro-industries, such as wheat straw and corn leaves. The process flow diagram is described in FIG. 6 and explained below.

The present process draws upon raw materials predominantly sourced from residual matter of annual crops, notably wheat straw. These raw materials are contingent upon a singular harvest conducted during the summer seasons, subsequently subjected to storage beneath sheltered stacks to prevent deterioration. This storage method ensures an uninterrupted provision to meet production requirements throughout the annual cycle. Determining the straw's length, thereby establishing its structural attributes, is intrinsically linked to the equipment employed during the wheat straw harvesting procedure.

An alternative supply avenue is derived from the equestrian husbandry activity, where the resulting residue consists of pre-fermented and soft straw owing to the mechanical action of animal traffic upon it, along with the presence of urine and manure.

The variety of substrates employed in mycotextiles production can encompass a range of lignocellulosic materials, including agricultural and industrial residues like sugarcane bagasse, various types of straws (e.g., wheat, bean, rice, corn, etc.), sawdust, coffee pulp, brewing industry byproducts, and residues from the cotton textile industry, among other options. This diversity in substrates contributes to the mitigation of geopolitical sourcing risks.

Working fungal strains and the biological processes described herein can be accommodated to different raw materials. The utilization of wheat straw stands out for its ability to provide a consistent nutritional profile and stable structure throughout the year at a low cost. This choice also facilitates cost-effective storage. However, our ligninolytic white-rot fungi strains, mainly belonging to the Polyporales Order, possess a high metabolic versatility essential to use as a wide range of byproducts and agricultural waste as carbon and energy sources.

Regarding straw structure, the straw size may fall within the range of 1 to 8 inches, preferably between 2 to 4, with well-maintained tubes. It may be advisable to maintain tubes that are at least 10% longer to contribute to the structural integrity of the pile, thereby reducing the occurrence of anaerobic conditions during the fermentation process.

All the subsequent processes detailed in this document can vary depending on the specific situation, taking place within a mushroom farm facility that encompasses a compost yard and a mushroom farm or in separate units located at distinct sites, where colonized substrates are transported either by truck or within a climate-controlled container.

Phase I. Substrate Fermentation Process

Phase I is about moistening raw material, mixture, and subsequent degradation in controlled environments. The methods and apparatuses (e.g., systems) described herein may pertain to methods for substrate preparation through composting, encompassing two distinct phases. Phase I primarily offers two implementation options: Outdoor composting using piles or indoor composting within bunkers equipped with forced aeration systems (Spigot system). The initiation of microbial activity triggers self-heating, causing temperatures to rise to approximately 70° C. within days. This robust microbial engagement facilitates the breakdown of intricate carbohydrates (such as cellulose, hemicellulose, and lignin), which liberates nutrients essential for mushroom cultivation.

During fermentation, the combustion of readily decomposable organic compounds produces heat, resulting in a rapid temperature increase. At this stage, the thermophilic microbiome takes over from mesophilic organisms. The activity of these microbiota raises the temperature until it reaches a point where chemical reactions become predominant. The elevated temperatures (above 70° C.) generate ammonia. Together, these factors soften and break down the straw.

The biological transformation of the substrate during composting can be monitored through physicochemical analysis, encompassing parameters such as organic matter, pH, C/N ratio, soluble sugars, crude energy, and temperature. Mesophilic and thermophilic microorganisms efficiently metabolize quickly degradable simple carbon sources, like soluble sugars, during the initial composting stages. However, specific metabolic events contribute to carbon and nitrogen losses, reducing organic matter, C/N ratio, and crude energy. Carbon loss primarily arises from $CO_2$ emission during microbial respiration, whereas nitrogen loss involves $NH_3$ emission or biological recycling.

When the degradation state is suitable, the next step is pasteurizing the substrate to disinfect it.

The disclosed process is initiated by blending finely chopped wheat straw with shredded maize leaves. Following this mixing, water is added to achieve an optimal moisture level, typically within the range of 75% to 85%. The resulting blend is then conveyed utilizing a front loader, walking floor hopper, and conveyor system. Subsequently, the substrate is transferred into a bunker via an Overhead filler machine or a cascade conveyor, creating a pile over a spigot floor.

Once mixed with a front loader, walking floor hopper and a conveyor belt system, the substrate may be carried inside a bunker and filled by an Overhead filler machine or cascade conveyor to make a pile over the spigot floor.

Phase II. Pasteurization

This process may be carried out in a controlled environment (e.g., pasteurization tunnel) in two stages: pasteurization and conditioning. The pasteurization stage is responsible for killing insects, nematodes, competitor fungi, and other pests (temperature between 60 and 70° C.), and conditioning is necessary to reduce the free ammonia formed during Phase I and to improve the biological environment of the substrate (beneficial microbiota induce to fungal strains to grow).

Phase II may be carried out in ventilated space (e.g., tunnels) with paved floors and equipped with a specific regulation system. The result is a very homogeneous substrate, and the output is uniform and high when used in the growing stage.

Filling a Tunnel:

Once the desired selectivity of the substrate has been achieved, the pasteurization phase begins, where two aspects are addressed. On one hand, the substrate's structure and moisture may be as homogeneous as possible. On the other hand, the tunnel-filling process may maintain a consistent density throughout the filled profile and an equivalent condition in kilograms of substrate per filled surface area. This process will prevent hot zones within the tunnel where air cannot penetrate and loosely compacted zones where air can escape easily, ensuring an optimal pasteurization process.

Leveling:

Once a tunnel is filled up and closed, pasteurization starts with the leveling process. That means to have every sensor under control (e.g., within acceptable parameters for temp, humidity, etc.) and in a similar condition.

Heating Up:

Once leveling is complete, the temperature is raised through steam injection until it reaches the desired pasteurization temperature.

Pasteurization:

The effectiveness of pasteurization depends on three factors: time, temperature, and the levels of $NH_3$ (ammonia) achieved during the process. Among these factors, time is the easiest to adjust during the process. It is crucial to comprehend and control these three variables as a unified system to treat a healthy substrate without negatively affecting the presence of actinomycetes. Actinomycetes play a role in converting the $NH_3$ present into other nitrogen sources that the fungus can digest.

Cooling Down for Conditioning:

Once pasteurization has achieved its purpose, the temperature may be decreased to start the conditioning step.

Conditioning:

To promote an optimal mycelium growth rate, it is essential to maintain the ammonia ($NH_3$) level below 3 ppm through the activity of Actinomycetes. Once this threshold is achieved, the substrate can cool down in preparation for spawning.

Cooling Down for Spawning:

During this step, the substrate is cooldown by 1 to 3 degrees/hour in order to spawn it.

Inoculation of the Substrate with Spawn

Once the substrate is free of ammonia and already cooled down at 20 to 25° C., the tunnel is emptied by a pulling winch and carried by a central conveyor of the spawning room through a new tunnel in which a spawn conveyor will add spawn.

Figure 7:
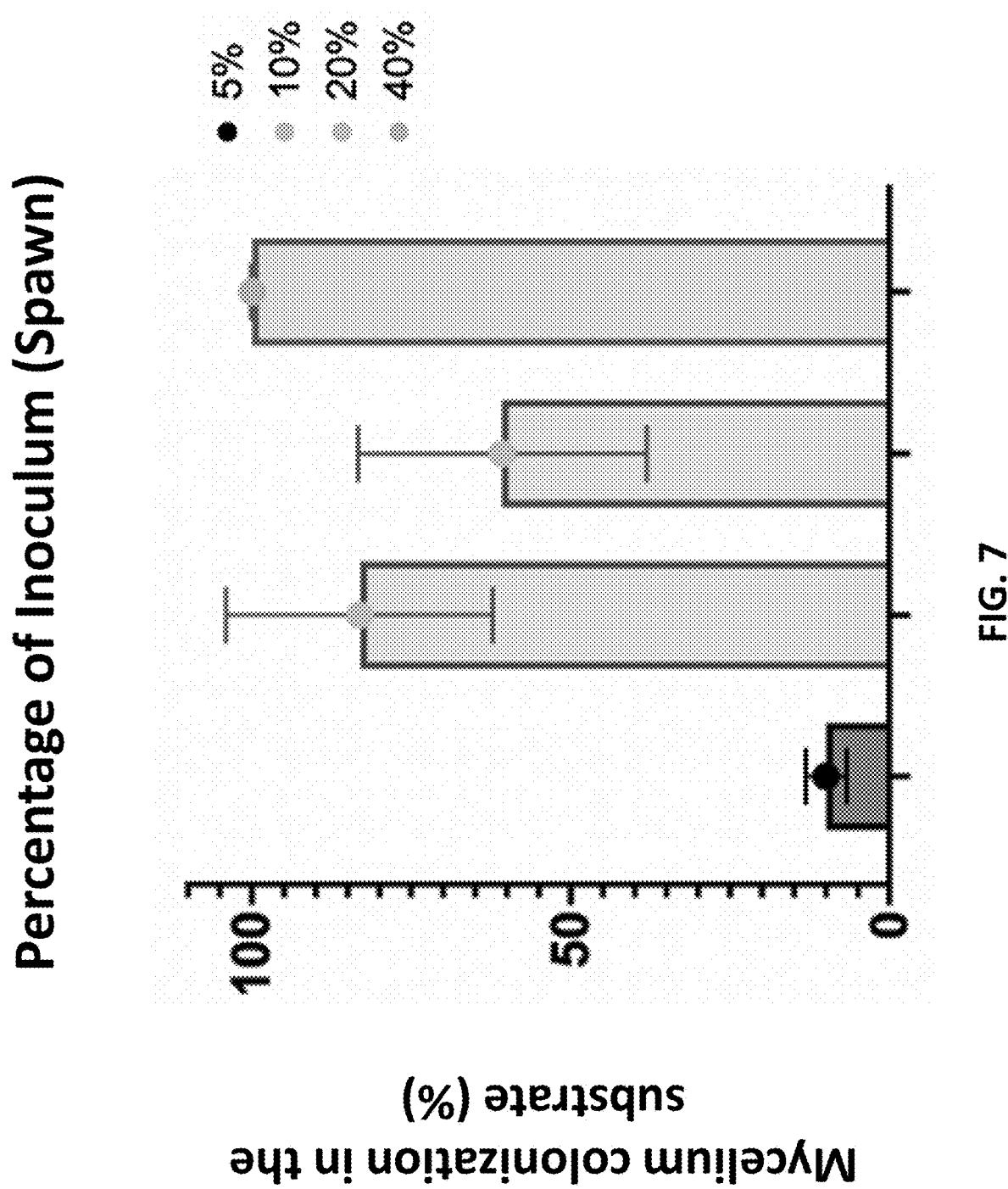
FIG. 7 is a graph showing inoculation results of the pre-fermented organic substrate with different spawn percentages of SCC-0006 strain.

The substrate may be inoculated once the fungus has colonized 95-100% of the spawn, as is described in the section "Preparation of inoculum substrate (Spawn)". To improve the fungal growth and avoid desiccation in the following days, the water lost in the grinding process may be added to increase the humidity content of the substrate. Adding water corresponds approximately to 0.125% m/m (control point: a humidity close to 70% is sought). The substrate and spawn may be mixed evenly to obtain the highest possible homogeneity. FIG. 7 shows the results on inoculation percentages of the substrate in a range between 5% and 40%, showing the best percentages between 10 and 40%, preferably between 10 and 20%. However, in all cases, the inoculum percentage will depend on the kind of organic substrate utilized, its chemical and structural composition, and the intrinsic characteristics of the working strain used (e.g., a highly activated extracellular machinery of oxidative enzymes associated with lignin degradation present in the Gold Standard fungal strains, such as SCC-0006).

Figure 5C:
FIG. 5C illustrates the results of QC assays show a viability of 100% after spawn bags are stored at +4° C. for 2 months.

Storing the spawn at +4° C. for at least 2 months before its use may also be possible. Inoculated spawn bags were stored at +4° C. for 2 months (with weekly intervals) to evaluate this. Each week, the viability of the grains was assessed by seeding by triplicate 100 grains on PDA Petri dishes and calculating the viability percentage (%) based on seed germination after 72 hours of incubation at 28-30° C. in darkness. In all cases, the viability percentage was 100% (FIG. 5C).

The growth conditions may ensure a room temperature between 25 to 35° C., preferably between 27 and 30° C., high moisture (95 to 100%), and $CO_2$ levels (20.000 ppm to 50.000 ppm) for 6 to 14 days, preferably between 7 and 10 days.

The method described herein may be focused on the process's Fermentation Stage and introduces several modifications to a more conventional mushroom farm process. In particular, it incorporates crucial components addressed to challenges associated with mycelium growth on an innovative selective and nanobiocide scaffold instead of the fruit bodies or basidioma production (e.g., edible fungi). The present method includes disruptive components to induce aerial mycelium growth incorporating nutritional additives, both to fight against environmental contamination using biocide nanoparticles (which may be incorporated in a scaffold, transforming this into a selective and nanobiocide scaffold biomaterial) and to promote the in-vivo cross-linking of the biomaterial simultaneously when the mycomaterial is self-generated by the fungus using functionalized nanoparticles. Finally, at the end of the process, it provides a gentle and efficient extraction method of large sheets of mycotextiles, facilitating the harvest process and mycelium preservation.

Figure 8:
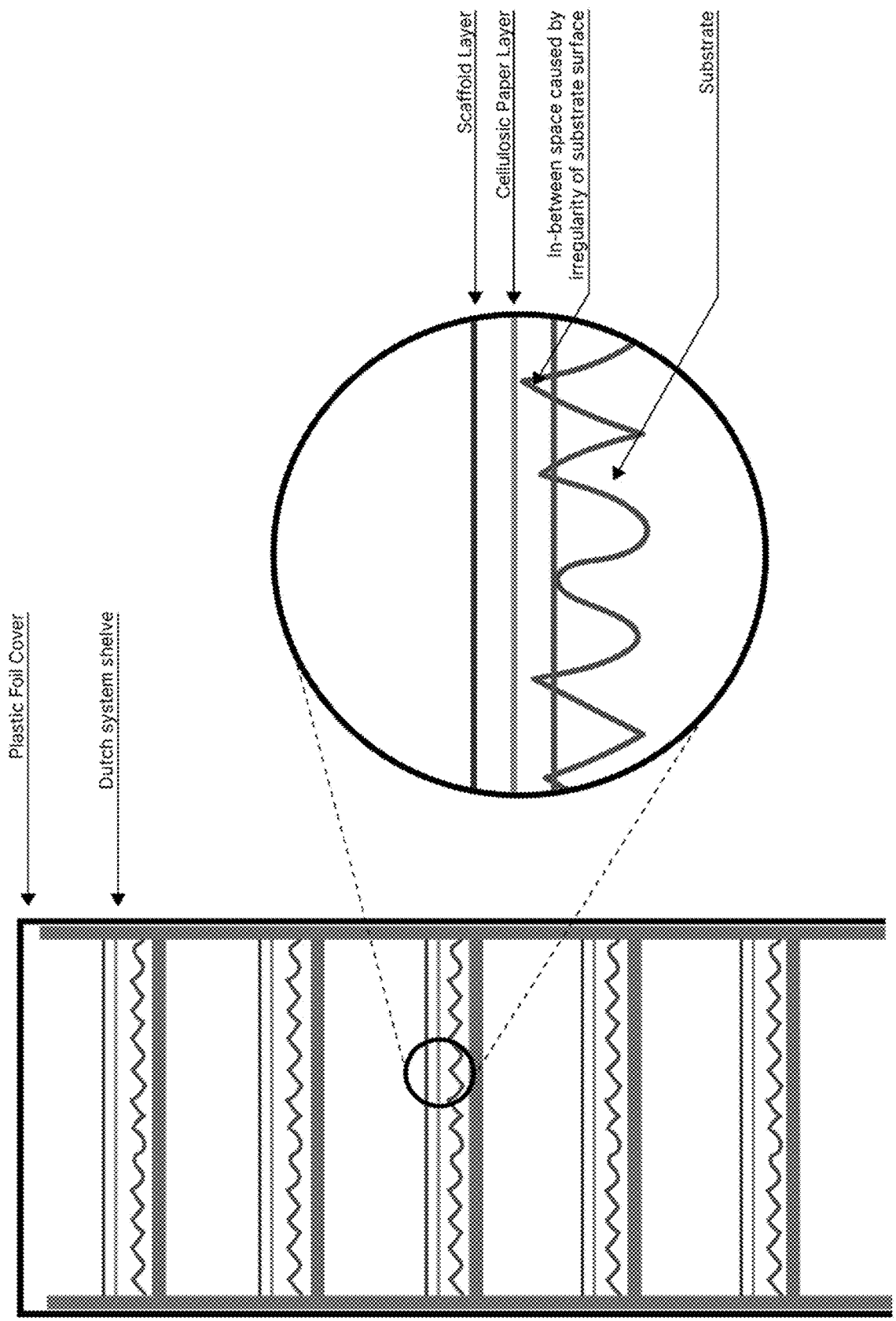
FIG. 8 illustrates an example of a structural scheme of one examples of the proposed "fermentation continuum system," described herein, including the following layers over shelves' beds: (i) a solid-state fermentation substrate > (ii) an eco-friendly cellulosic paper >and (iii) a selective and nanobiocide scaffold, which may also be referred to herein as a "sandwich-type fermentation process". Finally, a cover foil is vertically placed around shelves to create a measurable air chamber and gas exchange between fungal mycelium and the surrounding atmosphere. This layer may be removed each time a treatment is applied (e.g., water, growth inducers or in situ nano-crosslinking application).

Structurally, these bioengineering-based changes for the unprecedented mycotextiles self-generation in mushroom farms comprise a "fermentation continuum system" may include the placing the following layers over the shelves' beds: (i) a solid-state fermentation substrate>(ii) a biodegradable cellulosic paper>and (iii) a selective and nanobiocide scaffold, which we have called the "sandwich-type fermentation process." Also, a cover is placed vertically around the shelves to regulate moisture levels and oxygen and carbon dioxide gas concentrations (FIG. 8).

An example of this process is described as follows:

Room Filling:

once the substrate completes its incubation cycle in the tunnel, it may be emptied using a pulling winch and then transported by truck to the growing rooms at the mushroom farm. In these rooms, the filling machine fills each bed with the substrate, which may be well-homogenized and distributed on the bed. Special attention is given to: i) the amount of substrate per square meter ($m^2$) and ii) the compaction, height uniformity, and the flat surface of the filled substrate that may later result in the uniform growth of the fungal mycelium within and on the scaffold. The substrate profile on the shelves' bed can vary between a target height (e.g., between about 5 and 25 centimeters in height, preferably between about 5 and 10 centimeters, etc.). Compared to the conventional production of edible mushrooms, where a height of 25 centimeters is conventionally used, this means substantial savings in the organic substrate in the mycotextiles large-scale production.

Positioning of Cellulosic Paper:

once the filling procedure of the organic substrate is achieved, the biodegradable layer (e.g., cellulosic paper) may be placed under the scaffold. This biodegradable component helps equalize mycelium colonization within and on the scaffold, preserving adequate moisture in the organic substrate and facilitating the harvest process. The cellulosic paper can be correctly positioned to avoid the irregularity of the filled bed, keeping a well-homogeneous condition that allows correct mycelium growth within and over the scaffold, promoting total colonization as fast as possible.

For example, eco-friendly cellulosic papers were directly evaluated in a pre-fermented solid-state fermentation substrate (SSFS), prepared as described. Once the substrate has been filled into the bed following the mentioned requirements, it may be covered with cellulosic paper, which may be moistened entirely with water before placing it. Different types of cellulosic papers were analyzed, such as paper craft with different grammages (50, 75, and 100 g) and glassine paper (also called kite paper craft or tissue paper). The colonization on the paper was photographically recorded every 2 days until the 14 days of incubation in darkness at 28° C. The mycelium colonization percentages were calculated using Image J and plotted using Graph Prism v10.0.

The results showed that the 75 and 100 g craft paper presented little colonization of the mycelium (less than 50%), but not with the 50 g craft paper, in which a rapid and homogeneous colonization of 100% was observed. However, the best results were obtained using the glassine paper, achieving the best colonization on the scaffold, correct substrate moisture preservation, and improved harvest case. Thus, some biodegradable layers (cellulosic papers) may be more beneficial than others. For example, papers that are very thin and smooth and air- and oil-resistant (and in some cases have a neutral pH) may be preferred, e.g., having a 0.1 mm and 1 mm thickness.

Although it has been suggested to embed a porous intermediate membrane, made of a fungus-resistant polymer, on top of a solid substrate (sec, e.g., U.S. Pat. No. 10,687,482 and U.S. Publication No. US 2020/0196541), these have also required the use of a guiding force, e.g., electrical actuation, to guide the microorganism's growth direction.

Described herein are porous intermediate membranes including a biodegradable material, such as cellulosic paper (e.g., craft paper and/or glassine paper) and not in a fungus-resistant polymer. These methods also include impregnating the scaffold (without using electrical actuation to guide the growth direction of the mycelium within and on the scaffold). For example, craft paper 50 g or glassine paper (e.g., thin, about 0.1 and 1 mm, biodegradable papers) may be used as a biodegradable and eco-friendly component in the fermentation stage of the bioprocess for mycotextiles production in mushroom farms.

The Positioning of a Selective and Nanobiocide Scaffold:

Once the cellulosic paper is placed on the organic substrate, a selective and nanobiocide scaffold (as will be discussed in the following section) is placed over the cellulosic paper surface. The positioning of this innovative scaffold may provide: i) a high density and homogeneity of mycelial colonization and ii) a powerful strategy to fight against environmental contamination (e.g., species of fungi belonging to *Aspergillus, Penicillium, Fusarium, Neurospora, Cladosporium, Trichoderma* genus, and hard-to-eradicate species of bacteria such as multi-resistant *Bacillus* sp., among others species) using different schemes of biocide nanoparticles (AgNPs, CuNPs, etc.).

The Positioning of a Cover Foil Around the Shelves:

Once the innovative scaffold is well-positioned, an evaporation-limiting cover (e.g., a perforated or not-perforated cover foil) may be vertically placed around the shelves to keep the appropriate moisture, oxygen and carbon dioxide levels in the fermentation continuum system: solid-state fermentation substrate>an eco-friendly cellulosic paper>a selective and nanobiocide scaffold inside shelves (FIG. 8).

The cover (e.g., perforated or not-perforated cover foil) may be placed vertically around shelves to create an air chamber and gas exchange between fungal mycelium and the surrounding atmosphere. This layer may be removed each time a treatment is applied (e.g., water, growth inducers or in situ nano-crosslinking application). Every time the cover (e.g., foil) is removed to carry out these applications, there will be a refreshing of the micro atmosphere of the chamber, the release of the $CO_2$ concentrated in it, and the oxygen exchange, which is vital for the development of aerial mycelium. Parameters of temperature, oxygen, carbon dioxide and moisture may be automatically measured.

The cover (e.g., perforated or not-perforated cover foil) may be a reusable polyethylene film of low density with 0 to 40 microns of thickness within 0 to 200 micro-perforations per sqft, depending on the moisture balance between the growing room and the substrate. A reusable cover (e.g., perforated or not-perforated cover foil) may be used as a component in the fermentation stage of the bioprocess for mycotextiles production in mushroom farms.

Incubation Conditions in the Growing Room:

despite the typical range of temperature being between about 25 and 30° C., the environmental condition (e.g., the temperature variable) may be adjusted according to the physiological characteristics of the working fungal strain to grow in extreme conditions (e.g., extremophilic, thermophilic, psychrophilic, mesophilic, or hyperthermophilic skills of the unique Gold Standard fungal strains), but keeping moisture (e.g., about 95 to 100%) and $CO_2$ levels (about 20.000 ppm to 50.000 ppm) as high as possible to induce an appropriate aerial mycelium growth. In this case, the same fungus will provide the $CO_2$ in the growing room's atmosphere, mediated by respiration. The incubation time in the growing room under Spora's industrial scaling-up in this patent, and using a Gold Standard (e.g., SCC-0006) strain, may be between about 7 and 10 days, offering at least 3 to 4 monthly harvests and 36 to 48 annual harvests. Considering that the typical cycle of main edible fungi growth (e.g., *Agaricus bisporus*, etc.) in mushroom farms requires at least 4 to 5 weeks, this short incubation time to produce mycotextiles described herein ensures scalability, return of capital, and rentability to the new mycotextiles farmers emerging in the mycelium-based textile business.

Method for Gentle Crop Harvesting in Large-Scale Agricultural Environments:

The methods described herein differ from the Dutch system mushroom farming shelf emptying process and are particularly suitable for large-scale agricultural environments. In particular, these methods may address the challenges associated with post-harvest processes while ensuring the gentle and efficient extraction of the long mycotextiles mats.

In the realm of controlled environment agriculture, there exists a need for efficient and gentle crop harvesting methods, especially in scenarios where the cultivation shelves can extend to considerable lengths, sometimes reaching up to 15 to 30 meters. Conventional harvesting methods often risk damaging harvest and the underlying mycelium, making developing an innovative solution that addresses these challenges imperative.

Figure 9:
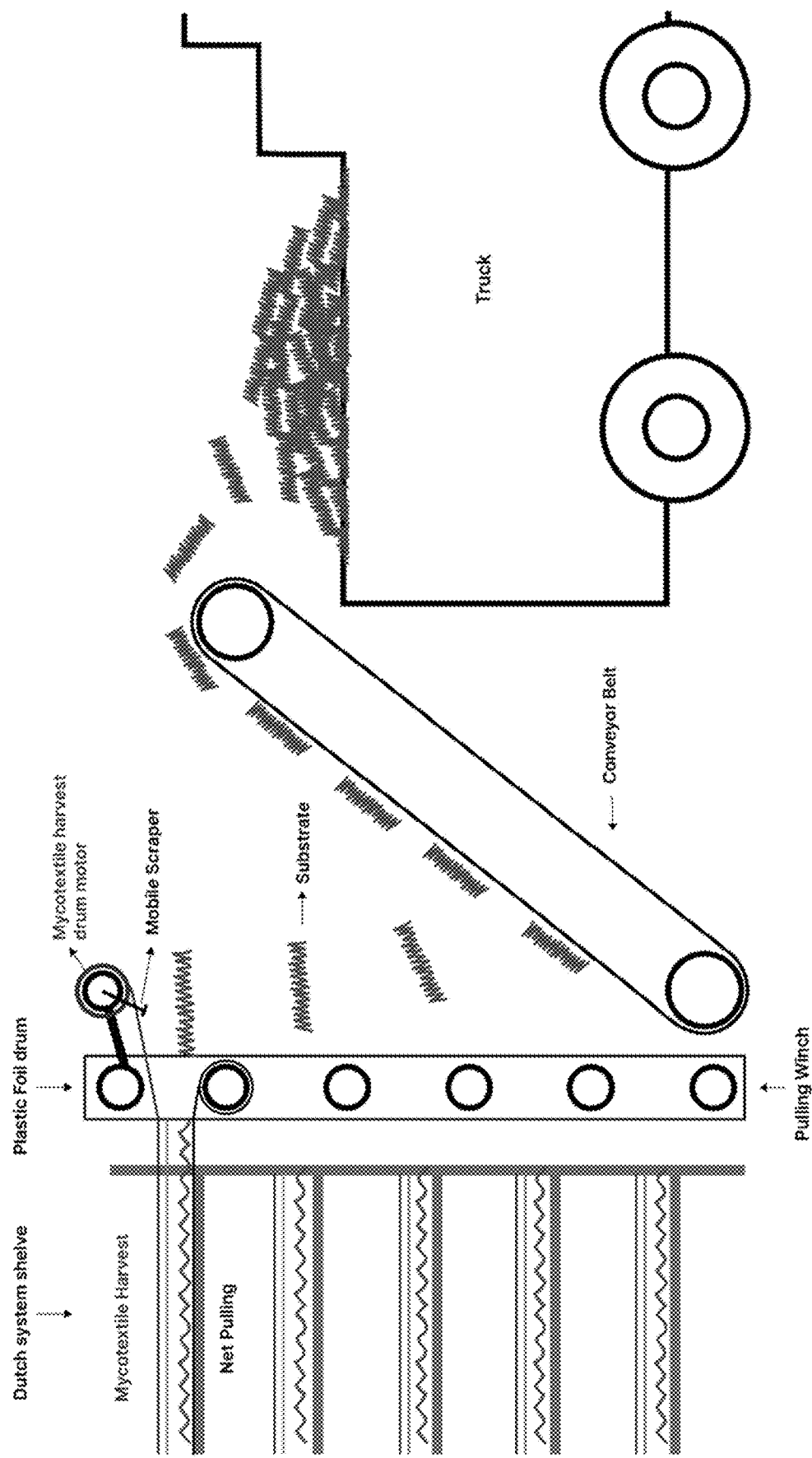
FIG. 9 shows an example of mycotextiles industrial harvest in mushroom farm facilities (showing a side view of the shelf and equipment).

The methods described herein may allow harvesting shelves at virtually any level, in which scaffold crops occur while emptying the growing room in an automatized way by a pulling winch, a net bellow substrate, a conveyor for substrate disposal on a truck, a plastic foil drum to prevent the mycelium from becoming attached to itself while rolling for harvest and may keep the apparatus (and mycelium) clean and protected a mobile scraper, and a drum motor to roll the scaffold once harvested as shown on FIG. 9.

In this example, a drum motor gently applies force at the pulling winch to extract the mycotextile while the net below the substrate makes the bed move through the harvest zone. While the mycotextile goes to the drum, a mobile scraper takes place by removing any attached substrate. Simultaneously, it wraps the harvested material in a plastic foil to safeguard its surface. The role played by the cellulosic paper is central to the success of this operation because it prevents the substrate from adhering to the biotextile material (e.g., under the scaffold) and ensures a gentle and non-damaging harvest of the mycelium FIG. 9. Once the bed is harvested, the harvesting drum is replaced by a new one to harvest the next shelf bed. The scraper is configured to attend to different bed heights. Described herein are methods for harvesting for mycotextiles production in mushroom farms.

The colonized substrate disposition may continue until it is used as a byproduct to give added value to other bioprocess and industries developed and described herein, such as to be used as organic fermented fertilizer for sustainable and biodynamic agriculture, activated carbon source, packaging, biofilters, insulating elements, mycotecture approaches, among others, or to be used as an exhaust pre-inoculum to design other down-stream bioprocesses with mycoremediation purposes.

Preparation of Selective and Nanobiocides Scaffolds
Preparation of Scaffolds with Nanobiocide Properties:

Also described herein is the preparation of nanobiocide scaffolds to mitigate competitive microorganisms under non-innocuous environments.

To create mycelium-based leather, a suitable fungus may have specific properties, including the ability to produce dense, interconnected networks of mycelium that can be grown on organic substrates such as agricultural waste. In the production of mycelium-based leather, the choice of scaffold is one important factor in determining the quality and properties of the final product. A scaffold is a structure or material used to support mycelium's growth and shape it into the desired form, and it also provides the mechanical properties for a particular application. However, the placement on the scaffold under non-innocuous environments, such as the ones existing in open and large-scale mushroom farm facilities, represents a significant challenge related to the presence of competitive microorganisms that could hinder aerial mycelium growth by competing for nutrients and space. Therefore, an efficient strategy to prevent this superficial contamination should be used when producing mycelium-based textiles in open and large-scale facilities. Besides the mechanical support, the scaffold could also act as a barrier to environmental contamination, and nanotechnological tools represent a promising approach.

Antimicrobial textiles may be used to fight against microbial contamination in non-innocuous environments. The decoration of textiles with silver (AgNPs) and/or copper (CuNPs) nanoparticles with antimicrobial properties has been widely reported. However, these references do not suggest the application of such nanoparticles in a scaffold, particularly for the industrial production of mycelium-based textiles. Functional textiles with nanobiocides could be obtained by two means: 1) the ex-situ approach consisting of first forming metal nanoparticles separate from the textile and adding them by dipping or spraying, and 2) the in situ approach in which nanoparticles are synthesized directly on textiles by dipping the textile into the silver precursor and followed by the application of the reduction agent.

In the examples shown herein, two different scaffolds with different treatments were used: (a) scaffold 1—not pigmented and activated—, (b) scaffold 2—not pigmented and not activated—, and (c) scaffold 2—pigmented and not activated—.

Washing of the Scaffolds:

The scaffolds (Scaffold 1 or Scaffold 2) were washed with water at room temperature for 30 min using a washing machine (e.g., without soap or surfactants added), then they were centrifuged for 15 min and dried at 70° C. for 20 min.

Activation of Scaffold 1:

The scaffold (only Scaffold 1) was immersed in a 2 w/v % aqueous citric acid solution for 60 minutes in a sealed tray at room temperature. The excess water was then drained off. Finally, the scaffolds were cured at 160° C. for 10 min. Citric acid activation was not applied for the other scaffolds (e.g., Scaffold 2).

Figure 10A:
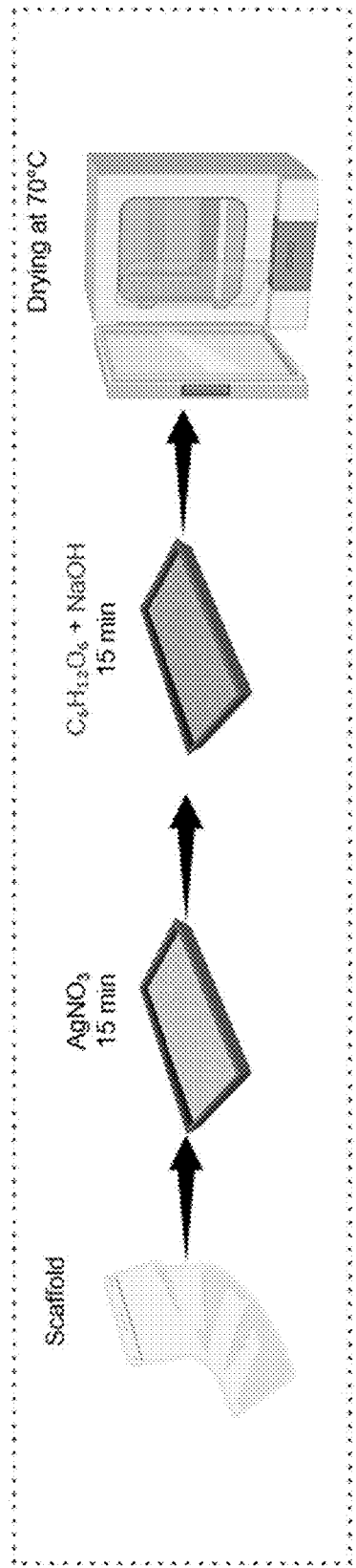
FIGS. 10A-10B illustrate examples of the synthesis of the biocides nanoparticles.

In Situ Synthesis of Silver Nanoparticles (AgNPs):

A given volume of $AgNO_3$ solution (1 mM or 5 mM of initial concentration) was placed in a vessel; then, the scaffolds were fully immersed (in the dark) in this solution for 15 min. The scaffolds were removed, and the excess of $AgNO_3$ solution was allowed to drain until the liquid stopped dripping. A glucose solution in a caustic condition ($C_6H_{12}O_6$/NaOH) was added to a second vessel at concentrations of 5 mM or 10 mM. Then, the scaffolds were transferred to this vessel and left submerged for 15 min. At this point, the scaffold will acquire a brownish color. The scaffolds were removed from the chemical bath, and the excess liquid was allowed to drain. Finally, each scaffold was dried at 70° C. for 20 min. This synthetic route is shown in FIG. 10A.

Figure 10B:
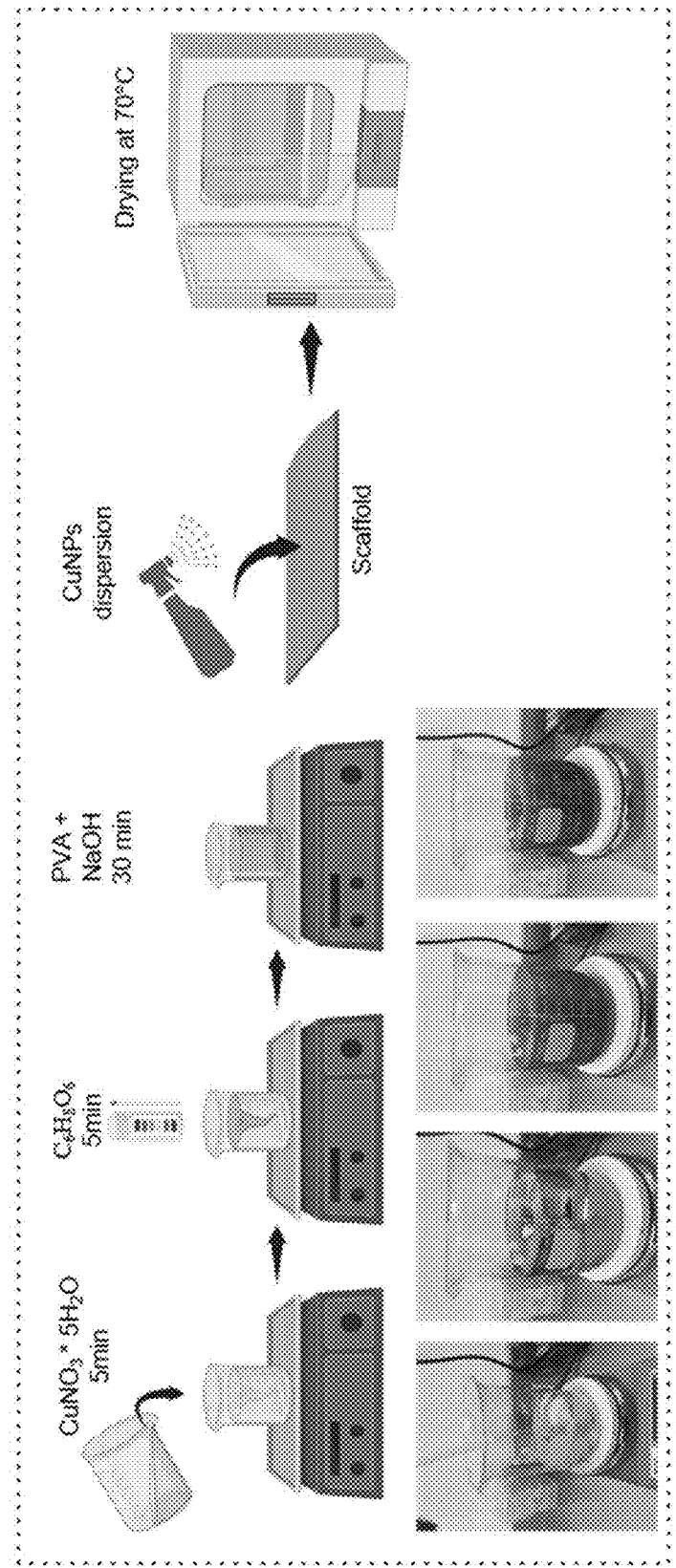

Ex-Situ Synthesis of Copper Nanoparticles (CuNPs):

In a 2-liter vessel, 500 mL of a 0.05 M $CuSO_4*5\ H_2O$ solution was added under stirring, then 500 mL of a 0.5 M glucose ($C_6H_8O_6$) solution and 25 mL of a PVA solution was added slowly. at 2.5 w/v %. The pH was adjusted to 4 using drops of a 7 M NaOH solution and stirred for 30 min at room temperature. Once the nanoparticles were synthesized (evidenced by the color change), they were sprayed (20 mL) on the previously washed scaffolds. Finally, each scaffold was dried at 70° C. for 20 min. This synthetic route is shown in FIG. 10B.

Antibacterial Tests:

An ampicillin-resistant *Escherichia coli* culture (Coliforme group bacteria) and an isolated, very hard-to-eradicate *Bacillus* strain (molecularly identified as *Bacillus subtilis*) were used for the bacterial assays. The cultures were adjusted to 10–8, and 100 µl of this was plated on Mueller-Hinton agar. Then, a piece (diameter=1 cm2) of the scaffolds with the biocide nanoparticles (e.g., AgNPs or CuNPs) was deposited on the Petri dish with Nutritive Agar and/or LB culture medium with the bacteria freshly sown by exhaustion technic with a sewing loop. Each plate was incubated overnight at 30 and 37° C. for *B. subtilis* and *E. coli* strains, respectively.

Antifungal Tests:

The scaffolds decorated with Ag or Cu nanoparticles were placed onto a 150 mm Petri dish containing solid-state fermentation substrate (SSFS). The (open) plates were distributed in the growing rooms for 3 h. Finally, each plate was closed and incubated at 28° C. and 40% relative humidity for 7 days.

Figure 11A:
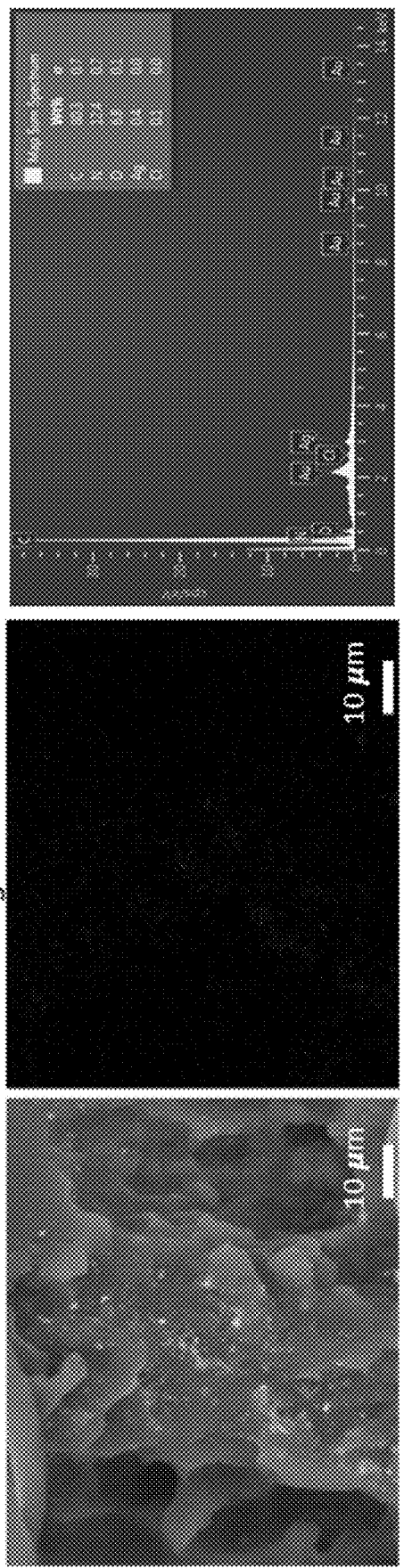
FIGS. 11A-11B show examples of Scanning Electron Microscopy (SEM) images, EDS (energy dispersion spectroscopy) spectrums and metal mapping of the nanobiocide scaffolds.

Effect of Scaffolds with Nanobiocide Properties in the Control of Competitive Microorganisms:

in the case of silver nanoparticles (AgNPs), an in situ reduction strategy was chosen to deposit the particles directly onto the scaffold fibers. Here, glucose (reducing agent) was applied after the silver precursor had been deposited on the scaffold. During the treatment with the reducing agent, the scaffold changed from a white color to a brownish color related to the presence of the AgNPs (control experiments using immersion on $AgNO_3$ or glucose alone didn't cause any change in the material). As shown in the SEM image in FIG. 11A, scaffold 2 prepared from a starting concentration of 5 mM of $AgNO_3$ has nanoparticles of less than ten nanometers adhered to the fibers' wall. The silver mapping using EDS revealed the presence of these nanostructures along the fibers, and the energy spectrum showed a concentration of 0.4 wt. % in this area (approx. 2 wt. %/mm$^2$).

Figure 11B:
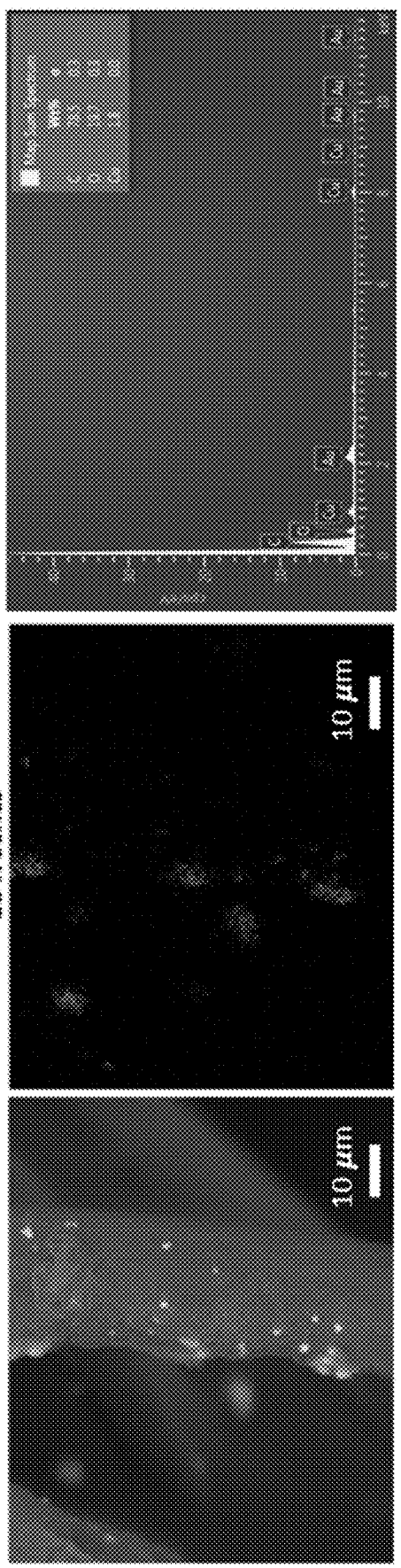

For the copper-based nanostructures, the strategy chosen was the synthesis ex-situ followed by the application on the scaffold using a spray-dry technique. In the case of Scaffold 1, after the infusion of the nanoparticles, the scaffold turned to a pale bronze color. The SEM image in FIG. 11B using EDS shows more defined nanoparticles. The spectrum in the analyzed area shows a higher concentration of copper of approximately 1.8 wt. % (approximately 9 wt. %/mm$^2$). Applying either of the two strategies (e.g., AgNPs or CuNPs) results in a considerable concentration of nanoparticles in the fibers, which is higher in the case of CuNPs.

Figure 12:
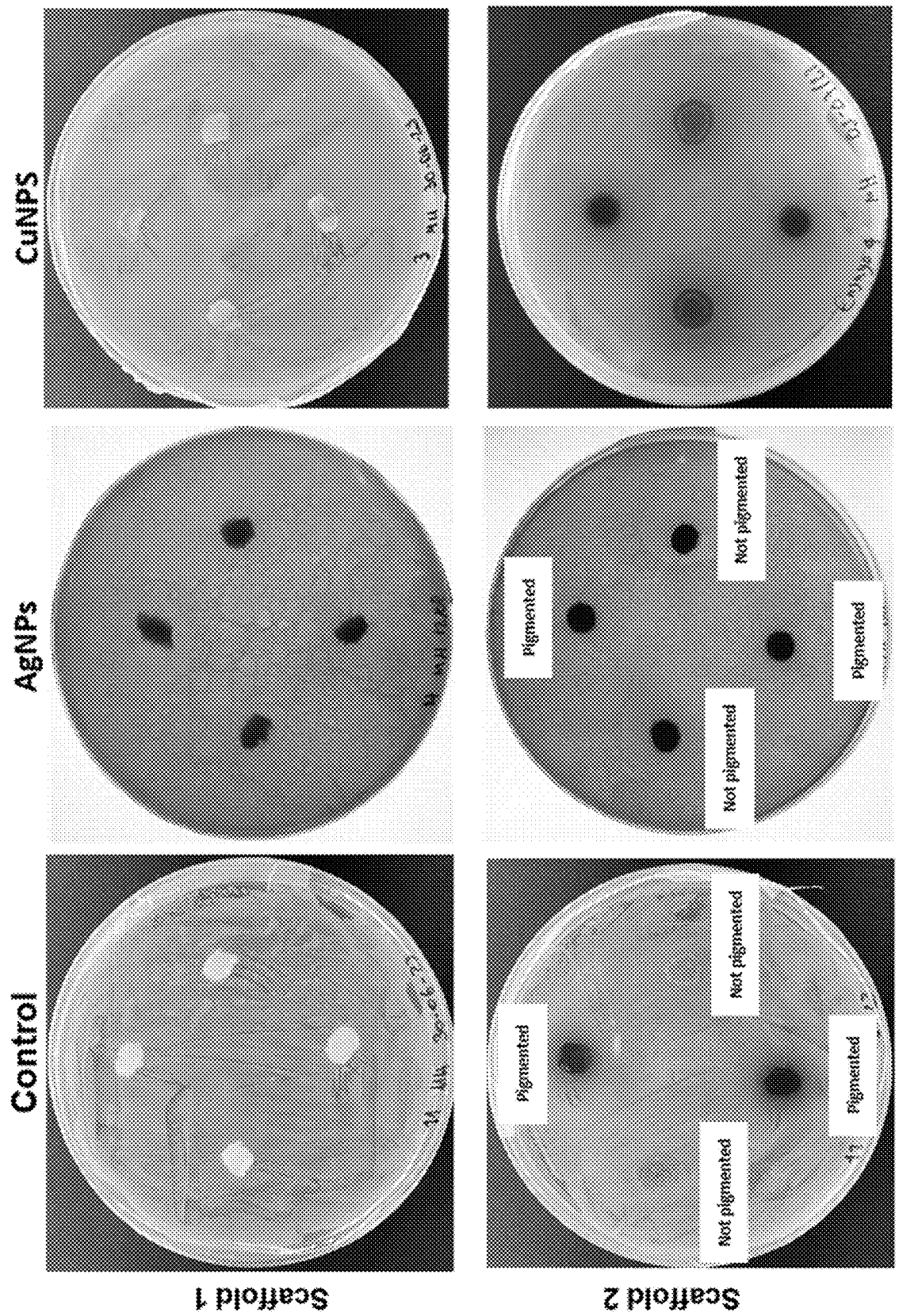
FIG. 12 shows examples of antibacterial properties of scaffolds. Petri dishes after incubating an ampicillin-resistant *Escherichia coli* culture in the presence of the nanobiocide scaffolds.

The results of the antibacterial test are shown in FIG. 12. The scaffolds without nanoparticles (used as positive control) did not show inhibition halos, indicating the absence of biocide activity. Scaffold 1 did not show antibacterial activity either with silver or copper nanoparticles. Moreover, in the case of Scaffold 1 infused with copper, after the fermentation period, the color changed from brownish to greenish, suggesting that a copper re-oxidation occurred during the process, possibly caused by the metabolic activity of the microorganism. Scaffold 2 (pigmented and non-pigmented) revealed a slight inhibition halo in the case of the presence of CuNPs, suggesting the nanoparticles were more bioavailable in this structure. It is highly possible that these NPs were located more superficially due to the approximation used for its deposition (spray-dry). However, in the case of AgNPs, an antibacterial effect was not observed at the tested concentrations.

Figure 13:
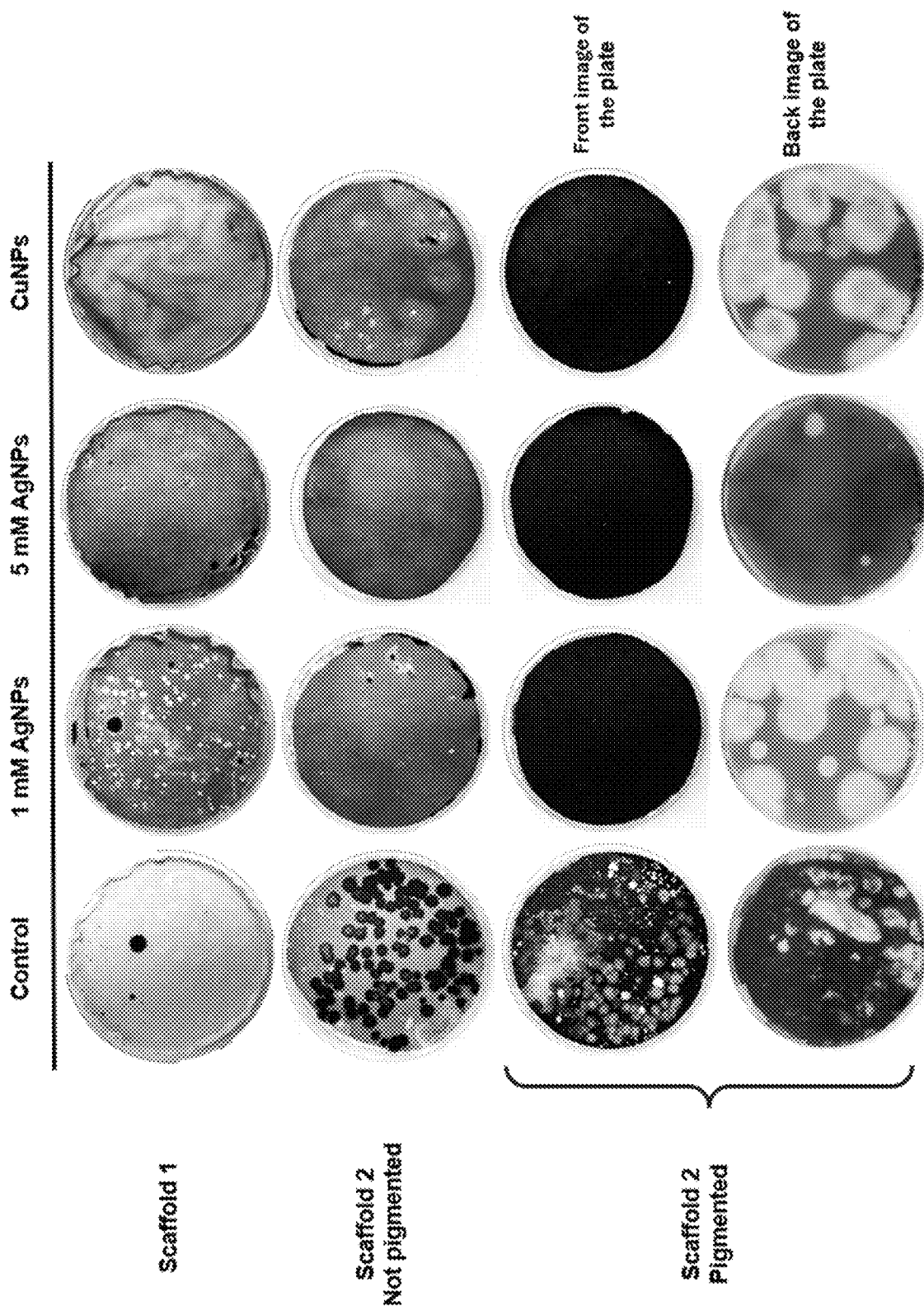
FIG. 13 illustrates an array showing an example of antifungal properties of the tested scaffolds. Culture plates containing nanobiocide scaffolds after incubation with fungal contaminants inhabiting a typical mushroom farm growing room.
Figure 14A:
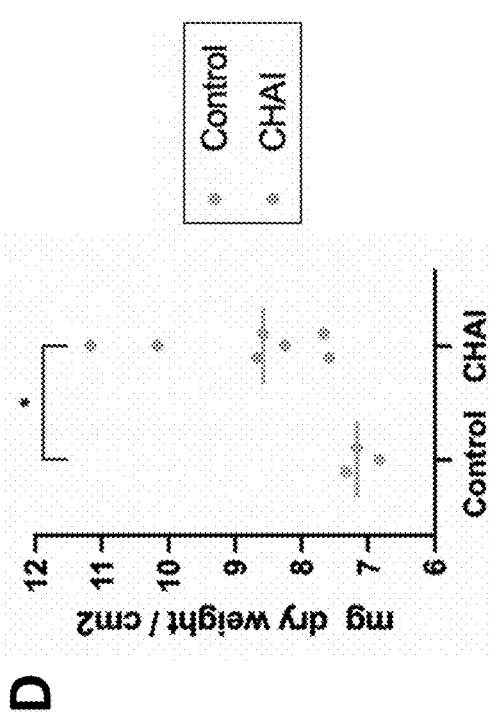
FIGS. 14A-14D illustrate examples of the effect of diverse cellulosic papers and inducers of growth on mycelium colonization in mats freshly harvested. Significant difference compared to control was obtained with BIOrganic CHAI (FIGS. 14A to 14C) when glassine paper was used as cellulosic paper. The scaffolds were massed at the beginning of the experiment and after the harvest, and the mycelium biomass per area (mg dry weight/cm2) was calculated (FIG. 14D). A T-test was performed to determine the significant difference with a *: p-value>0.05.
Figure 14B:
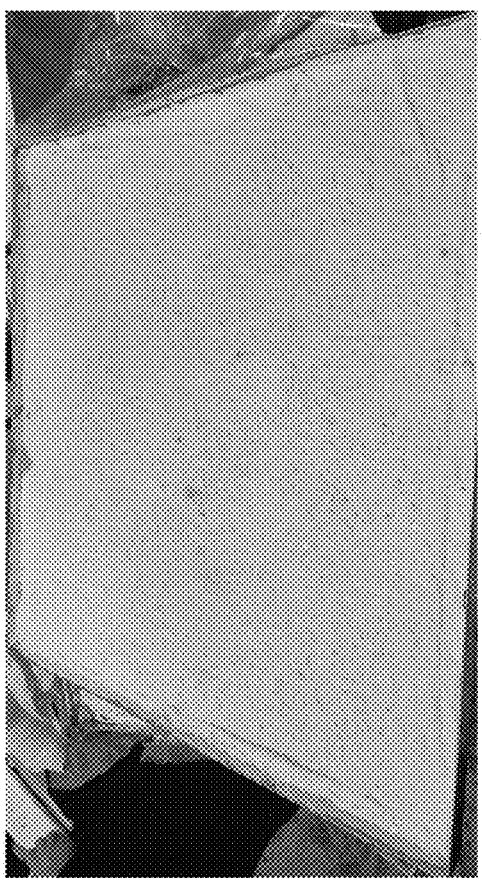
Figure 14C:
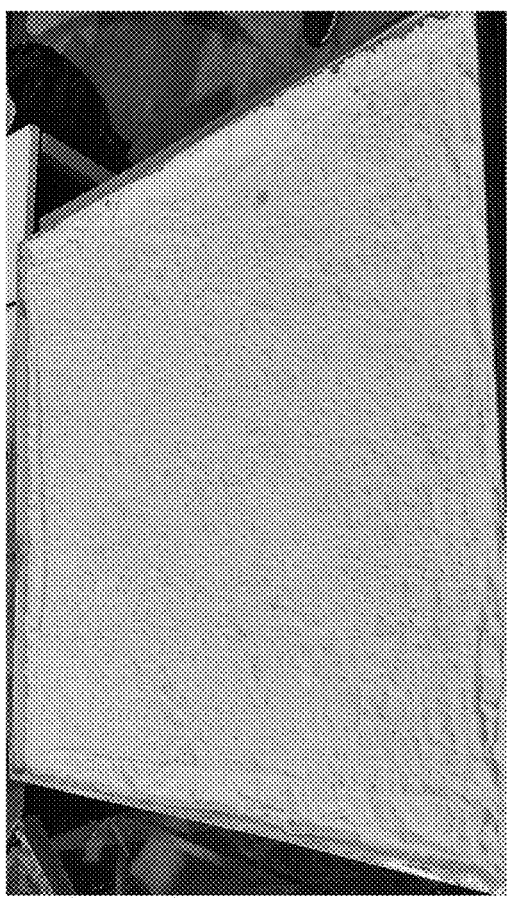
Figure 14D:
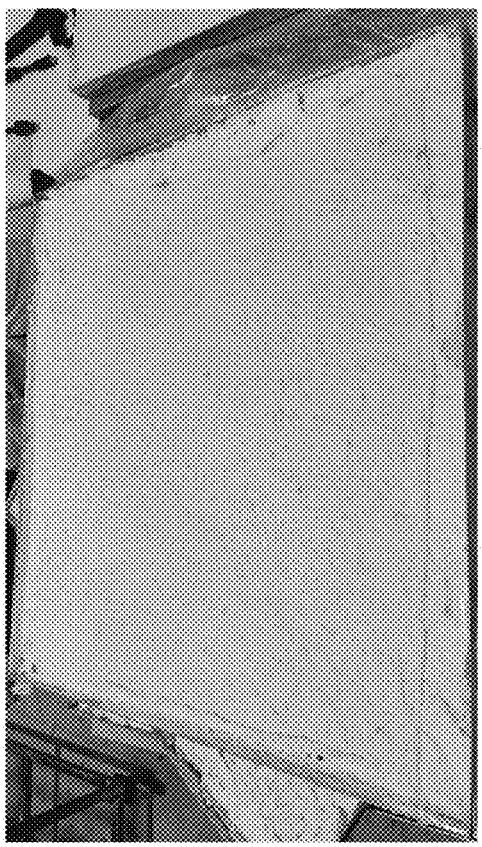

The results of the antifungal tests are displayed in FIG. 13. In the first row, it appears the culture plates that were incubated using the scaffolds without nanoparticles as a positive control. After 8 days of incubation, several fungal colonies were observed in the control samples, which is expected in non-septic conditions. As observed in the second and third rows, when AgNPs are used as nanobiocide (1 or 5 mM), considerable good activity was observed at 5 mM. In the case of the pigmented Scaffold 2, no competitive fungal colonies were observed (observing the front and the back of the culture plate), indicating that the biocide scaffold effectively acted as a barrier for environmental fungal contaminants. When using copper as nanobiocide, we did not observe the growth of competitive fungal colonies in Scaffold 1. However, a change in the color was also observed from brownish to greenish, indicating a re-oxidation of copper. Some colonies are still developed in Scaffold 2 (pigmented or not-pigmented).

Therefore, the silver nanobiocide effect can be observed above 5 mM, and the SCC-0006 strain can grow at higher concentrations of silver (e.g., up to 15 mM). However, using copper, the best effect was observed in Scaffold 1, considering the re-oxidation during the process.

Preparation of Selective Scaffolds by Infusing Nutritional Additives into the Scaffolds:

beyond providing the mechanical properties of the final product, our unprecedented strategy to grow mycotextiles in mushroom farms is based on obtaining a super innovative scaffold containing nanobiocide activities and selective nutritional additives as growth inducers. Once the scaffold has been activated and prepared with nanobiocide properties to mitigate competitive contaminants microorganisms (e.g., Ag or Cu nanoparticles strategies), it may be helpful to ensure the optimal rapid growth of the mycelium within and on it. The race for space and nutrients may become furious in this bioprocess step. As used herein, a selective scaffold may refer to a nutritionally enriched scaffold that promotes the growth of the fungal strain of interest (e.g., SCC-0006).

The choice of nutritional additives is according to the physiology, primary and secondary metabolism characteristics, genomic characteristics, extracellular enzymatic mechanisms, extremophilic skills, and the ability of the working fungal strain to use each of them or a combination of them as growth inducer sources. Also, the growth inducers or additives were designed based on the "genome mining" studies using strong bioinformatic tools and several "key" encoding genes present in the SCC-0006 genome. The experiments were focused on obtaining a vigorous and profuse mycelium of the Gold Standard, SCC-0006, within and on different scaffolds.

The inducers evaluated were the following: ethanol 20%, ethanol 70%, BIOrganic CHAI, sodium lignosulfonate, alginate, and copper sulfate ($CuSO_4$). In all cases, the nanobiocide scaffolds were submerged in the different additives for about 1-10 minutes (or longer), and the excess was removed. Later, the selective and nanobiocide scaffold was placed on cellulosic paper (e.g., craft paper 50 g or glassine paper as bioprocess components) over the colonized substrate on each bed in the growing room. Finally, the cover (e.g., foil) was placed vertically on the shelves to start the "sandwich-type fermentation process," as described above.

Once incubation is started, every two days, the same nutritional additive may be added by atomization (spraying) on the scaffolds until its complete colonization in a proportion of 0.1 to 10 mL per $ft^2$, preferably between 1 and 5 mL per $ft^2$. Considering a frequency of application of every two days and a period of incubation between 7 to 10 days, 3 and 4 applications are performed in each batch, respectively. The total volume of growth inducer in each batch of 7 or 10 days was estimated between 3 to 15 mL per $ft^2$ or about 4 to 20 mL per $ft^2$, respectively, which is negligible, representing a shallow water footprint compared to the entire process. However, the volume to be added will depend on the structure and chemical composition of the scaffold, its absorption capacity, and the characteristics of the working fungal strain selected, which may be added without excess, allowing a homogeneous and aggressive growth of the mycelium.

The treatments were evaluated in multiple combinatory experiments to determine the effects of different combinations of cellulosic paper and growth inducers. The mycelium colonization percentages were calculated using Image J and plotted using Gradph Prism v10.0. The more significant differences concerning the control (e.g., distilled water application) were observed with BIOrganic CHAI and ethanol 20% when glassine paper was used as cellulosic paper. At the same time, sodium lignosulfonate showed the best induction of colonization when paper craft 50 g was used (FIGS. 14A-14D).

Sodium lignosulfonate or lignosulfonic acid, sodium salt, is a high lignin content powder widely used as a de-foaming agent in paper production and has multiple applications in other industries. The SCC-0006 strain is a ligninolytic fungus with a highly active lignin-degrading enzymatic system (LEDS), with four genes encoding isoenzymes laccases found in its genome, which are associated with lignin-degrading exoenzymes system (LDES) in fungi, the degradation of a wide range of recalcitrant, toxic and contaminant compounds, plastics, crude oil, hydrocarbons aromatics polycyclic (HAPs), agrochemicals, among others. Also, many Open Read Frames (ORFs) encoding hypothetical alcohol dehydrogenase have been found in the genome of SCC-0006. Ethanol or ethyl alcohol is an aliphatic organic chemical compound with a hydroxyl functional group, forming part of the alcohol family, which several fungi can use as carbon and energy sources. Although there is a high induction of aerial mycelium development on scaffolds, great care should be taken to avoid dehydration of the mycelium, whereby it is recommended to apply less frequently or only apply it to the scaffolding at the beginning of the process.

BIOrganic CHAI represents a variant of the referred BIOrganic foam, which has been adapted to achieve a scalable, efficient, and cost-effective transition to the mushroom farm for large-scale production of mycelium-based textiles. Instead of making a mixture with a 1:1 ratio of water and colonized organic substrate supplemented with specific amendments to obtain a slurry, as was described to obtain a suitable BIOrganic foam. In this case, the modifications to obtain a BIOrganic CHAI are the follows: (1) A mixture of distilled water with a non-colonized substrate in a proportion of 5 to 40%, preferably between 10 to 30%; and (2) A mixture of distilled water with a fresh and highly colonized substrate in a proportion of 5 to 25%, preferably between 10 to 20%. In both cases, the mixing was conducted in an industrial blender for 5 to 10 minutes at environmental temperature. Subsequently, the mix is filtered to retain the particulate and solids in suspension, and the supernatant, which has a dark brown color (e.g., BIOrganic CHAI), is separated and stored in amber glass bottles to be autoclaved at 121° C. and 15 psi for 30 minutes. In all cases, the nanobiocide scaffold was submerged in the growth inducer solution for 1-10 minutes, and the excess was removed before it was placed on the cellulosic paper.

Any of these methods may include the use and preparation of an inducer of growth and its application in a nanobiocide scaffold to obtain a selective and nanobiocide scaffold for the industrial production of mycelium-based textiles in mushroom farms. Also, the combination of eco-friendly cellulosic papers (e.g., glassine paper and craft paper, etc.) with different growth inducers described herein is particularly potent.

Establishment of the Conditions for the In Situ Nano-Crosslinking Strategy

The first evidence to determine the effect of nanoparticles on mycelial growth was in laboratory conditions. It is known that certain types of nanoparticles can stimulate mycelial growth and promote the formation of longer and denser hyphae. This phenomenon is attributed to the physical properties of the nanoparticles, such as their high surface area and ability to interact with the enzymes and proteins in the mycelium cell wall and also by acting as nucleation points. For example, silver and copper nanoparticles promote mycelial growth in various types of fungi by acting as metabolism stimulants, increasing the production of enzymes and growth hormones. In addition, nanoparticles can alter the permeability of the fungal cell membrane, facilitating the entry of nutrients and the removal of wastes, thus promoting more efficient mycelial growth. However, some nanoparticles may have inhibitory effects on mycelial development. For example, zinc oxide and titanium dioxide nanoparticles have shown antifungal properties by interfering with metabolic pathways, as in *Candida albicans* and *Fusarium oxysporum*. These nanoparticles can negatively affect the permeability of the cell membrane, causing oxidative stress and DNA damage in fungi. It is important to highlight that the effect of the nanoparticles on mycelial development for mycotextiles may vary depending on the intrinsic characteristics of the working fungal strain and the type of nanoparticle used. Furthermore, nanoparticles' physical and chemical properties, such as size, shape, and concentration, may influence the mycelial growth. For this reason, the positive or negative effects should be initially estimated at the laboratory scale in the promising strains highlighted here.

Zein Nanoparticle Preparation:

an antisolvent method was used to obtain 200 nm spherical zein nanoparticles. For this method, 100 g of ground and sieved yellow maize between 140 and 500 μm were mixed with a 70% v/v solution of ethanol and water. The mixture was left under continuous stirring at 70° C. for 1 h. The mixture was filtered, and the resulting yellow solution was slowly poured (in the form of a thread) into distilled water in a volumetric ratio of 1:3. The formation of a very fine white solid was observed, which was recovered by centrifugation at 10,000 rpm for 10 min.

Zein-Functionalized Nanoparticles:

To obtain the zein-functionalized $SiO_2$ spheres or IO nanorods, 1 g of the nanoparticles were weighed and dispersed in 100 mL of absolute ethanol. 0.15 g of the synthesized zein was weighed and dissolved in the previous mixture; the pH of the mixture was brought to 4 (HCl or NaOH should be used to adjust the pH) and left stirring at room temperature overnight. After this time, the remaining solid is centrifuged and washed twice with distilled water to remove excess of unbonded zein molecules. This protocol could be applied to any other alcohol or water-soluble protein, including phyto-proteins, phyco-proteins or myco-proteins.

Preparation of Culture Medium and Inoculation:

to prepare the culture media, 21 g of solid PBD medium (potato dextrose broth supplemented with 2% agar) is weighed into a flask and then dissolved with 250 mL of distilled water; the initial pH of each flask is recorded. Then, the flasks are autoclaved and later taken to a laminar flow hood where the sterile nanoparticles were previously placed. Then, the flasks were inoculated by sectioning 1×1 cm squares of a culture medium containing SCC-0006 (Incubation conditions: Sabouraud medium, 7 days of incubation in the dark at 28° C.). These portions are deposited in the flasks, followed by the previously weighed nanoparticles sterilized with UV light (320 nm, 14 W, 15 min). The flasks were placed in an orbital shaking incubator for 7 days at 28° C. and stirred at 230 rpm. Once the incubation time had been completed, the obtained biomass was separated using a funnel and a filter cloth. The flask's contents are poured out, and the separated biomass on the filter cloth is compressed with tissue paper to absorb the excess liquid medium. Subsequently, the wet biomass is placed in a previously weighed Petri dish and is taken to a drying oven at 30° C., where it is allowed to dry for approximately 72 h to record the weight of the dry biomass. The remaining liquid medium is collected to record the final pH. Each experiment is carried out by triplicate.

Results of Nanoparticles with Nano-Crosslinking Purposes on the SCC-0006 Growth.

Figure 15:
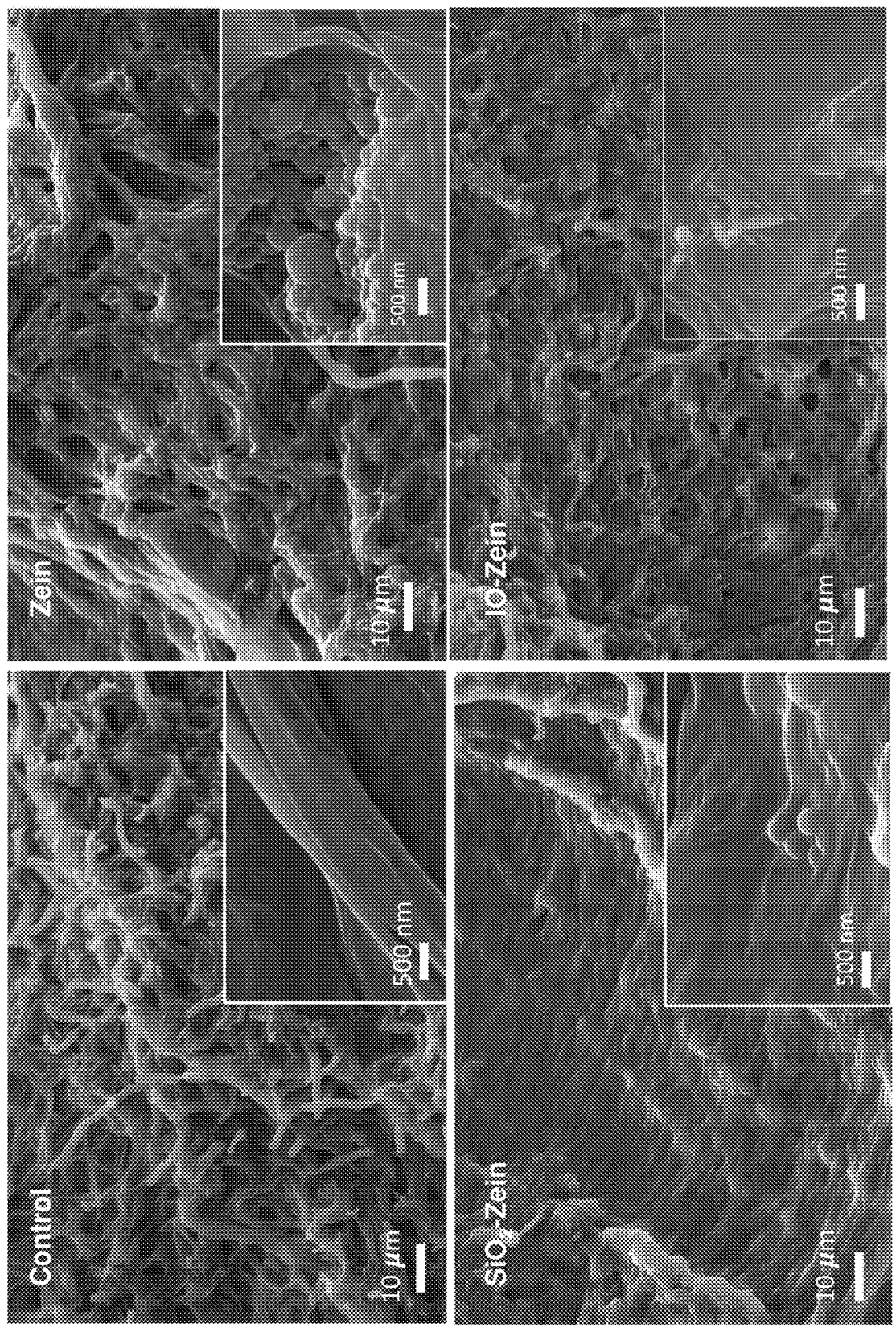
FIG. 15 shows Scanning Electron Microscopy (SEM) images using secondary electrons of the SCC-0006 strain growing in the presence of different nanoparticles (zein, SiO2-zein, IO-Zein). The scale bar in each main image corresponds to 10 micrometers (collected at 2 kX). For embedded images, the scale bar corresponds to 500 nm (collected at 50 kX).

Effect of the Type of Nanoparticles:

For these experiments, three types of nanoparticles (NPs) were evaluated: 1) spherical zein NPs; 2) spherical silica NPs functionalized with zein ($SiO_2$-Zein) and; 3) iron oxide nanorods functionalized with zein (IO-Zein). In all cases, 0.25 g of the nanoparticles were weighed in polystyrene trays and sterilized with UV light before being added to 250 mL of inoculated culture medium; that is, the working concentration was 0.125 wt. %. FIG. 15 compares the mycelium obtained by culture in a liquid medium after 7 days in the presence or absence of these nanoparticles. In the images at the top, the control (without nanoparticles) is compared with the sample obtained by adding spherical zein NPs. The images of the resulting mycelia obtained by using $SiO_2$-Zein NPs and IO-Zein NPs are displayed at the bottom of the image.

As seen in FIG. 15, the development of the mycelium is affected by the presence of the nanoparticles. The image corresponding to the control (without NPs) shows that, after seven days, the obtained biomass barely developed its hyphae since many amorphous areas are observed. The dry biomass collected for the control was 2.1±0.2 g/L. The sample obtained after incorporating zein spheres is a network of thicker and more cohesive hyphae with remaining amorphous areas. Zooming in at 50 kX magnification (as seen in the inset), some zein aggregates can be embedded in the mycelium network. In this case, the collected dry biomass slightly decreased to 1.6±0.1 g/L.

On the other hand, the sample containing the $SiO_2$-Zein spheres continues to be observed as amorphous, and, in this case, it was more challenging to detect the particles embedded in the mycelium. However, the collected dry biomass slightly increased to 2.8±0.6 g/L, which could be within the error range. Finally, in the presence of the IO-Zein nanorods, a morphology more similar to the expected dense network was observed. In this case, a considerable increase in the generated dry biomass of up to 6.1±0.5 g/L is observed, representing an increase of 2.9 times. The determination of the pH before and after the incubation did not show changes, considering that it starts from a pH value of around 5 units.

Effect of the Amount of Nanoparticles:

the most evident change in the mycelium network was observed by the incorporation of functionalized iron oxide nanorods (IO-Zein). Determining the maximum amount of NPs that could be added was performed similarly to the one described above but by changing the mass of nanoparticles. This is crucial because, due to the functionalization and the particle's anisotropy, they tend to agglomerate quickly, limiting the mass of IO-Zein that can be used. In this case, the effect of the solid was evaluated in a concentration range between 0.05 and 0.25% by weight. The corresponding scanning electron microscopy images are shown in FIG. 16. Based on the images, by incorporating 0.05 wt. % of NPs does not generate a marked change in the morphology as compared to the control sample. However, above 0.125 wt. %, a thicker and more interlocked hyphae was observed. Some incipient hyphae with approximate thicknesses of 1.3±0.3 μm are observed in the control sample. In the case of the biomass obtained by incorporating 0.125 or 0.25 wt. % of IO-Zein NPs, the hyphae present a variety of sizes ranging from 0.6 to 3.5 μm. From 0.125 wt. %, some nanoparticle aggregates trapped between the hyphal network cavities are observed.

Figure 17:
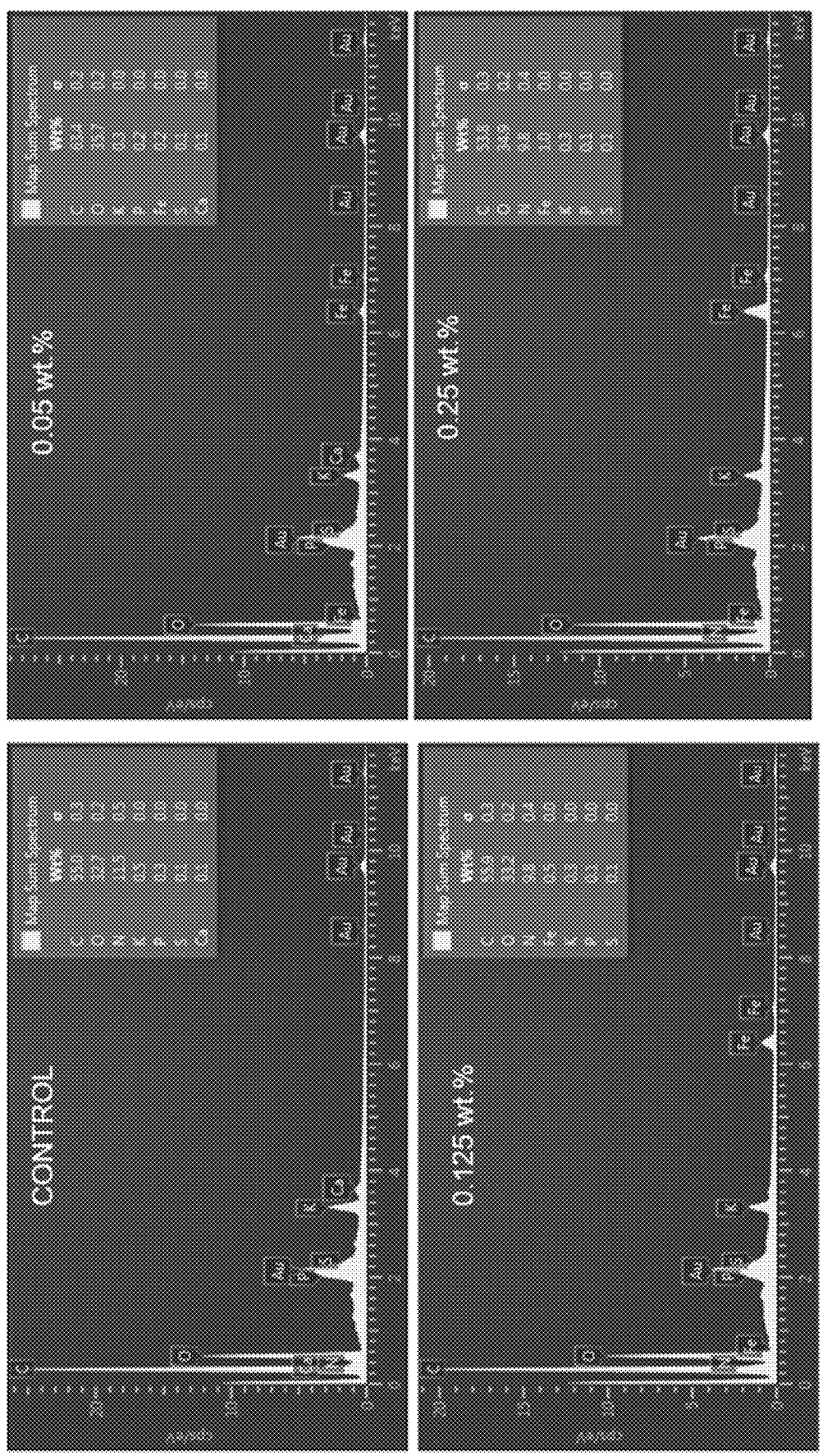
FIG. 17 shows EDS spectra of SCC-0006 grown in different concentrations of IO-Zein NPs. The tables shown as inserts indicates the percentages by weight with respect to the scanned areas. In addition to: C, O, and N, the control sample also shows elements such as potassium, phosphorus, sulfur, and calcium.
Figure 18:
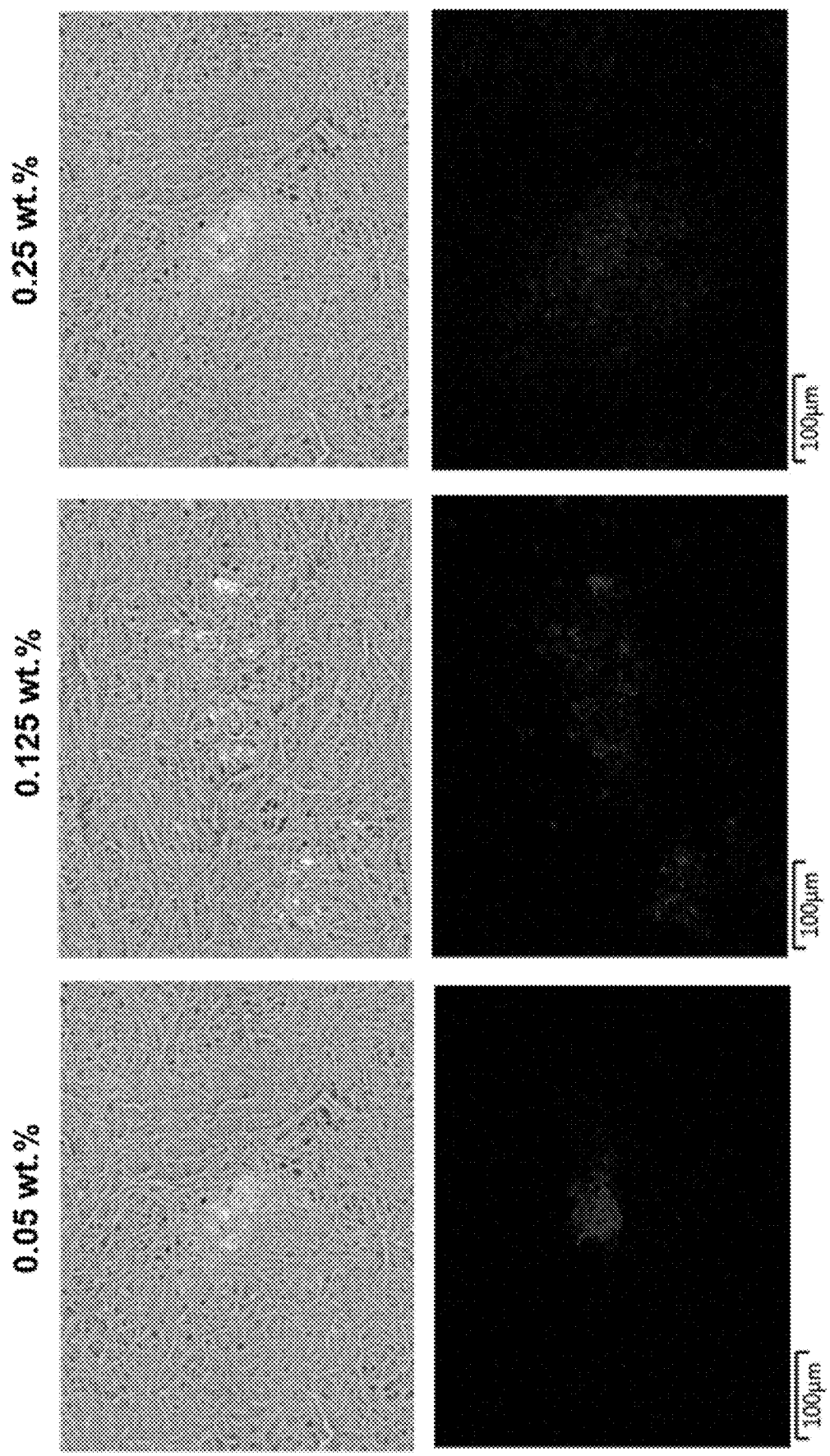
FIG. 18 illustrates scanning Electron Microscopy (SEM) images using backscattered electrons (Above), and the respective maps of the iron element using EDS for the three concentrations of NPs evaluated (Below).

Regarding the presence of IO-Zein in the material, the EDS spectra in FIG. 17 shows that in the control sample, the main chemical elements are carbon, oxygen, and nitrogen, which is to be expected due to the organic nature of mycelium. However, the mycelium that grew in the presence of the nanoparticles also showed iron from the nanoparticles. The weight percentage in the scanned area using the same magnification in all cases (not to be confused with the total percentage in the sample) confirms that the amount of iron increases with the nominal content of the nanoparticles, validating the incorporation of the solid into the fungal network. The mapping of some areas is presented in FIG. 18. Above are scanning electron microscopy images using backscattered electrons, and below are the respective maps of the iron element using EDS (Energy Dispersion Spectroscopy) for the three concentrations of NPs evaluated. Some agglomerations are presented as brighter areas in the image obtained with backscattered electrons (at the top), which coincides with the iron map (at the bottom), confirming the presence of IO-Zein nanoparticles. In the case of the material obtained with 0.25 wt. % of NPs, there are also observed areas with good dispersion of NPs.

In Table 2, it can be seen that by normalizing the amount of iron detected by the analyzed area, metal content increases with the nominal value, from 0.93% per mm2 up to 4.63% per $mm^2$ when the nominal values change from 0.05% to 0.25 wt. %. Likewise, the table shows that the biomass generated per liter of medium increases when 0.05 wt is incorporated. % of NPs practically does not change, and the greatest increase was obtained when incorporating 0.125 wt. %. The mass of NPs incorporated at the beginning of the experiment was subtracted from this value. Hence, the value presented in the table only corresponds to fungal biomass.

TABLE 2

Iron content per scanned area and dry biomass collected for the experiments varying the mass of IO-Zein NPs.

| IO-Zein (wt. %) | Scanned surface ($mm^2$) | Measured Fe (wt. %) | Iron content (wt. % / $mm^2$) | Fungal dry biomass (g/L) |
|---|---|---|---|---|
| 0 | 0.216 | 0 | 0 | 2.1 ± 0.2 |
| 0.05 | | 0.2 | 0.93 | 1.9 ± 0.3 |
| 0.125 | | 0.5 | 2.31 | 6.1 ± 0.5 |
| 0.25 | | 1.0 | 4.63 | 5.0 ± 1.5 |

Figure 19:
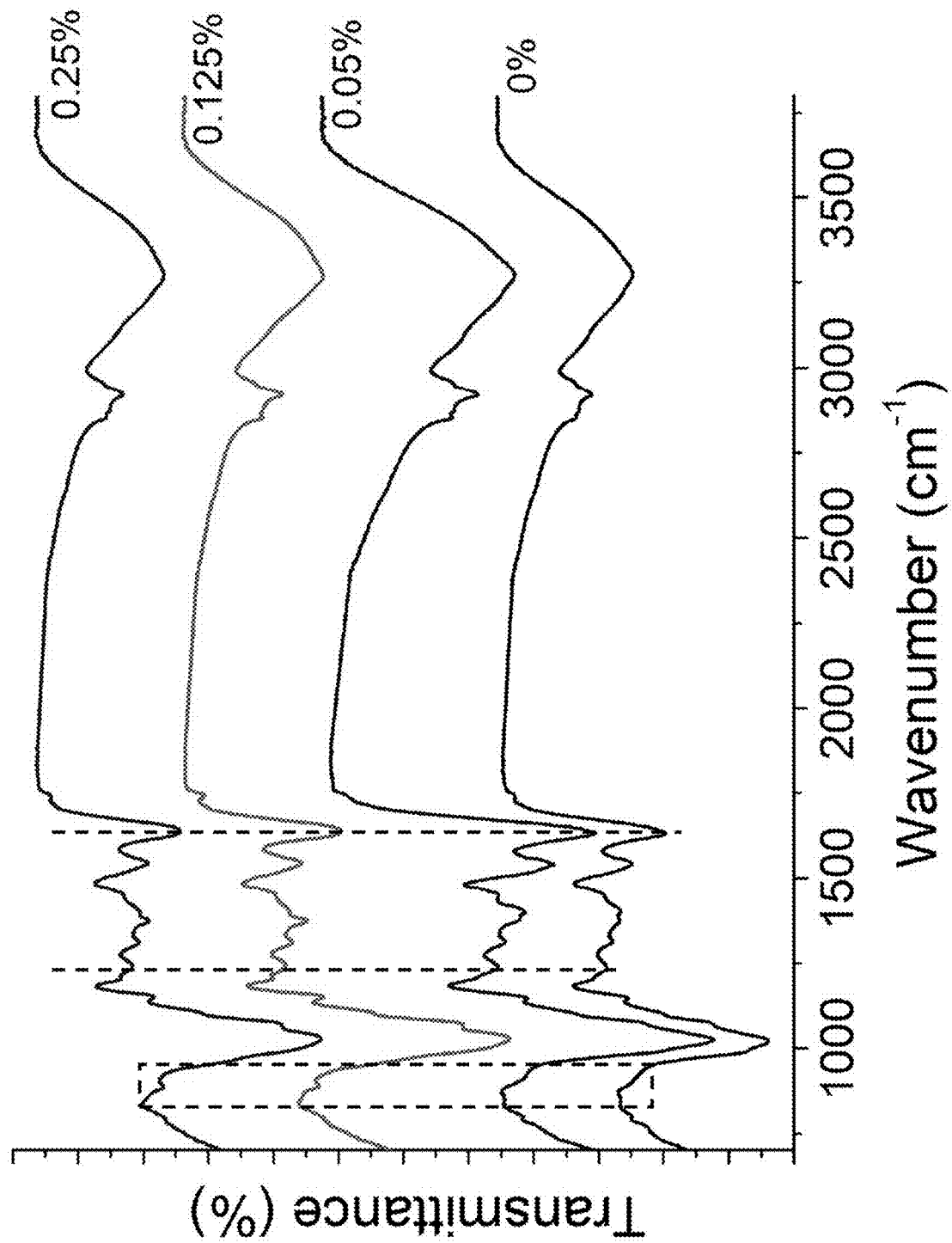
FIG. 19 shows FT-IR spectrum in ATR mode for SCC-0006 growing in different concentrations of IO-Zein NPs in a spectral range of 500 to 3800 cm−1.

As observed in the FT-IR spectra compared in FIG. 19, the solids were obtained by incorporating 0.125 and 0.25 wt. % presented several changes concerning the control. The band around 1630 $cm^{-1}$ attributed to stretching of the carbonyl bond (C=O) in the amide groups appears slightly shifted to higher wavenumber values (approximately 15 $cm^{-1}$). Likewise, the 1240 $cm^{-1}$ band related to C—N links appears to have shifted to higher frequency values. The appearance of a band around 790 $cm^{-1}$ is attributed to the incorporation of functionalized iron oxide nanoparticles (IO-Zein), since the stretching signals of the Fe—O bond appear at 790 and 910 $cm^{-1}$. The variations on the spectrum confirm that the chemical environment around the biopolymers changes by incorporating the nanoparticles as a consequence of the interaction between the iron oxide and the polysaccharides of the cell wall.

Figure 20:
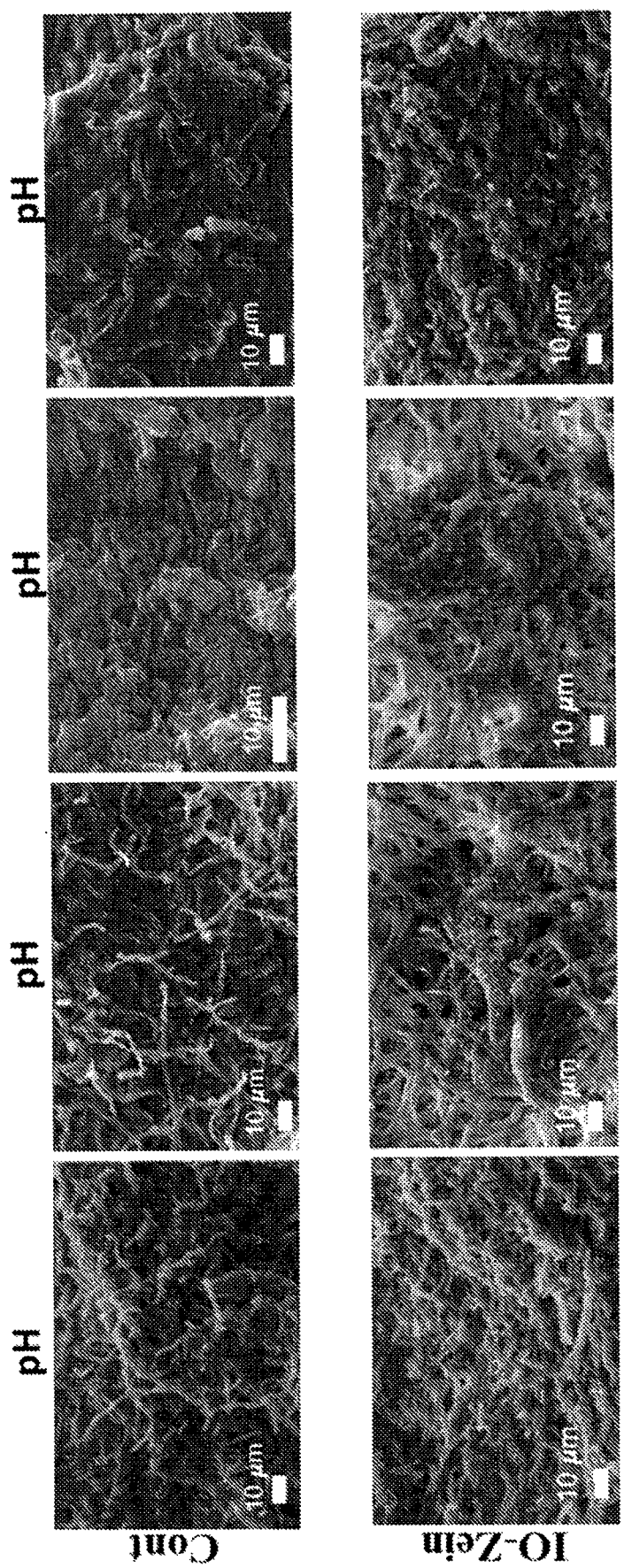
FIG. 20 shows Scanning Electron Microscopy (SEM) images using secondary electrons of SCC-0006 when growing in the presence of IO-Zein NPs at different pHs. The scale bar in each main image corresponds to 10 micrometers (images collected at 2 kX).
Figure 21:
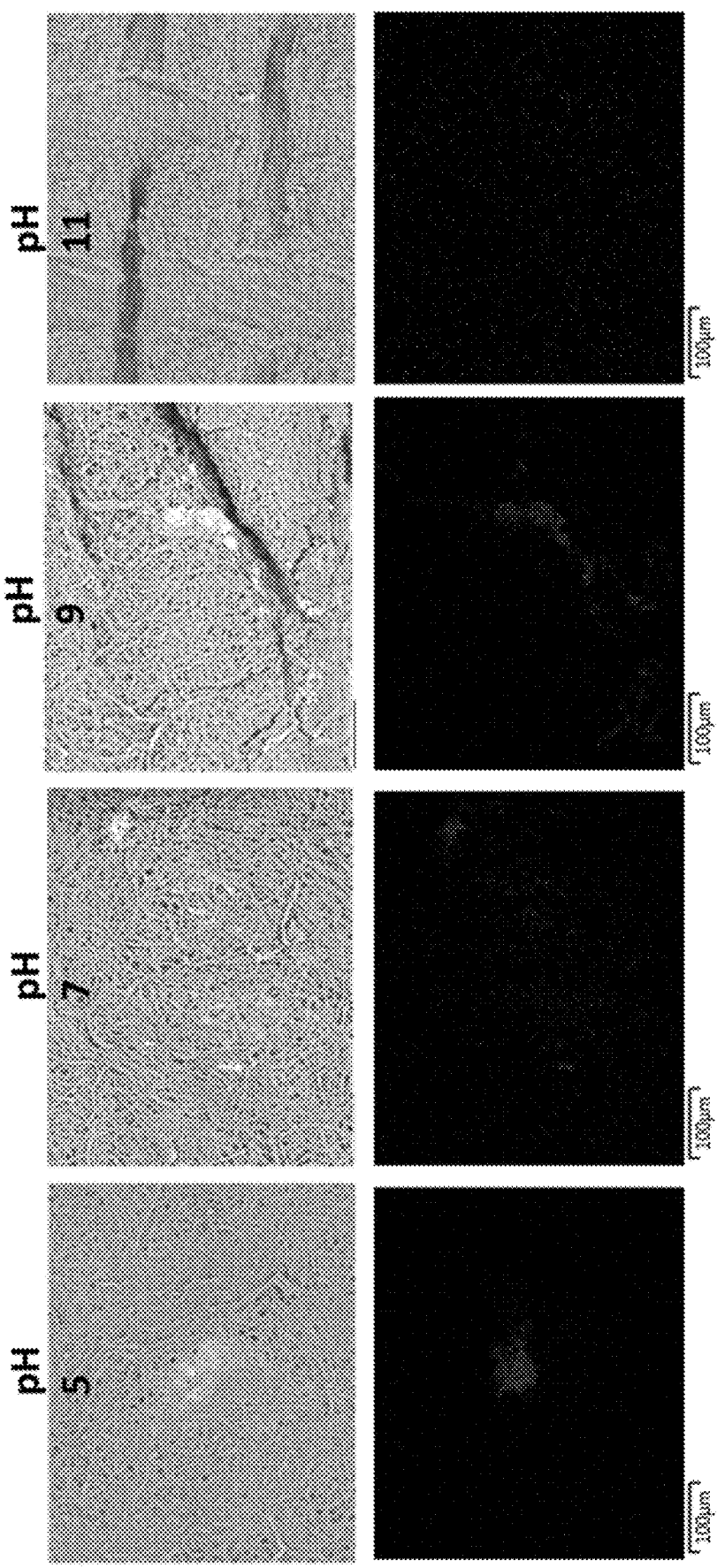
FIG. 21 shows Scanning Electron Microscopy (SEM) images using backscattered electrons (top images). The respective maps of the iron element using EDS at the four pH evaluations are shown (bottom images).
Figure 22:
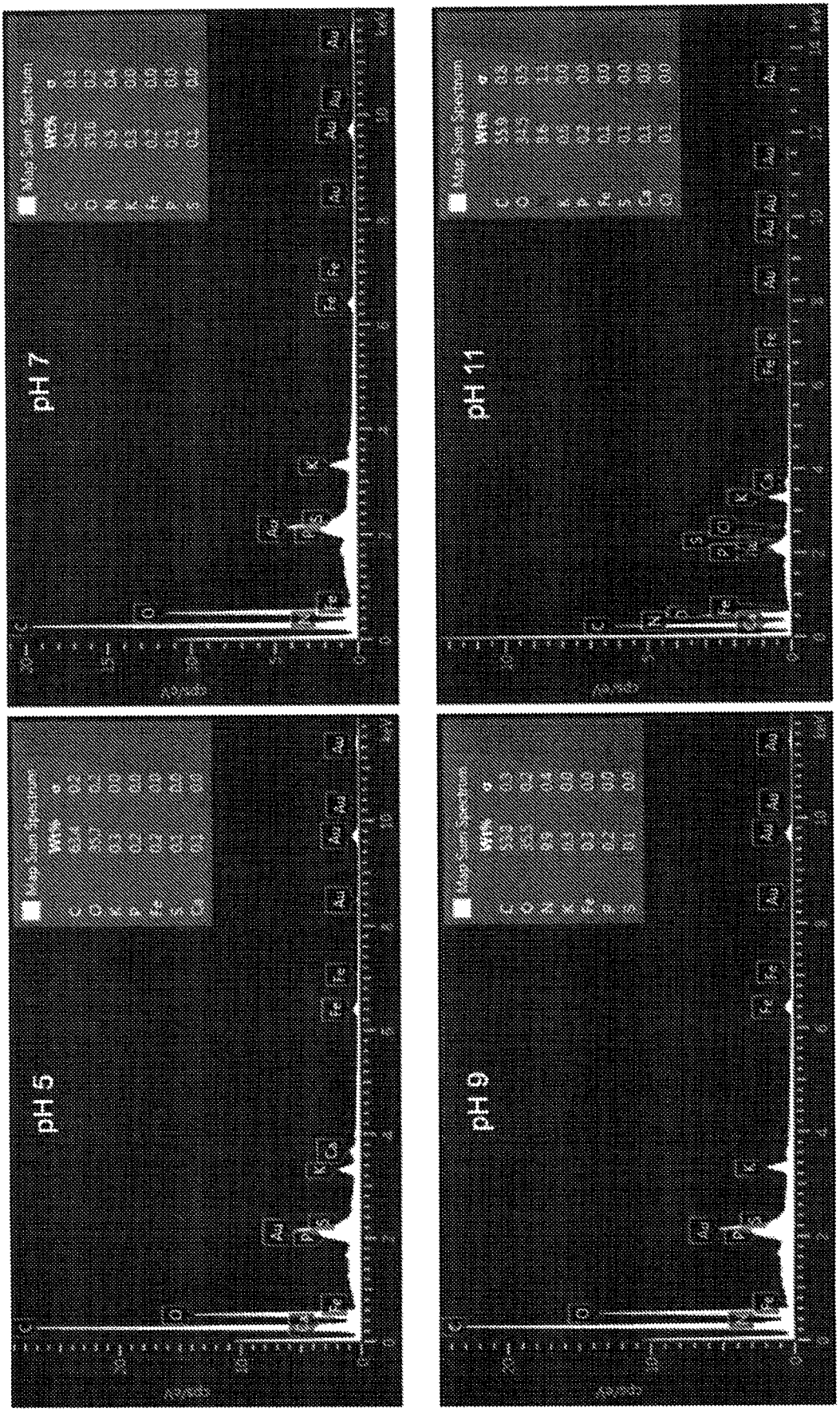
FIG. 22 shows EDS spectra of SCC-0006 that were grown in the presence of 0.05 wt. % IO-Zein NPs at different initial pHs. As inserts, the table indicates the percentages by weight concerning the scanned area.

Effect of Initial pH:

the pH of the liquid medium was adjusted using NaOH starting from the control medium (initially at pH 5). The inoculation and culture protocol are the same as described above. For these experiments, the concentration of NPs was kept fixed at 0.05 wt. %. The experiments were carried out at the following initial pH values: 5, 7, 9, and 11. As observed in the upper SEM images in FIG. 20 (controls), when working at pH 5 and 7, thin hyphae that begin to emerge from an amorphous network is observed. However, the developed biomass is completely amorphous by increasing the pH to caustic conditions. Several changes in the morphology are observed due to the presence of the nanoparticles (as seen in the images at the bottom). At pH 7 and 9, a densely interconnected network composed of thicker and well-defined hyphae is observed. Likewise, several zones of agglomerated nanoparticles can be observed in the sample prepared at neutral pH. Mapping at the same magnification in representative areas of the samples indicates that the aggregation of the nanoparticles decreases with increasing pH of the medium (FIG. 21), which suggests that the dispersion is more stable at higher pH values, which may be associated with negative zeta potentials in this pH range. However, this better dispersion is reflected in a lower percentage of iron when quantified by EDS, as shown by the iron contents in the EDS spectra in FIG. 22. The estimation of the iron content per analyzed surface yields a maximum at pH 9 of 1.39%/$mm^2$; this value drops to 0.46%/$mm^2$ when working at pH 11 (see Table 3).

TABLE 3

Iron content per scanned surface for the experiments varying the pH, keeping the percentage of IO-Zein NPs constant.

| pH | Scanned Surface (mm$^2$) | Measured Fe (wt. %) | Iron content (wt. %/mm$^2$) |
|---|---|---|---|
| 5 | 0.216 | 0.2 | 0.93 |
| 7 | | 0.2 | 0.93 |
| 9 | | 0.3 | 1.39 |
| 11 | | 0.1 | 0.46 |

Figure 23:
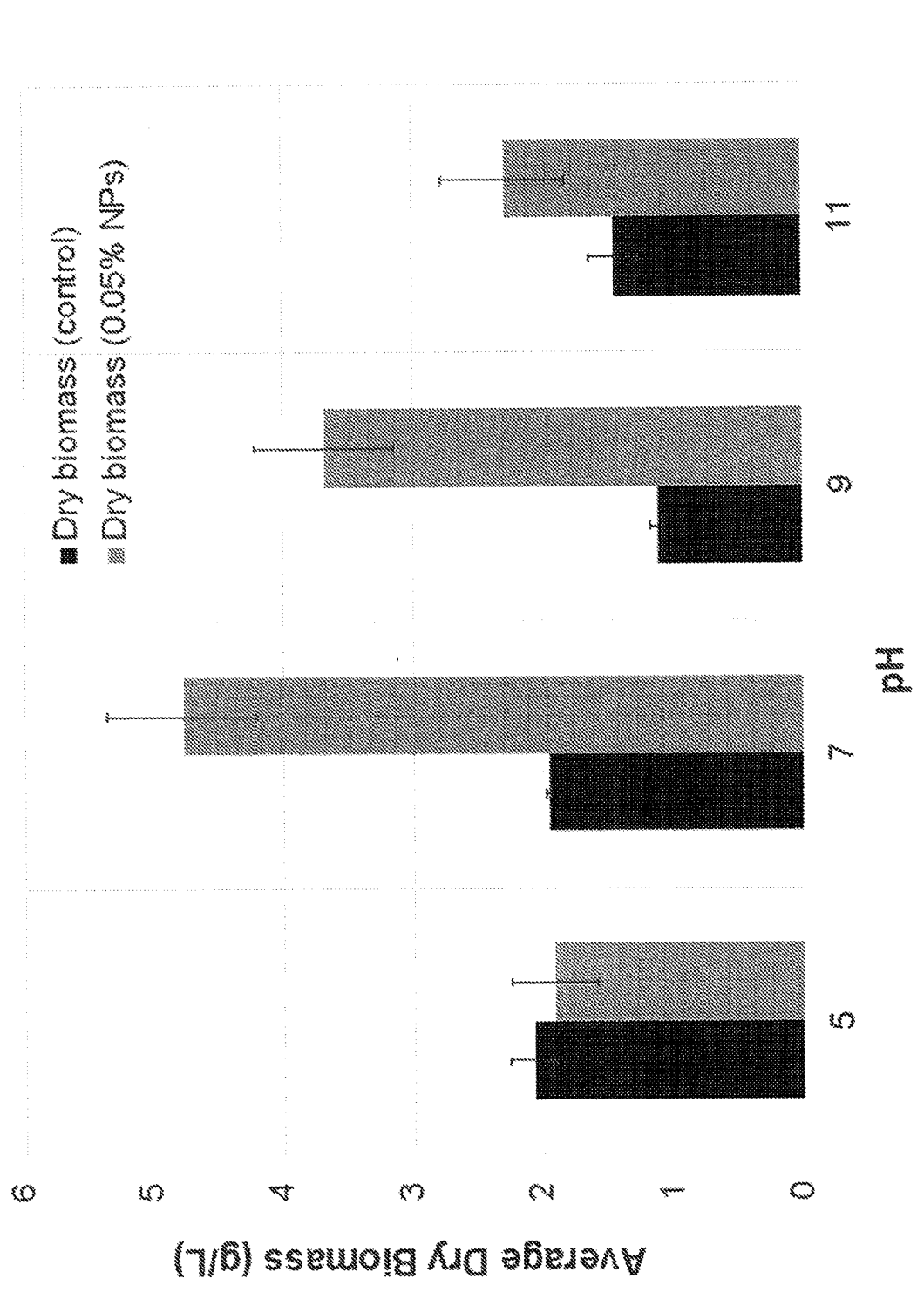
FIG. 23 is a graph illustrating dry biomass as a function of pH. The blue bars on the left correspond to the control experiments (without nanoparticles), and the orange bars on the right correspond to those experiments with nanoparticles (with 0.05 wt. % IO-zein).

The effect of the incorporation of nanoparticles on biomass growth is shown in FIG. 23 that by increasing the pH, the biomass decreases in the absence of the functionalized iron nanoparticles (bars on the left). However, in the presence of the nanoparticles, the biomass increases with the increase in the initial pH, reaching a maximum biomass at pH 7 (bars on the right) when 0.05 wt. % IO-zein is incorporated. This evidence suggests the expression of some metabolic processes affected by the medium pH and may involve iron species.

Figure 24:
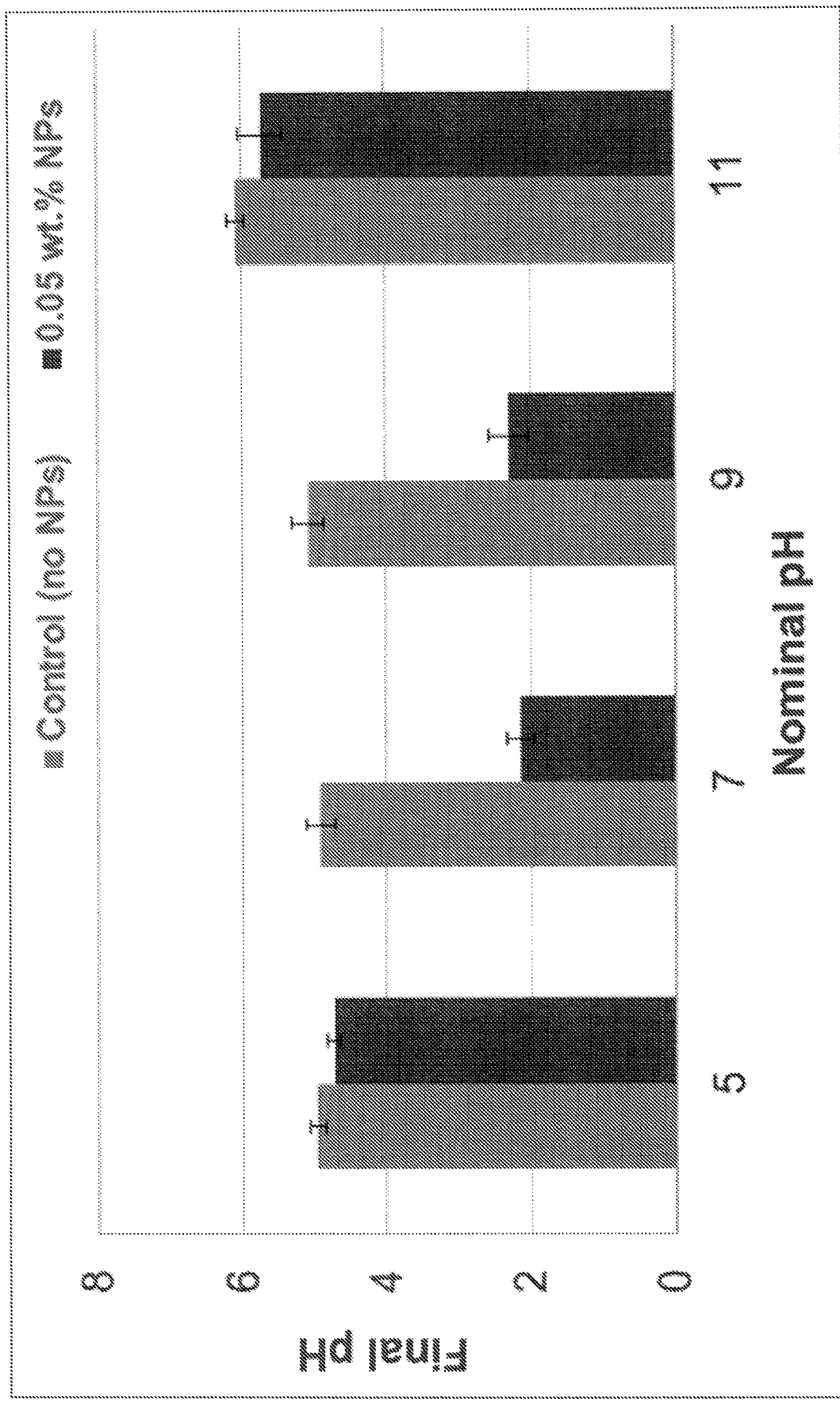
FIG. 24 is a graph showing pH values in the culture medium after 7 days of incubation. The experiments were performed with an IO-Zein NPs concentration of 0.05 wt. %. The control was carried out under the same conditions but without nanoparticles.

The measurement of the pH at days 0 and 7 showed a percentage decrease in the pH of 30, 43, and 45% when starting from an initial pH of 7, 9, and 11, respectively. This may be explained by the natural pH regulation mechanisms the fungus uses to neutralize the fermentation medium, for example, by excreting certain organic acids. For this reason, it can be seen in FIG. 24 that all the final pH values tend to be the same (around 5). When IO-Zein nanoparticles were added to the fermentation medium, a decrease in the pH was also observed, but in percentages of 69%, 74%, and 48% starting from the same initial pH. That is to say, when starting the process at pH 7 and 9, the fungus can lower the pH of the medium even to values close to pH 2. In this case, the fungus may counteract the hydroxyl ions (OH) effect. The acidification of the medium can contribute to the superficial dissolution of the iron oxide nanoparticles, providing a bioavailable iron source.

White and brown rot fungi employ the chelator-mediated Fenton process as a lignin degradation mechanism. This reaction produces significant depolymerization of the holocellulose within the cell wall of the wood. In this process, iron (II) and $H_2O_2$ produce an autocatalytic cycle that generates reactive oxygen species (ROS) capable of oxidizing recalcitrant organic matter. However, iron may be solubilized to be available since it mainly exists in the form of oxides and/or oxo hydroxides in many natural environments. In response to this soluble iron deficiency, many microorganisms have developed specific systems for iron acquisition, sequestering it from the surface of these particles by secreting high-affinity chelating agents. These iron transporters (reductive or non-reductive) have been identified as part of fungal decay mechanisms in many white rot and brown rot fungi. An example is the accumulation of oxalic acid, which provides oxalate groups for sequestration from insoluble forms of iron through the formation of iron-oxalate complexes. Under appropriate conditions, for example, a pH change at the interface between the cell wall of the fungus and the cell wall of the wood, a transfer of iron will occur towards wood chelators such as catecholate or hydroquinone in which it will be reduced to Fe(II), and thus the Fenton reaction will start. In this regard, the interrelation between fungal metabolites, such as short-chain polycarboxylic acids and iron oxides, is well-known in activating their metabolic processes.

Figure 25:
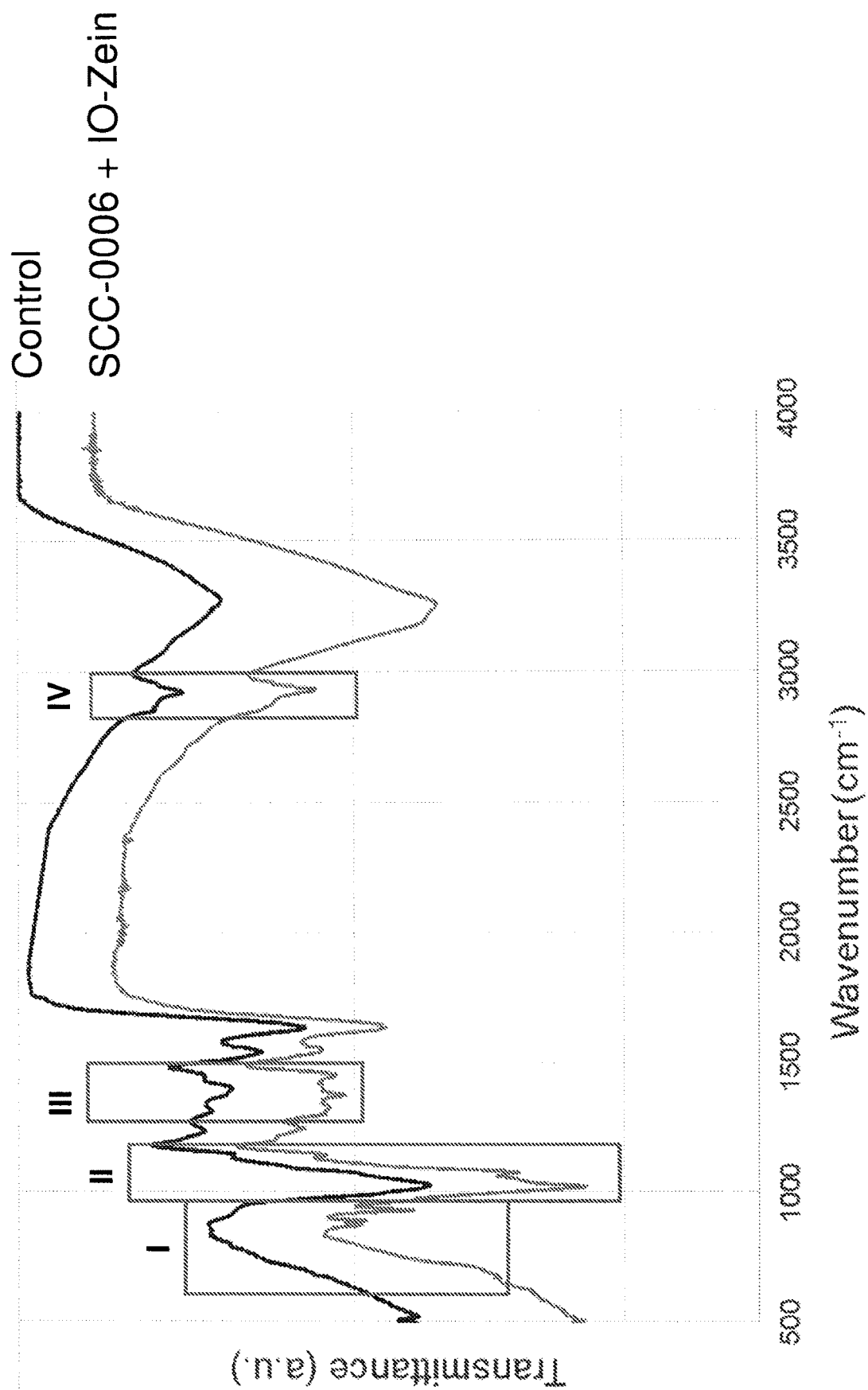
FIG. 25 is a graph of FT-IR spectrum in ATR mode for SCC-0006 (control) and SCC-0006+IO-Zein NPs in a 500 to 4000 cm−1 spectral range.
Figure 27C:
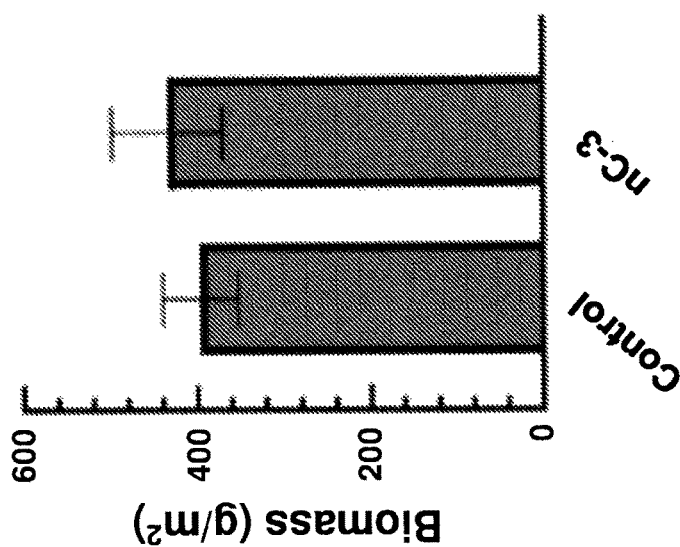
FIGS. 27A-27C show graphs of biomass quantification after 14 days of incubation using Scaffold 1 at the different approximations in commercial agar culture medium.
Figure 27B:
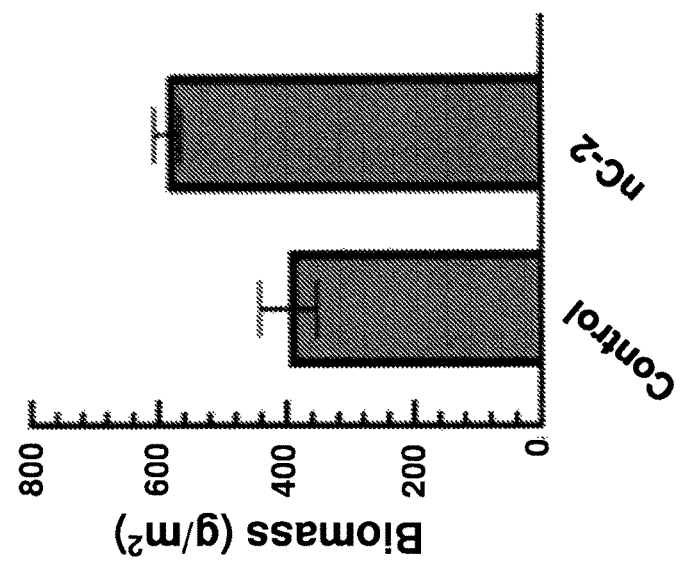
Figure 27A:
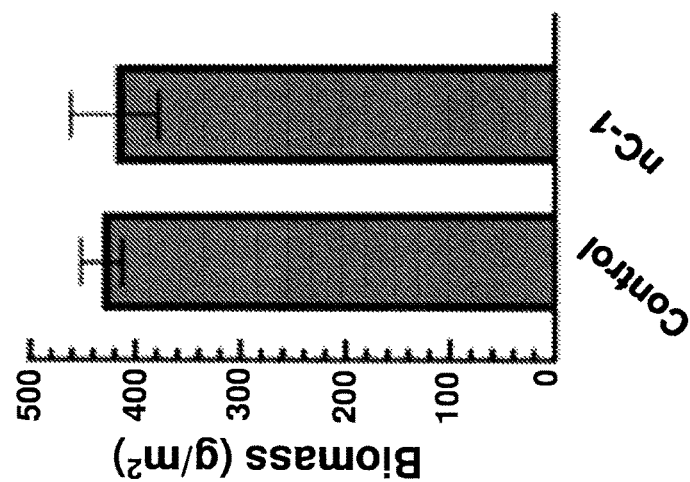
Figure 28:
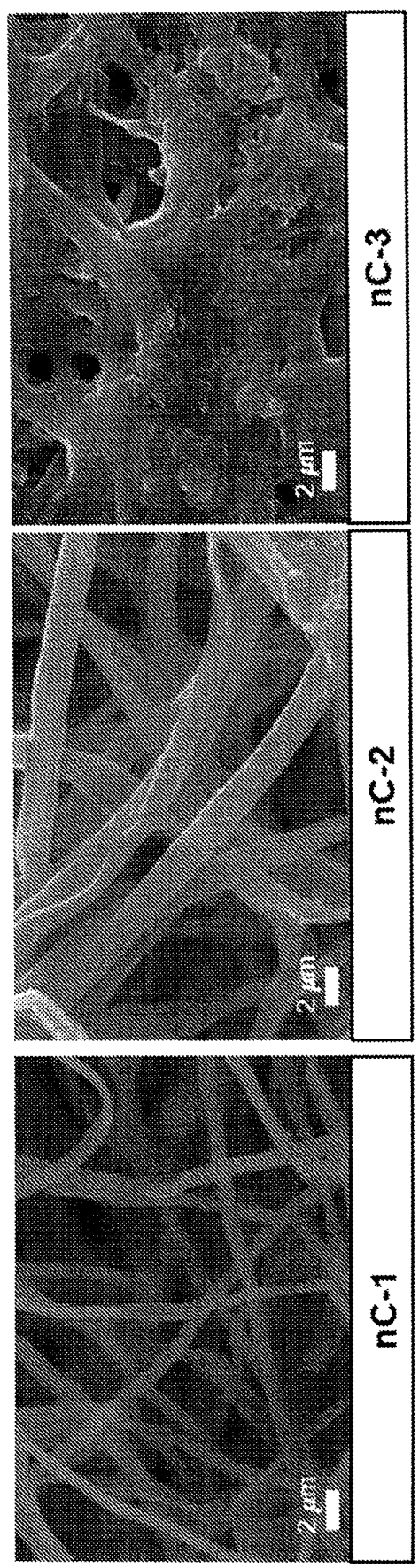
FIG. 28 shows Scanning Electron Microscopy (SEM) images using secondary electrons of SCC-0006 aerial mycelium after 14 days of incubation. The scale bar in each image corresponds to 2 micrometers.
Figure 29:
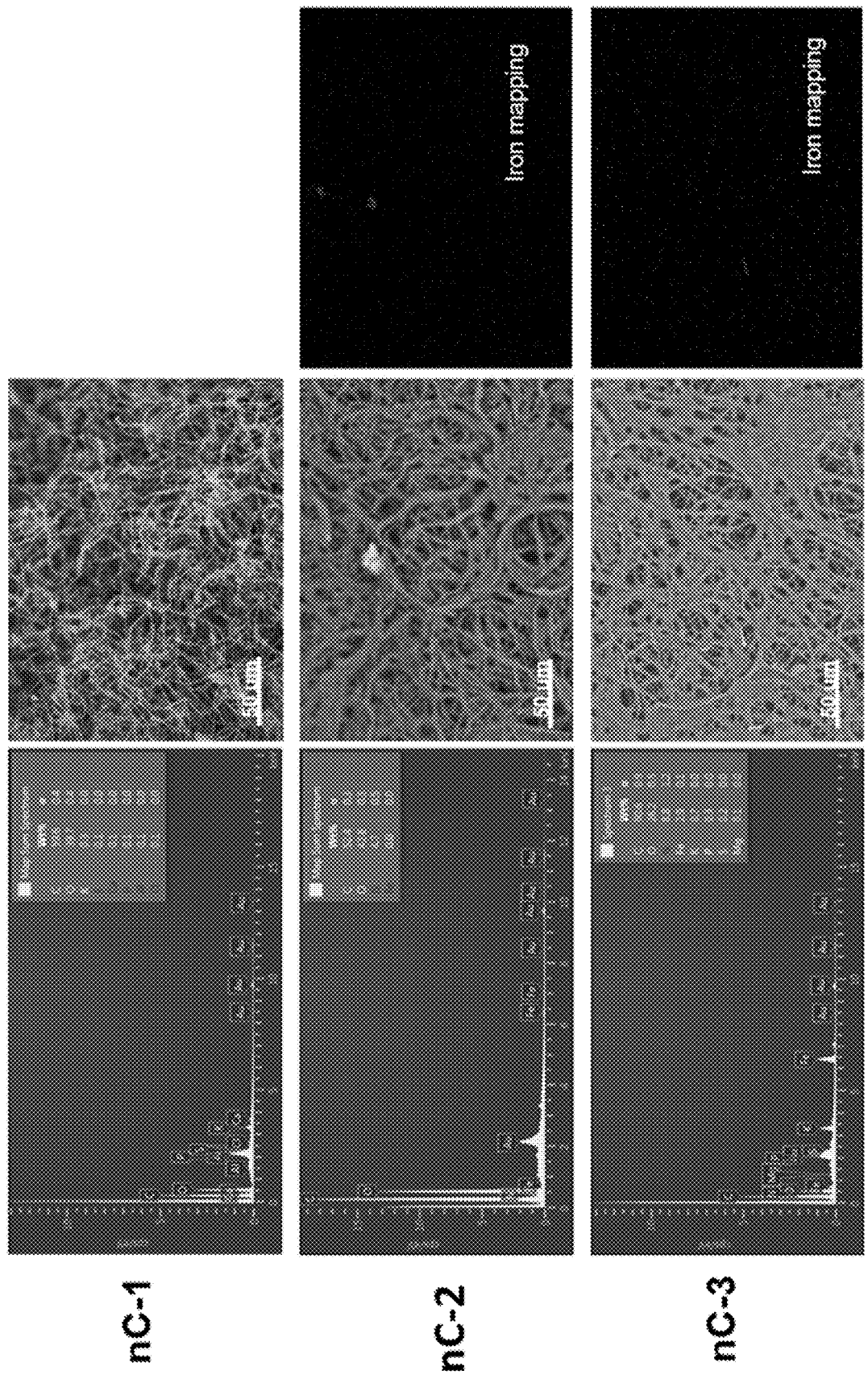
FIG. 29 shows EDS spectra of SC-0006 incubated with 0.125 wt. % of IO-Zein NPs using different approaches. The analyzed areas and the respective iron mapping are shown in the middle and right of the figure, respectively. Approximation nC-1 (tray), approximation nC-2 (scaffold), approximation nC-3 (spray).
Figure 30:
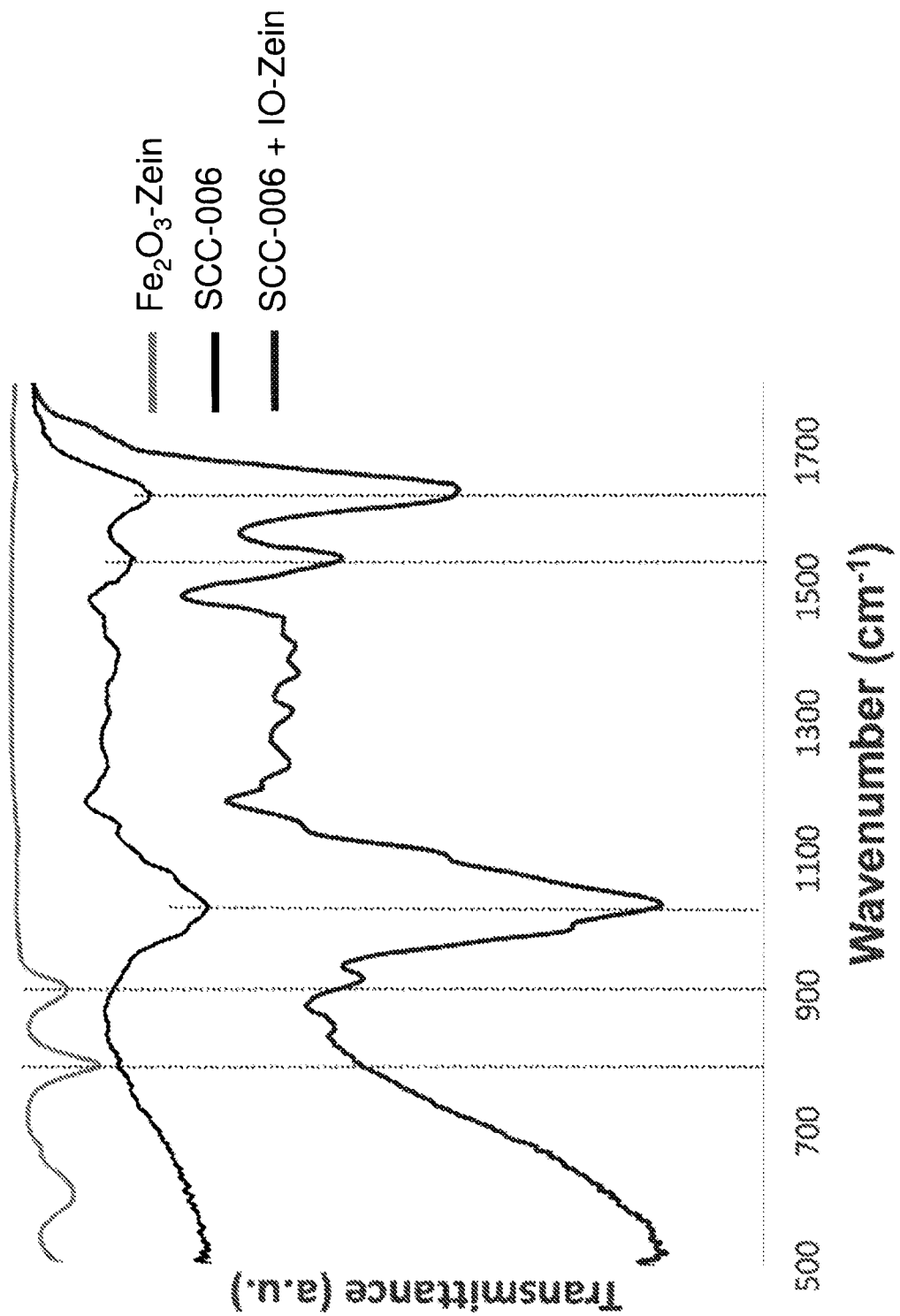
FIG. 30 is a graph showing FT-IR spectra in ATR mode for SCC-0006 (control), IO-Zein NPs and the prototype obtained with the approximation nC-3 in a spectral range of 500 to 1800 cm−1.
Figure 31C:
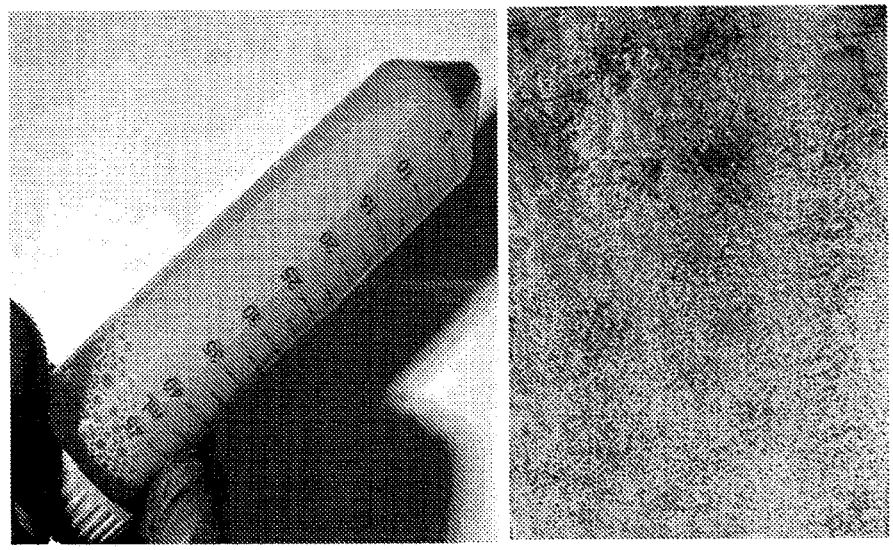
FIGS. 31A-31C show (top) photographs of the nanoparticle dispersions in different formulations and (bottom) photograph of the obtained prototypes regarding the homogeneity of the distribution at the surface.
Figure 31B:
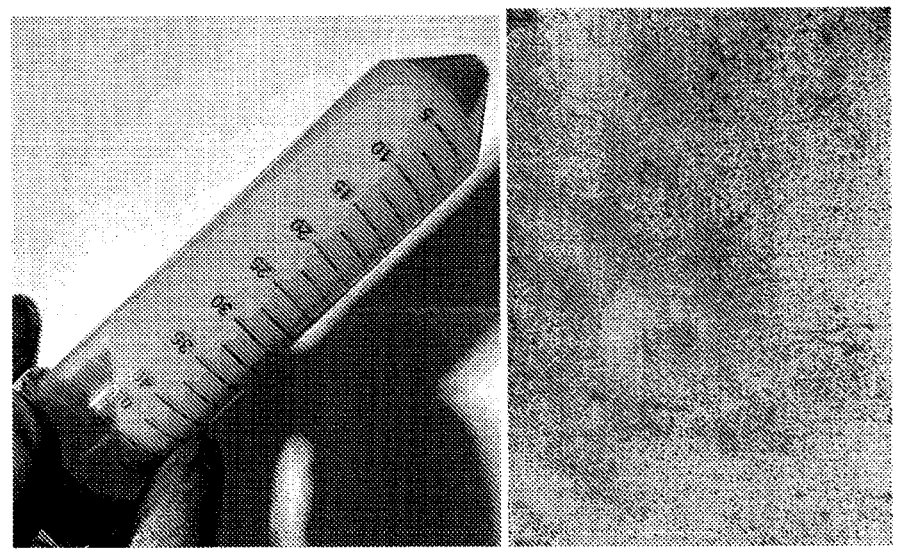
Figure 31A:
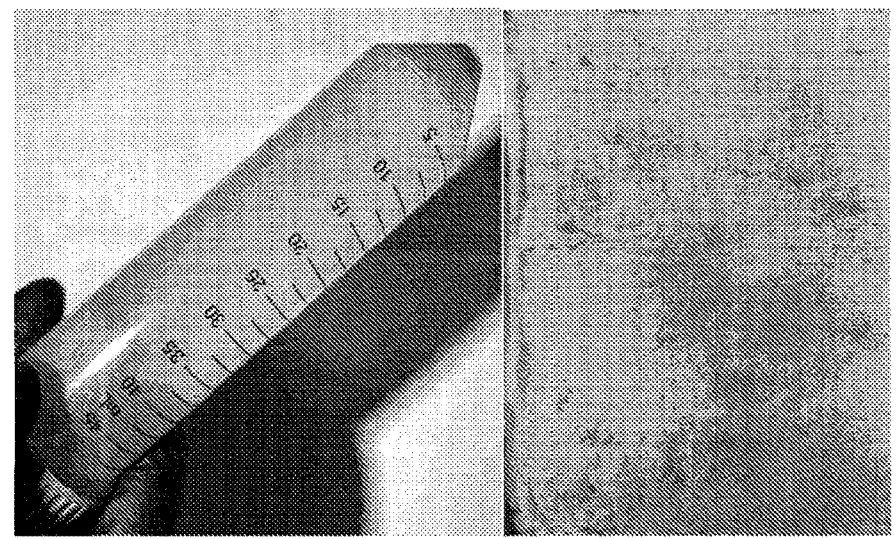

FIG. 25 shows FT-IR spectra of the samples obtained at pH 7, the control, and the one in the presence of IO-Zein. Four different zones in the spectra revealed changes. (i) Zone I at 600-900 cm$^{-1}$: the bands around 599, 790, and 900 cm$^{-1}$ are designated to stretching modes of the Fe—O bond in the IO crystalline network. (ii) Zone II, around 900 and 1200 cm$^{-1}$: it appears the symmetric stretching resonance of the C—O—C bond in the polysaccharides present at the fungal cell wall (centered around 1000 cm$^{-1}$), changes in the shape of the peak, as well as a slight shift to lower wavenumber could be related to the metabolic changes activated to produce these siderophores that provoke changes of the composition and/or nature of the cell wall. It could also be related to the H-bond type interaction between the cell wall and the zein at the nanoparticle surface. (iii) Zone III, at 1300 to 1500 cm$^{-1}$: reveals changes in the bands related to the C—N, C—O, and N—H bonds of the amide groups (chitin in the cell wall), suggesting the participation of the chitin in the interactions with the nanoparticles. Likewise, the contribution of the amine groups in the chitin could also be revealed in this region but the low concentration regarding the concentration of the amide groups of the cell wall allows us to disregard this contribution. Finally, (iv) zone IV, around 2800 and 2900 cm$^{-1}$: related to the $CH_2$ and $CH_3$ of the polymeric chains conforming the polysaccharides, also revealed a slight shift to higher wavenumber as well as changes in the relative intensity in accordance with the observations of the zone II. The evidence mentioned above indicates that the addition of modified iron oxide nanoparticles influences the development of a dense hyphae network by activating the metabolism of SCC-0006. Evidence of In situ nano-crosslinking for mycotextiles production at the laboratory scale.

NPs Dispersion into the Agar Culture Medium (nC-1):

As mentioned above, the first approach to determine the effect of nanoparticles on mycelial growth was in the laboratory conditions. The culture medium was prepared by dissolving the PDB medium in 250 mL Erlenmeyer flasks using distilled water. Subsequently, the bottles were autoclaved and placed into a laminar flow hood. The proper amount of UV-sterilized IO-Zein nanoparticles were dispersed in the PDB media before the inoculation at a fixed concentration of 0.125 wt. %. Then, the pH was fixed to 7 using a few drops of concentrated NaOH. The media was inoculated with several agar disks with grown SCC-0006. After pre-incubation at 28° C. for 7 days at 250 rpm, the contents of the flasks were mixed with an equivalent volume of autoclaved SBA media and placed in trays. Once the mixture solidified, the scaffold was placed on top of the culture media and flattened very well. The tray is closed and put into an incubator for 14 days. On day 7, the trays were opened and sprayed with 5 mL of the Marillion solution. The Marillion activator's formulation was described in the U.S. Publication No. US 2023/0356501 A1, (previously incorporated by reference in its entirety). After incubation, the material is removed from the culture media and inactivated for mechanical measurements. The control experiment followed the same procedure without using the nanoparticles in the culture media.

NPs Dispersion onto the Scaffold (nC-2):

The nanoparticles suspended in sterile water at a concentration of 0.125 wt. % were sprayed over the scaffold, followed by the activation using the citric acid protocol as has been described above. This scaffold was placed in a tray where the strain SCC-0006 was inoculated and incubated, as described in the above section. After incubation, the material is removed from the culture medium and inactivated for mechanical measurements.

Sprayed NPs Dispersion on the Aerial Mycelium (nC-3):

the nanoparticles suspended in sterile Marillion solution at a concentration of 0.125 wt. % were sprayed over the mycelium during its growth. For this purpose, the trays prepared as described in the section above were opened under sterile conditions on day 7 of incubation. At this point, the mycelium of SCC-0006 had already emerged from the scaffold and continued growing for 7 more days. The sprayed volume was 10 mL. After incubation, the material was removed from the culture media and inactivated for mechanical measurements.

In all the cases, the post-processing of the application scheme may be the same as described in FIG. 26.

The effect of in situ nano-crosslinking was determined based on the development of the mycelial biomass over the scaffold (g/m$^2$). It was determined by weighing the freshly harvested prototype after its inactivation at 70° C. for 10 min. The biomass of the original scaffold (obtained before initiating the experiment) was subtracted from the equation. These calculations were repeated at least 100 times with the prototypes harvested. The final biomass was normalized with the prototype's surface, and the value was compared to the control (e.g., experiment without nanoparticles).

The results obtained shown in FIGS. 27A-27C reveal the effect of the application of functionalized nanoparticles on mycelial biomass. In the agar culture medium (nC-1) approximation (FIG. 27A), the biomass obtained is unaffected by incorporating the nanoparticles. This discrepancy with the liquid medium approach, where the biomass increased 3.9 times due to the incorporation of nanoparticles onto the scaffold (see FIG. 23), could be explained as the amount of dissolved oxygen in the solidified medium is less than in the stirred liquid medium, limiting the metabolic response of the fungus. The lack of a continuous mixing also affects mass and charge transport. As is shown in FIG. 27B, a significant difference was observed when the nanoparticles were deposited onto the scaffold (nC-2), obtaining an increase in biomass of 48%. In this approximation, the mycelium interacts with functionalized nanoparticles as it traverses and colonizes the scaffold. Finally, the increase in the biomass by using the Marillion activator as a vehicle (nC-3) was 9%, as is shown in FIG. 27C.

Regarding the effect of the nanoparticles on the morphology according to the strategy used, it was possible to observe that a close interaction of nanoparticles-mycelium is necessary to promote the proximity between the hyphae (FIG. 28). Strategies nC-2 and nC-3 are more efficient for reaching this effect. Moreover, a hyphal thickening was observed when these strategies were employed. In the case of the strategy using the solidified fermentation medium (nC-1), the mean hyphal thickness was 0.72+/−0.15 nm. By incorporating the nanoparticles in the scaffold (nC-2), the mean thickness was 1.29+/−0.34 nm, while by spraying the nanoparticles dispersion, the mean thickness increased to 1.39+/−0.36 nm. In the case of the strategy nC-3, regions of agglomerated nanoparticles were also observed. The EDS spectra of the analyzed region of the sample shown in FIG. 29 revealed the presence of iron (from the IO-Zein NPs) only in the sample obtained by the strategy nC-3. Considering that the detection limit of this technique is highly dependent on the characteristic of the sample, an inhomogeneous distribution of the chemical target (in this case, the iron) will greatly affect the result. A more homogenous distribution was observed applying the strategy nC-3, as evidenced by the iron mapping of the same region.

Because the fungus-mineral interactions play critical roles in rock, mineral, and metal transformations, rhizospheric organic matter degradation, and phosphate fixation, the effectiveness of this strategy will depend on optimizing this interaction.

FIG. 30 shows FT-IR spectra of the mycelium after the combination with IO-Zein nanoparticles compared with the control SCC-0006 and the IO-Zein nanoparticles in the spectral region comprising 500 to 1800 cm$^{-1}$. The most relevant changes observed in the SCC-0006 spectrum are the slight shift to higher wavenumbers of the band initially located at 1638 cm$^{-1}$, attributed to the C═O bond in the chitin, as well as the band at 1544 cm$^{-1}$ corresponding to C—N stretching in the same group. Likewise, the band associated with the C—O—C stretching in the polysaccharides in 1030 cm$^{-1}$ experienced the same shift. The signals related to the nanoparticles at 908 and 794 cm$^{-1}$ appear greatly shifted to lower wavelengths, which could be associated with a change in the chemical environment of the Fe—O—Fe network. The interaction with the fungal cell wall may cause a reduction in the oxidation state of the iron centers, which increases the energy in the Fe—O bonds, explaining the shift to higher wavelengths.

Formulations for a Stabilized IO-Zein NPs Dispersion (i) IO-Zein nanoparticles were dispersed in Marillion activator solution having a mean viscosity (25° C.) below 1 cps (around 0.8 and 1 cps), the mixture was sonicated at 60 Hz for 1 h and sterilized before the application using a sprayer gun.

As observed in FIG. 31A, the nanoparticles are not fully dispersed in the liquid, causing a non-homogeneous distribution onto the mycotextile. (ii) When IO-Zein nanoparticles were dispersed in the BIOrganic CHAI solution described above, the dispersion increased, and the distribution on the mycotextile increased in the prototype surface, suggesting that the distribution of the dNPs is more homogeneous, as observed in FIG. 31B, the mixture's viscosity slightly increased to values close to 1 cps. iii) To increase even more the stability of the nanoparticles, the IO-Zein were dispersed in a formulation containing the BIOrganic CHAI, a dispersing agent such as polysorbates (e.g., tween 20, tween 80), polyacrylic acid (PAA), polyethylene glycol (PEG), polyvinylpyrrolidone (PVP), ionic liquids (IL), among others; in concentrations around 1 and 10 p/v %; and, a thickener such as polyvinyl alcohol (PVA), carboxymethylcellulose (CMC), Xanthan Gum (XG), Guar Gum (GG), alginate (A), among others in concentrations around 0.01 and 0.1 p/v %. These mixtures were formulated to reach viscosities between 100 to 1000 cps. FIG. 31C shows the distribution of IO-Zein nanoparticles onto the mycotextile surface after applying a mixture containing tween 80 as a dispersing agent (5 p/v %) and carboxymethyl cellulose (0.1 p/v %). It is possible to observe a stable dNPs as well as higher distribution of the nanoparticles on the surface of the mycotextile.

An iron reduction could be justified because reduction or chelation are the main processes for solubilizing iron species in several fungal species. Reducing ferric iron to ferrous iron could occur by enzymatic or non-enzymatic means. Some fungal species, such as Saccharomyces cerevisiae, utilize siderophores (e.g., rhodotorulic acid or ferrioxamine B) either by direct uptake of the iron-bearing ligand or by extracellular reductive release of iron from the ligand. Moreover, these species can mobilize iron by acidification of the surrounding environment by releasing citric acid or other hydroxy acids. In nonenzymatic mechanisms, iron—Fe(III)—with the transport of—Fe(II)—could be achieved by liberating compounds such as 3-hydroxy anthranilic acid and melanin. The effect on the pH values in liquid medium experiments allows us to think that the strategy of the SCC-0006 strain to capture the iron from the nanoparticles may be the release of acidic chelates.

Figure 32:
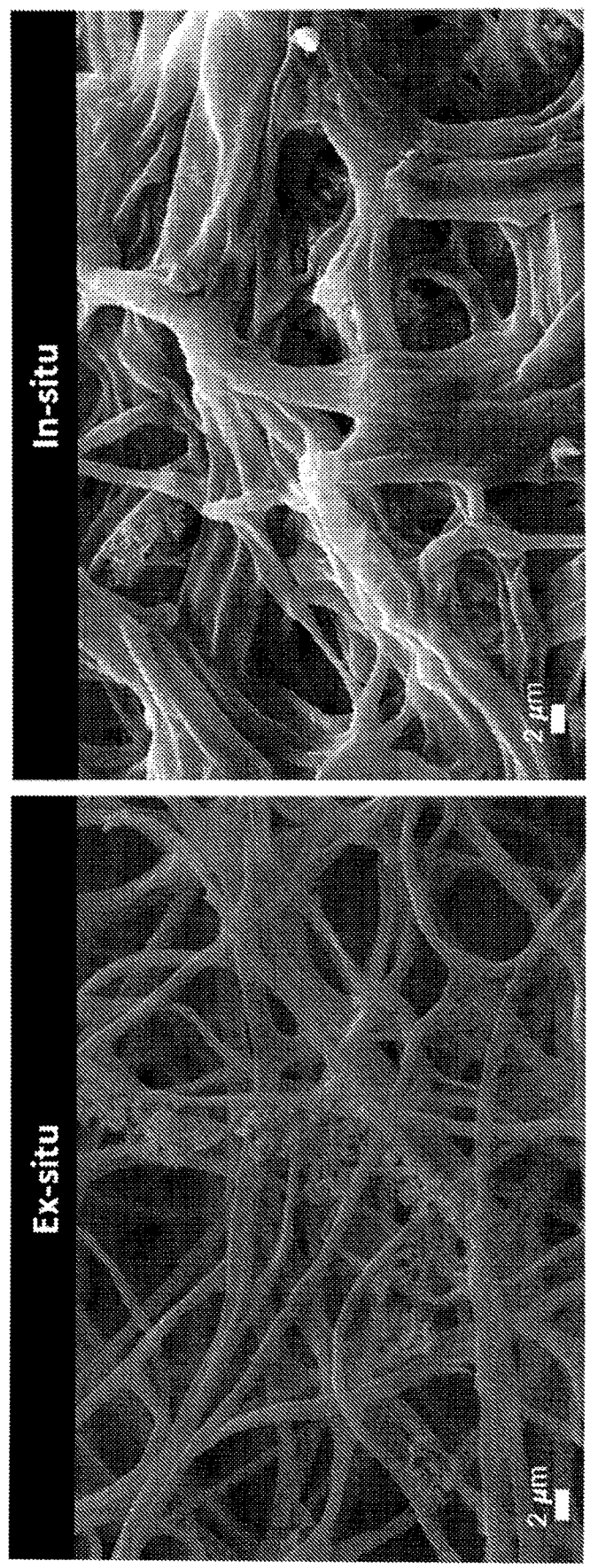
FIG. 32 shows a comparison of the hyphae thickness and cross-linking obtained by an ex-situ approximation and an in situ approximation by application with spraying.

As observed in the examples above, the characteristics of the mycelium differ depending on the approach used to incorporate the nanoparticles. Spraying the nanoparticles during the growth induces significant beneficial changes in biomass, iron distribution, and interaction. Moreover, the desired effect of greater closeness and interaction between hyphae was achieved with this strategy. The advantage of this approach is that the amount of incorporated nanoparticles could be tailored during the fermentation process, making it possible to tune the mechanical properties. When the nanoparticles are applied after the harvest of the prototype (e.g., by immersion during the post-fermentation stage), the nanoparticles may not participate in the metabolic processes of the fungus. This is what is referred to herein as the "ex-situ" approach. In this case, the effect is not as evident as when the nanoparticles are incorporated during the growth because the time for the interaction is more limited. FIG. 32 compares an SEM image of the hyphae by incorporating the nanoparticles under the ex-situ approach and the hyphae obtained by addition under the "in-situ" approach.

Mechanical Properties of the Crude Prototypes Obtained Under Each In Situ Nano-Crosslinking Approximation In the leather industry, different characteristics determine the main application of a given piece. Some of these characteristics are its tensile strength (TS), elongation (E %), tear resistance, resistance to rubbing, bally flexing, etc. This will also apply to any biomaterial proposed as a substitute. However, the cross-linking will mainly affect the tensile strength and elongation of the mycelium layer and the entire material. These parameters were determined under the ISO 3376:2011 standard using a Gester Single Column tensile test machine, model GT-UA03, to establish the changes obtained with the in situ nano-crosslinking strategy.

Figure 33:
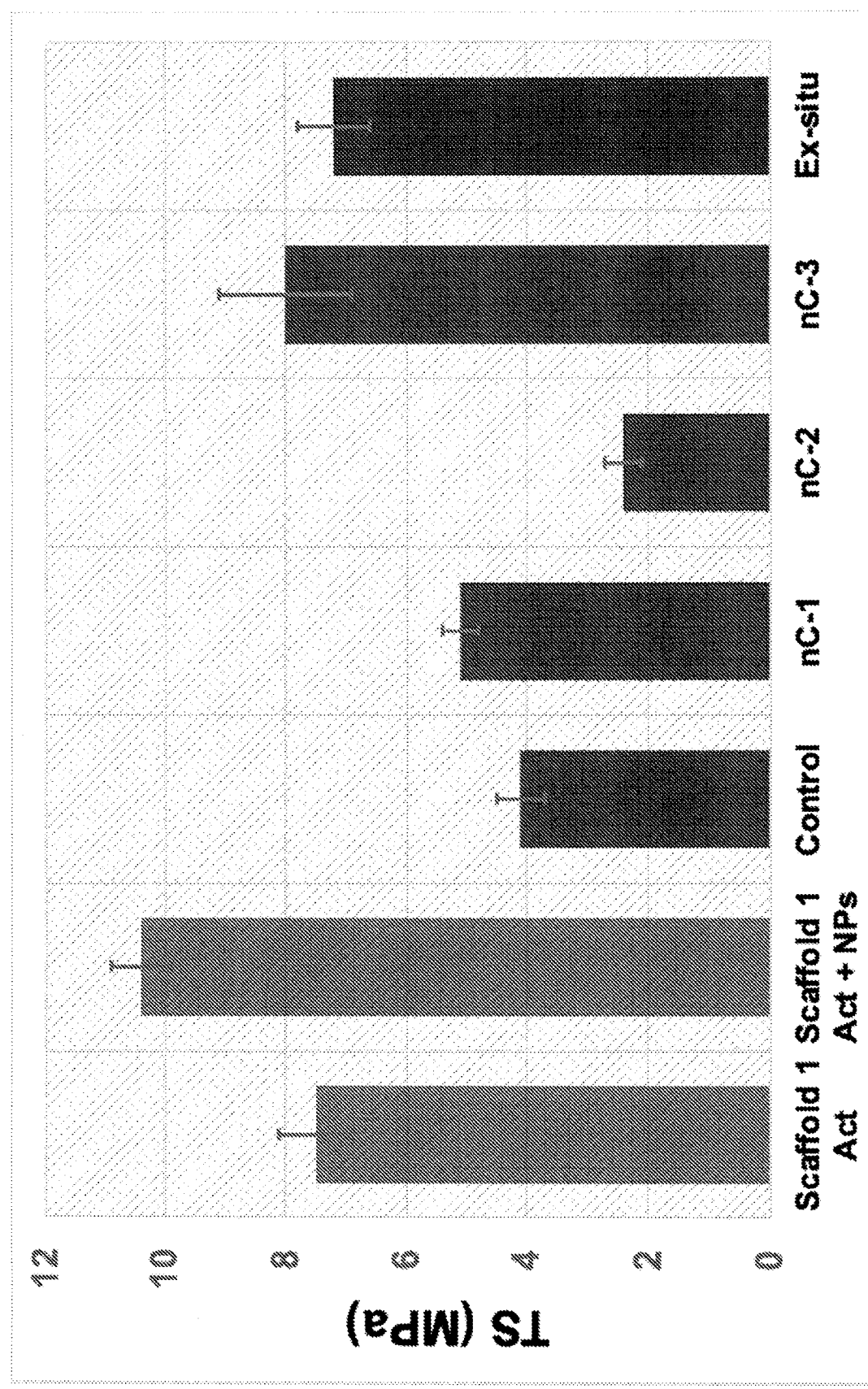
FIG. 33 is a graph of the ultimate tensile strength of the prototypes obtained with the different approximations compared with the tensile strength of the scaffolds. Scaffold 1 Act corresponds to the activated scaffold. Scaffold 1 Act+NPs corresponds to the activated scaffold after depositing IO-Zein NPs. The control sample is the crude prototype obtained with an activated scaffold without nanoparticles.

FIG. 33 compares the tensile strength in MPa of the different approximations compared with the control prototype and the original scaffolds. Scaffold 1 Act corresponds to the activated scaffold, and Scaffold 1 Act+NPs corresponds to the activated scaffold after depositing IO-Zein NPs used in the approximation nC-2. It can be seen that the incorporation of iron nanoparticles increases the tensile strength of the scaffold by 39% in the weft direction. Cotton fabrics contain abundant hydroxyl groups and have high porosity and strong adsorption, which favor the immobilization of micro and nanostructures. These nanoparticles deposit in the fibers, enhancing the intermolecular forces between the fibers. Moreover, nanoparticles may help align the cotton fibers in the fabric structure. These improvements reduce the occurrence of weak points and defects in the fabric, making it less prone to tearing or breaking when subjected to tensile forces. However, after the fermentation step, the mechanical properties of the scaffold are highly affected. As observed in the control sample (crude prototype obtained in the absence of nanoparticles), the tensile strength of the prototype decreased from 7.5 to 4.1 MPa, indicating that the fungi utilized the organic fibers as substrate during the colonization. This effect has been observed with other fungal strains, and it has been previously reported.

Approximation nC-1

(The nanoparticles were deposited in agar culture medium). When incorporating the nanoparticles in the agar medium, it was observed a slight increase in the tensile strength of the prototype as compared with the control, which is interesting considering that this strategy did not cause major changes in the hyphae's morphology or the quantified biomass.

Approximation nC-2

(Nanoparticles were deposited in the scaffold). In this case, a prototype with diminished tensile strength regarding the control was obtained. It is possible that the presence of the nanoparticles in the scaffold accelerated the degradation of the organic fibers. As discussed before, iron oxides act as catalysts in the degradation of organic matter to facilitate carbon capture in some fungal strains. This could justify the higher biomass developed under this strategy and the higher thickness of the hyphae because, after the emergence of the mycelium, carbon sources are limited compared to the existing sources in the substrate medium.

Approximation nC-3

(Nanoparticles were sprayed onto scaffold). This strategy caused an increase of the tensile strength up to 8+/−1 MPa (this is twice the value obtained in control). The strategy of spraying the nanoparticles at a stage where the mycelium has already emerged from the substrate in a condition where the carbon sources are scarce is beneficial to promote the development of the mycelium. At this point, the biomass had already emerged from the scaffold, and the network continued to be developed towards greater height and density of mycelium. The increasing density is closely related to a reinforcement of the network and. therefore, a greater tensile strength in the mycotextile.

As the density of the mycelium is around ten times lower than the density of animal leather ($\cong 0.1$ vs. 1 $g/cm^3$), the incorporation of a denser nanostructure (e.g., the inorganic oxides used herein have densities ranging 2 to 6 $g/cm^3$) will increase the material density and, hence, increase the tensile strength of the prototype. Compared to the ex-situ strategy (e.g., incorporation of the nanoparticles after the harvesting), we observed a slightly higher effect in the tensile strength that could be related to the increase in the thickness of the hyphae.

Figure 34:
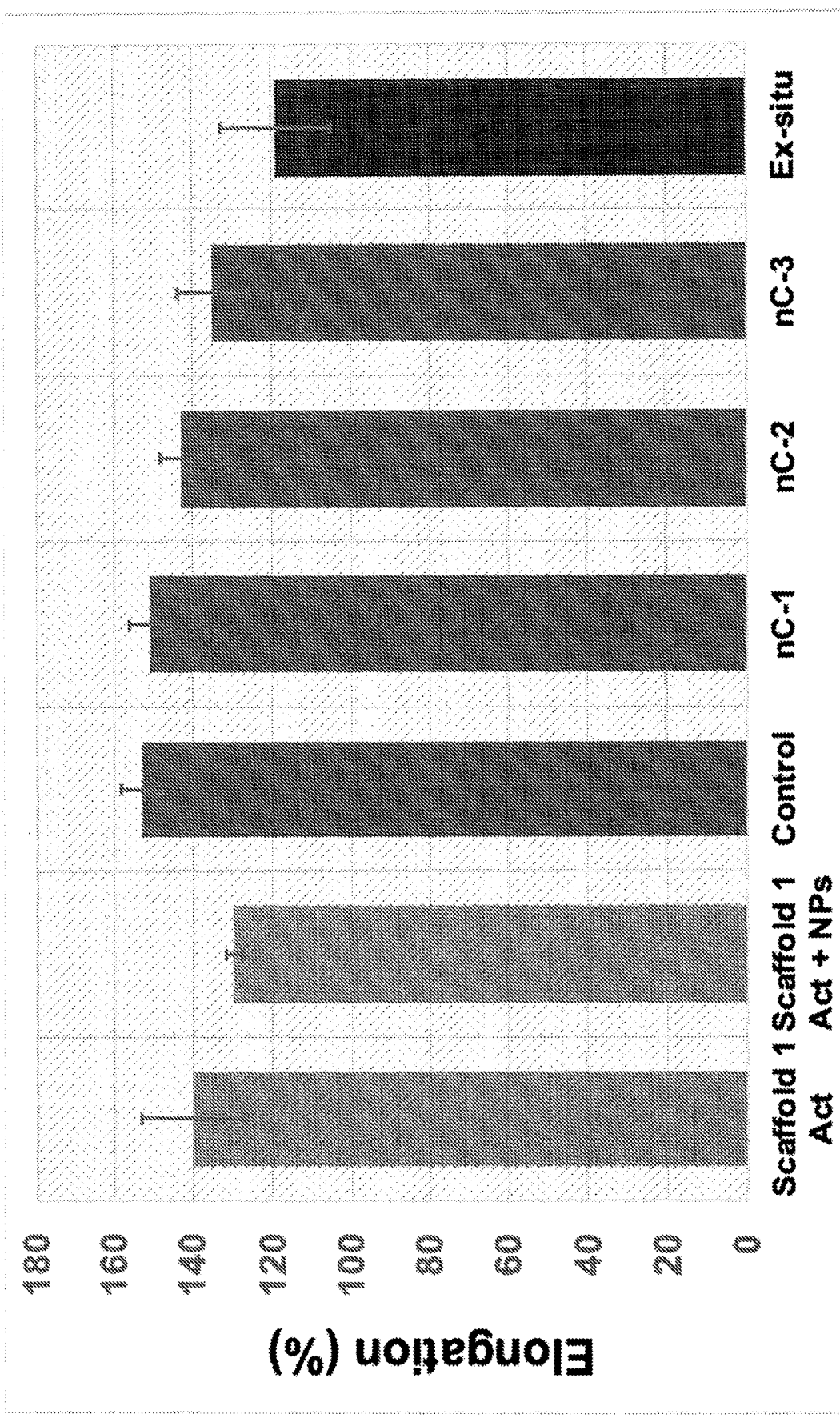
FIG. 34 is a graph of elongation percentage of the prototypes obtained with the different approximations compared with the tensile strength of the scaffolds. Scaffold 1 Act corresponds to the activated scaffold. Scaffold 1 Act+NPs corresponds to the activated scaffold after depositing IO-Zein NPs. The control sample is the crude prototype obtained with an activated scaffold without nanoparticles.

Regarding the effect on the elongation shown in FIG. 34, it was observed that the values range from 135 to 150%, with standard deviations ranging from 5 to 9% for the three applied strategies. Compared to the control sample (153+/−5%), these values are not statistically significant. However, the prototype obtained through the ex-situ approach showed an elongation of 119+/−14%. Considering that this strategy is applied by immersion of the prototype after the harvesting, the nanoparticles in the suspension will also deposit into the scaffold fibers, affecting the mechanical properties (as discussed above). In this case, the effect is reflected in the decrease of the elongation.

There are several differences between ex-situ and in situ strategies that determine the application, and the most relevant are: i) the mycelium-NPs interaction, ii) the control over the deposited material (regarding homogeneity and amount), and iii) the scalability. When the application is made by spray during the aerial mycelium formation, the nanoparticles can gain greater interaction with the biopolymers during their generation. This can somehow guarantee greater interaction. This approach also generates changes in the chemical environment of the nanoparticles due to the formation of higher oxidation states of iron in the crystalline structure. With this, the solid can be more embedded in the mycelium matrix, guaranteeing its adherence to the material.

The application of the NPs dispersion during the fermentation will allow us to control the mechanical properties by controlling the amount of solid deposited. Finally, a dispersion application is more compatible with mushroom farm processes since once the beds are assembled, the nanoparticle dispersion can be applied with both manual and automated dispersers. From an economic point of view, an immersion approach involves larger volumes of work. For example, for the in situ crosslinking strategy, at least 0.93 L of nanoparticle suspension is required for each square foot of the prototype. While spray applications require only 0.015 L per spray in each 1 ft$^2$, the application can be adjusted according to the number of days of incubation to maximize the effect of the nanoparticles throughout the fermentative process. This patent application describes an in situ nano-crosslinking strategy allowing the in situ and in-vivo crosslinking of the hyphae and the whole mycelium.

In Situ Application of Nanoparticles in the Production of Mycotextiles in the Mushroom Farm Facilities:

This method includes several processes described above regarding the use of a selective and nano-biocide scaffold, the induction of both aerial mycelium growth and an in-vivo cross-linking of the hyphae when the fungus is growing, by incorporating nutritional additives as a vehicle for the dispersed nanoparticles (dNPs), such as the BIOrganic CHAI, among others.

The methods and apparatuses (e.g., systems) described herein may include the combination and application of inducers of growth with functionalized nanoparticles to promote both colonization of mycelium within and on a scaffold and, at the same time, the in situ nano-crosslinking of the mycelium when the mycotextile is self-generating-all of these methods are incorporated in the fermentation stage-facilitating the industrial production of mycelium-based textiles in mushroom farms.

Figure 35A:
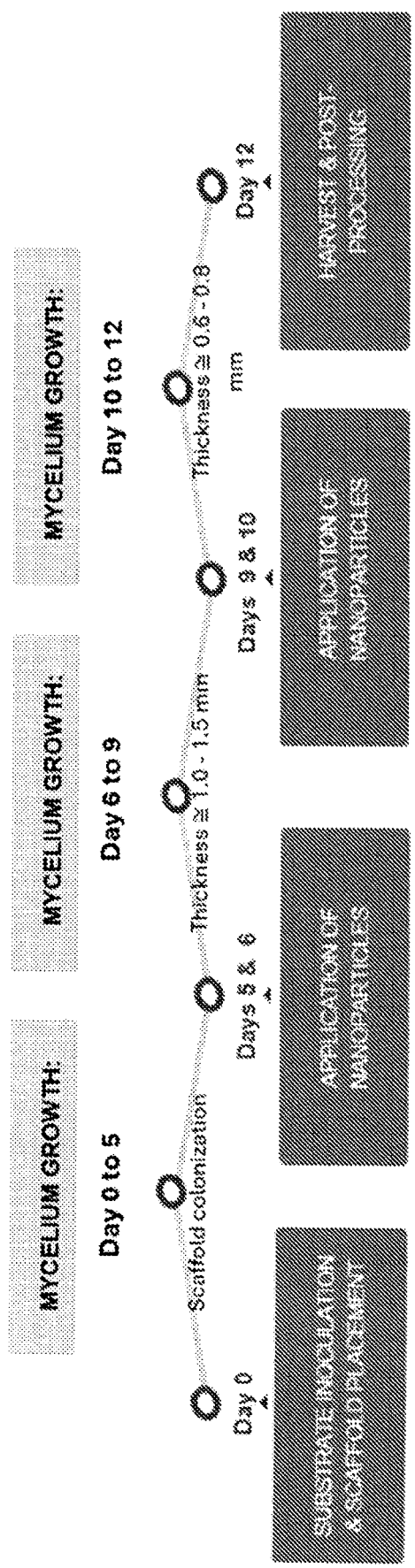
FIG. 35A illustrates a proposed flow scheme for the application of the dNPs in the mycotextiles development using mushroom farm substrates, SCHEME A.
Figure 35B:
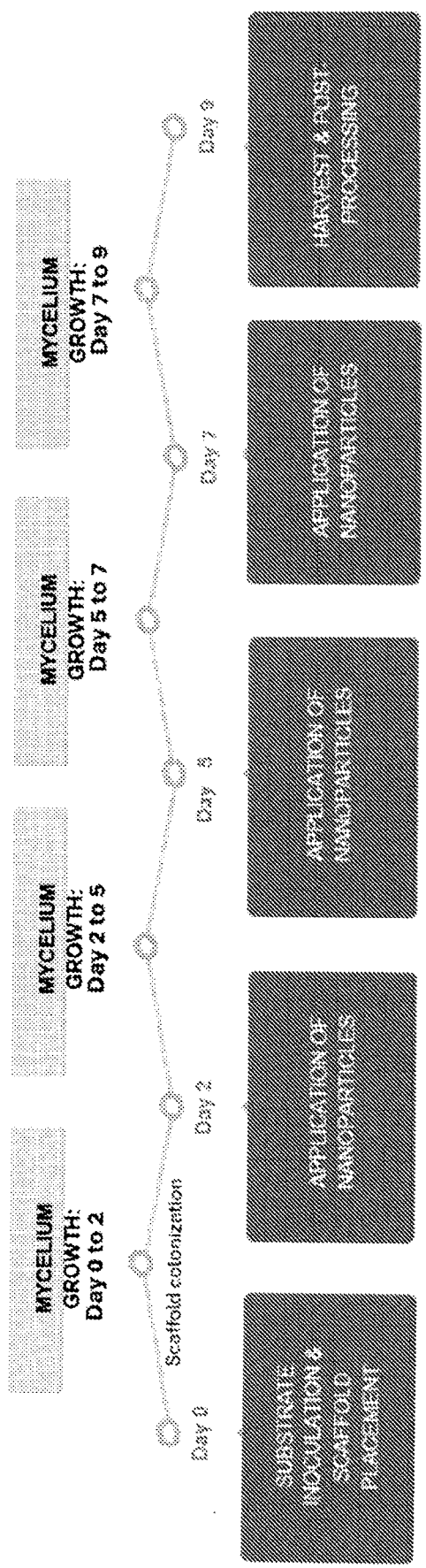
FIG. 35B illustrates a proposed flow scheme for the application of the dNPs in the mycotextiles development using mushroom farm substrates, SCHEME B.
Figure 35C:
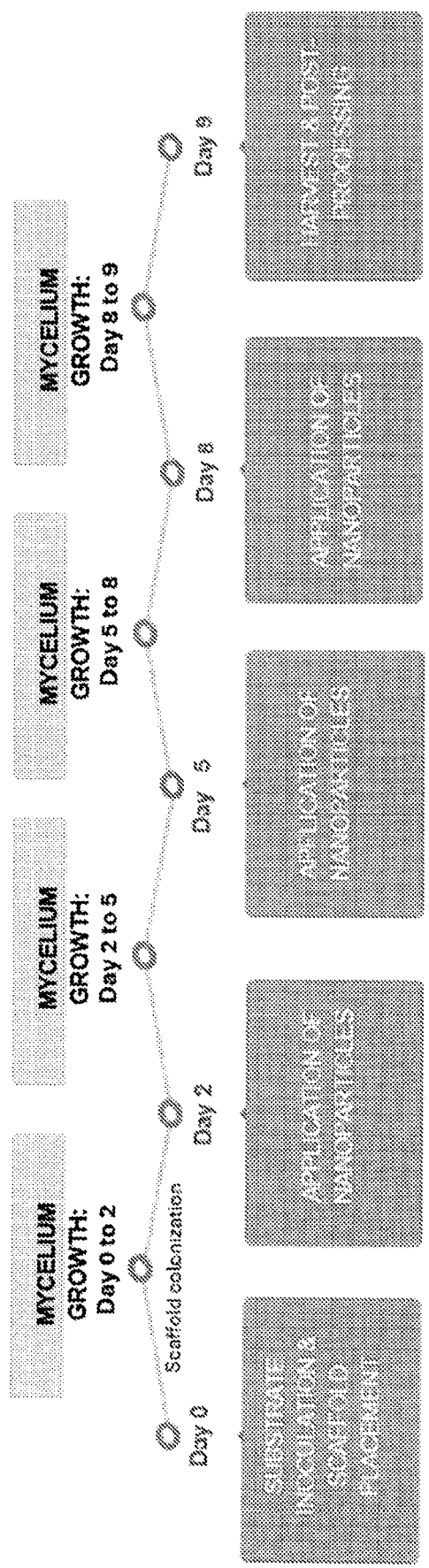
FIG. 35C illustrates a proposed flow scheme for the application of the dNPs in the mycotextiles development using mushroom farm substrates, SCHEME C.

FIG. 35 from A to C outlines different flow processes. In scheme A (FIG. 35A), the shelves' beds were filled with the inoculated substrate as described above, and the selective and nano-biocide scaffold (as described above) was placed on top of the substrate on day 0. Then, the trays were incubated for 5 days to allow the obtention of aerial mycelium and the colonization of the scaffold. On days 5 and 6, the surface of the emerging mycelium was sprayed with the dispersion of the nanoparticles ($\cong$5 mL/ft$^2$). Later, the shelves' beds were incubated under the same conditions for 3 more days; the mycelium growth was around 0.8 mm thick during this period. Again, the nanoparticles were sprayed on the surface of the mycelium on days 9 and 10 following the same procedure. Finally, the shelves' beds were incubated for two more days, and the mycotextile was harvested on day 12 and post-processed. At this date, the mycelium thickness could reach around 1.5 mm. In Scheme B (FIG. 35B), the diagram in FIG. 35B presents the methodology B used to apply the stabilized nanoparticles, as previously described. The shelves' beds were filled with the inoculated substrate and covered with the scaffold (Day 0). The shelves' beds were incubated under appropriate conditions; when the presence of the mycelium was observed on the scaffold (Day 2), the application of the stabilized nanoparticles began. This process was repeated on days 5 and 7, and finally, the mycotextile was harvested on day 9. In Scheme C (FIG. 35C), the main difference in this methodology is the application of the nanoparticles; in this case, dNPs were applied on days 2, 5 and 8 and carried out before harvest. The procedure followed for the post-fermentation is described elsewhere (U.S. Publication No. US 2023/0356501 A1)

Figure 36:
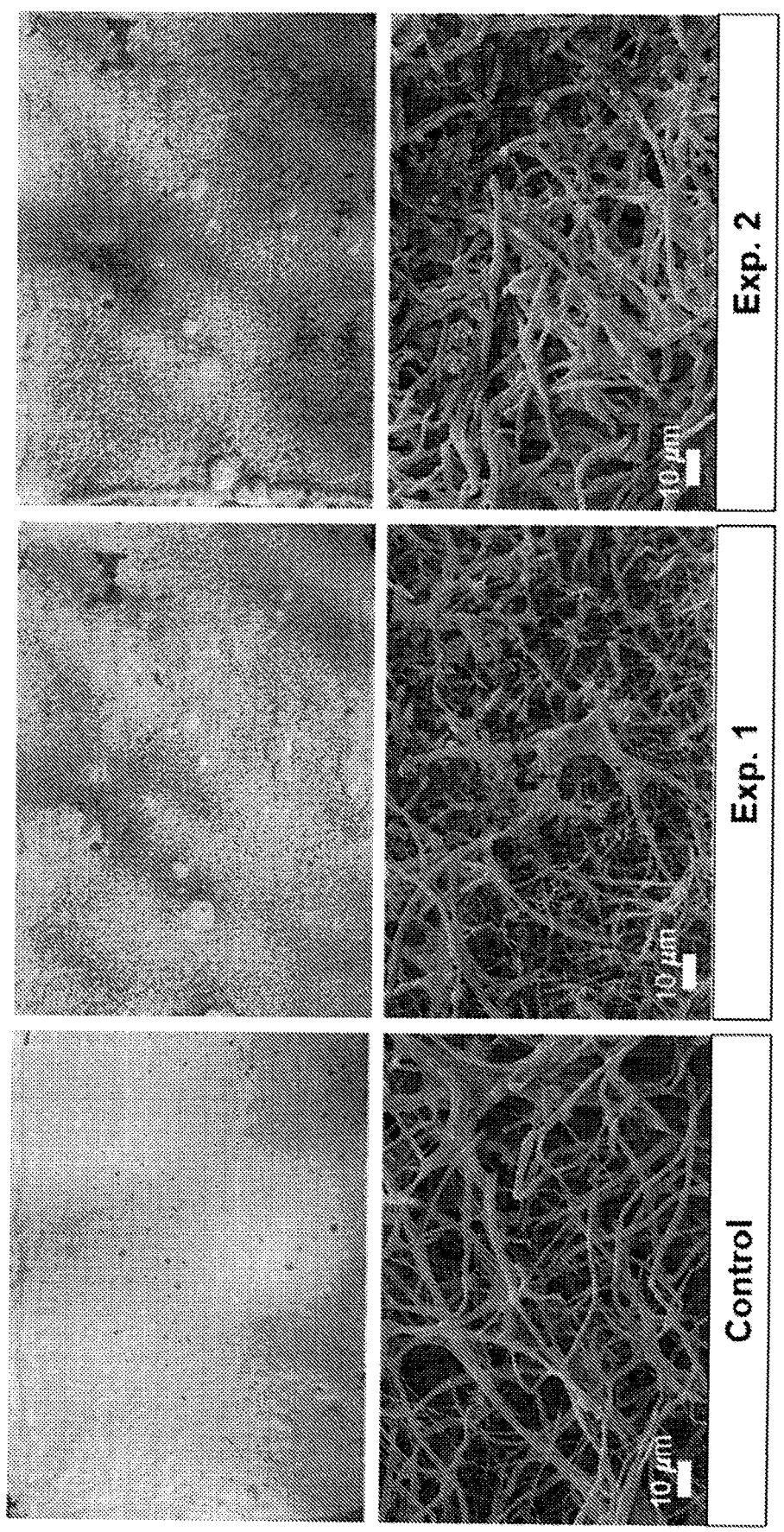
FIG. 36 shows photographs of the obtained prototypes for the experiments using two different NPs concentrations and the scheme A of application (top). Corresponding Scanning Electron Microscopy (SEM) images at a magnification of 2.0 kX (bottom).

Two initial concentrations of the dNPs were tested (Exp. 1=0.61 wt. % and Exp. 2=1.21 wt. %). The dNPs were prepared by weighing the corresponding amount of the nanoparticles (IO-Z) and dispersing the solid in a given volume of the formulations described above. The dispersion is then sterilized. FIG. 36 shows the prototypes obtained under scheme A with the corresponding scanning electron microscopy (SEM) images at a magnification of 2.0 kX. In control, the obtained mycotextile on the day of the harvest shows a white porous surface with mycelium thickness around 1.0 to 1.5 mm. Observing the material's surface through SEM, two main hyphal thicknesses could be distinguished: one of around 0.7+/−0.1 μm and the other thicker hyphae of around 2.4+/−0.8 μm. Longer and thicker hyphae correspond to the skeletal hyphae type, characterized by thick walls, absence of septa, not presenting branches, being straight, and being slightly flexible. In the case of Exp. 1, a yellowish surface is observed, with areas darker than others. This is characteristic of the solid used as a crosslinker with an ocher color. The observation of the SEM technique revealed a more significant proportion of short hyphae compared to the elongated and thicker skeletal hyphae. The shorter hyphae have 1.4+/−0.3 μm thicknesses versus 2.1+/−0.7 μm for the elongated hyphae. Likewise, the nanoparticles seem more aggregated in some network zones and in contact, mainly with the skeletal hyphae. In the photograph of the sample obtained in Exp. 2, the surface is more pigmented, suggesting a better distribution of the nanoparticles. Under this condition, there is a predominance of more elongated hyphae, where their length and thickness increase, probably due to a higher concentration of iron nanoparticles and, thus, a higher iron bioavailability. The mean hyphal thickness in this experiment was 2.4+/−0.5 nm. On the other hand, a better dispersion of the nanoparticles was observed along the wall of the hyphae.

Figure 37:
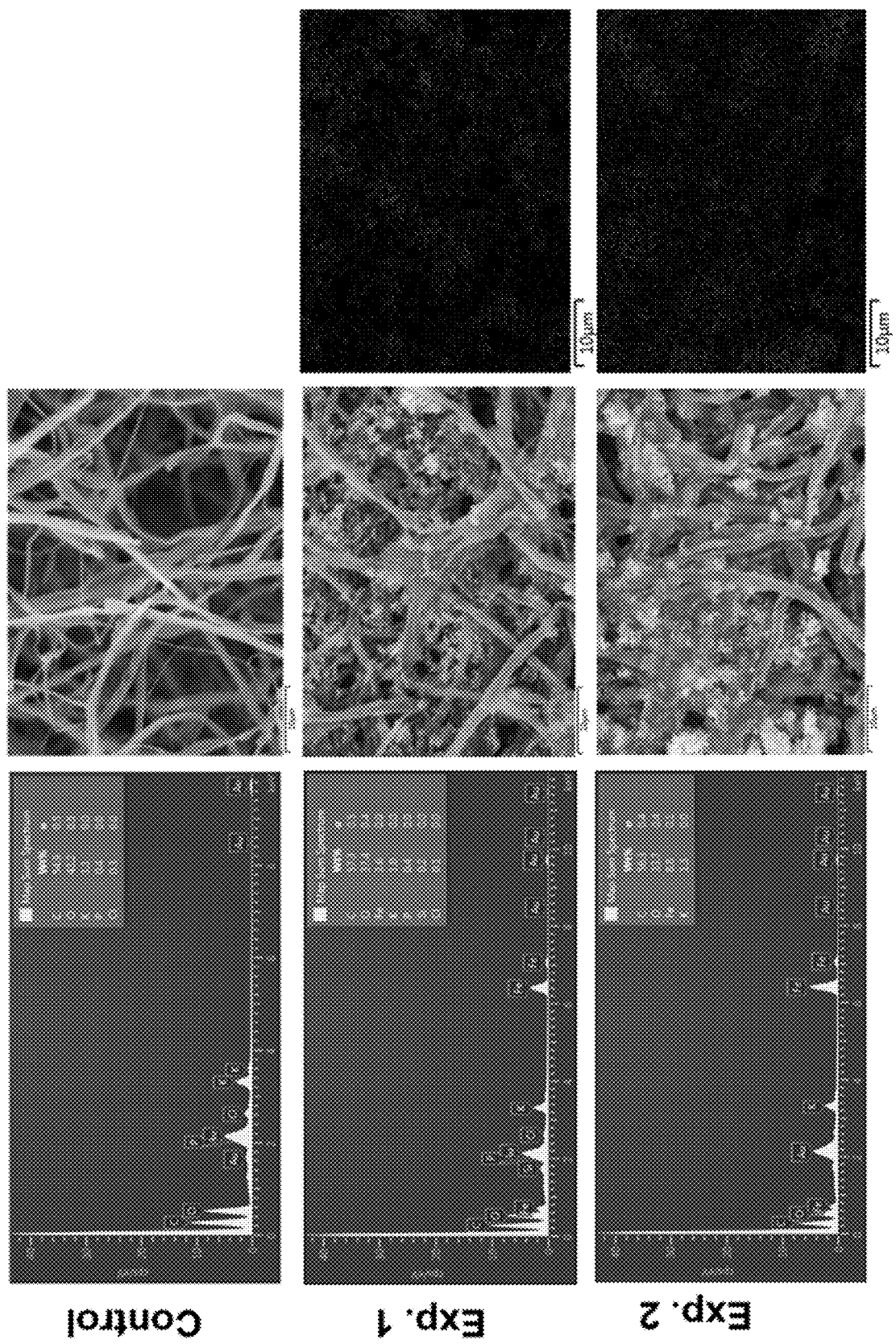
FIG. 37 shows EDS spectra of SCC-0006 grow in the presence of IO-Zein NPs and mushroom farm substrates at laboratory scale. The analyzed areas and the respective iron mapping are shown in the middle and right of the figure, respectively.

FIG. 37 shows the EDS spectrum and the iron mapping in the regions at the center of the image. It is possible to detect an increasing iron content according to the change in the initial concentration of the dispersion. The spectrum of the control sample does not show iron, as expected; the main elements are carbon and oxygen. In the case of the samples for experiments 1 and 2, where dNPs were incorporated into the material, it was possible to observe a great density of particles mixed with the hyphae, deposited in the cell wall and agglomerated. As observed in Table 4, the approximate distribution of the iron according to the analyzed surface increased with the initial iron content, and the maximum estimated value was 0.25 wt. % per mm$^2$.

Table 4 also shows the density of the aerial mycelium, which increased from 0.034 to 0.063 g/cm$^3$ at this concentration because of the incorporation of the nanoparticles in the mycelium layer during the growth. The mycotextile weight remained constant since the significant contribution to this parameter comes from the scaffold. Regarding the mechanical parameters Tensile Strength (TS) and elongation at break (E), it was observed that the control had a TS value of 5.6 MPa, which is slightly higher than the control obtained in the conditioning experiments described above (see FIG. 33) suggesting that by changing the fermentation strategy the mechanical resistance of the mycotextile is affected. In this case, it is probably due to a change in the cell wall's chemical composition instead of the thickness of the hyphae. When incorporating the different concentrations of nanoparticles, the tensile strength increased by 34% and 111% in experiment 1 and experiment 2, respectively. Thus, the increase in the density of the aerial mycelium, as well as the thickness and length of the mycelium, directly affects the mechanical properties of the material. Finally, the elongation at break decreases with the reinforcement.

TABLE 4

Iron content of the harvested mycotextile, the density of the aerial mycelium and mechanical characteristics of the crude prototypes in the non-weft direction (tensile strength (TS), and percentage of maximum elongation (E).

| Sample | Iron content %/mm$^2$ | Aerial mycelium density g/cm$^3$ | Myco-textile weight g/m$^2$ | Tensile strength (TS) MPa | Maximum elongation (E) % |
|---|---|---|---|---|---|
| Control | 0 | 0.034 +/- 0.008 | 344 +/- 68 | 5.6 +/- 0.8 | 97 +/- 3 |
| Exp. 1 | 0.10 | 0.043 +/- 0.008 | 326 +/- 23 | 7.5 +/- 1.9 | 86 +/- 2 |
| Exp. 2 | 0.25 | 0.063 +/- 0.007 | 328 +/- 31 | 11.8 +/- 1.8 | 83 +/- 1 |

Figure 38:
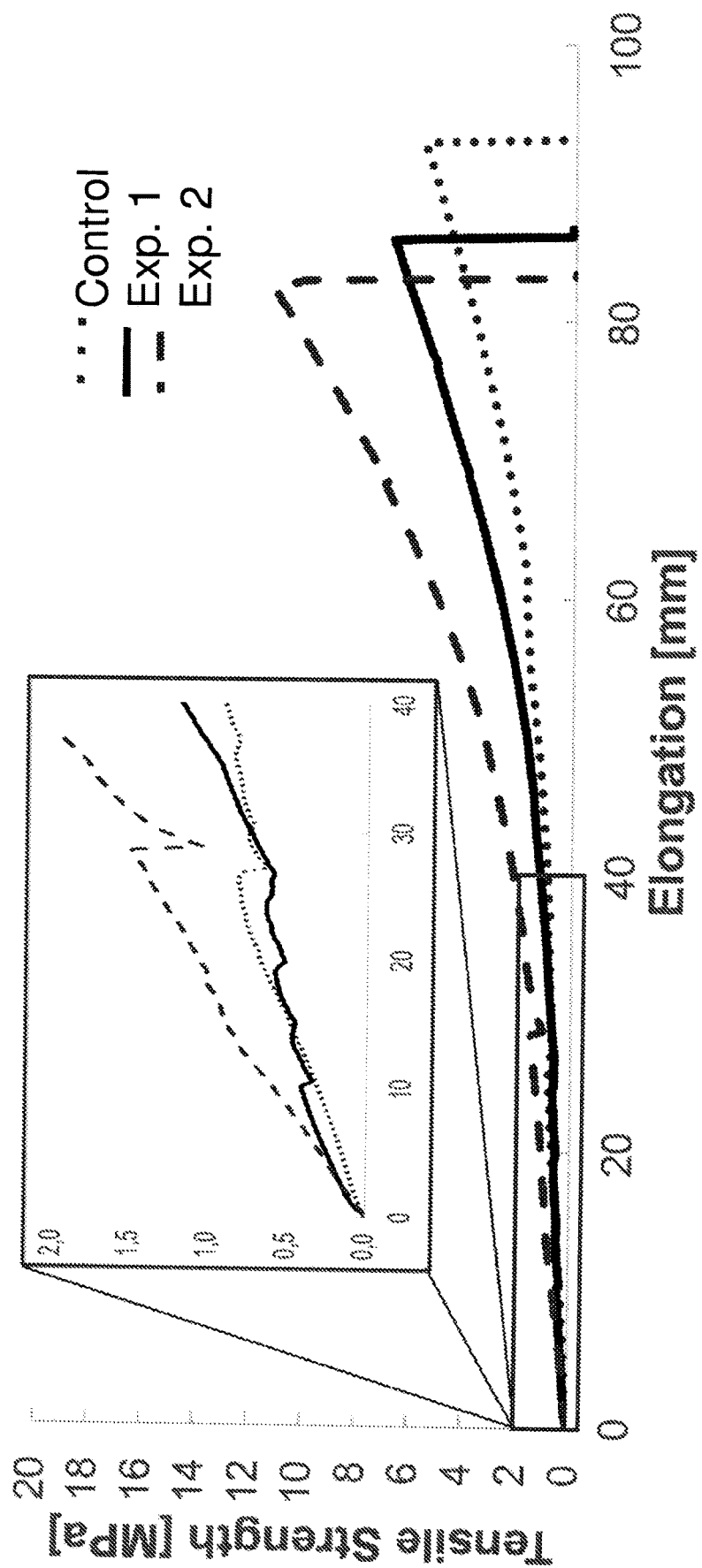
FIG. 38 is a graph showing the tensile strength (MPa) versus elongation (mm) for the experiments using mushroom farm substrates at laboratory scale. Inset the comparison between 0 to 40 mm region.
Figure 39A:
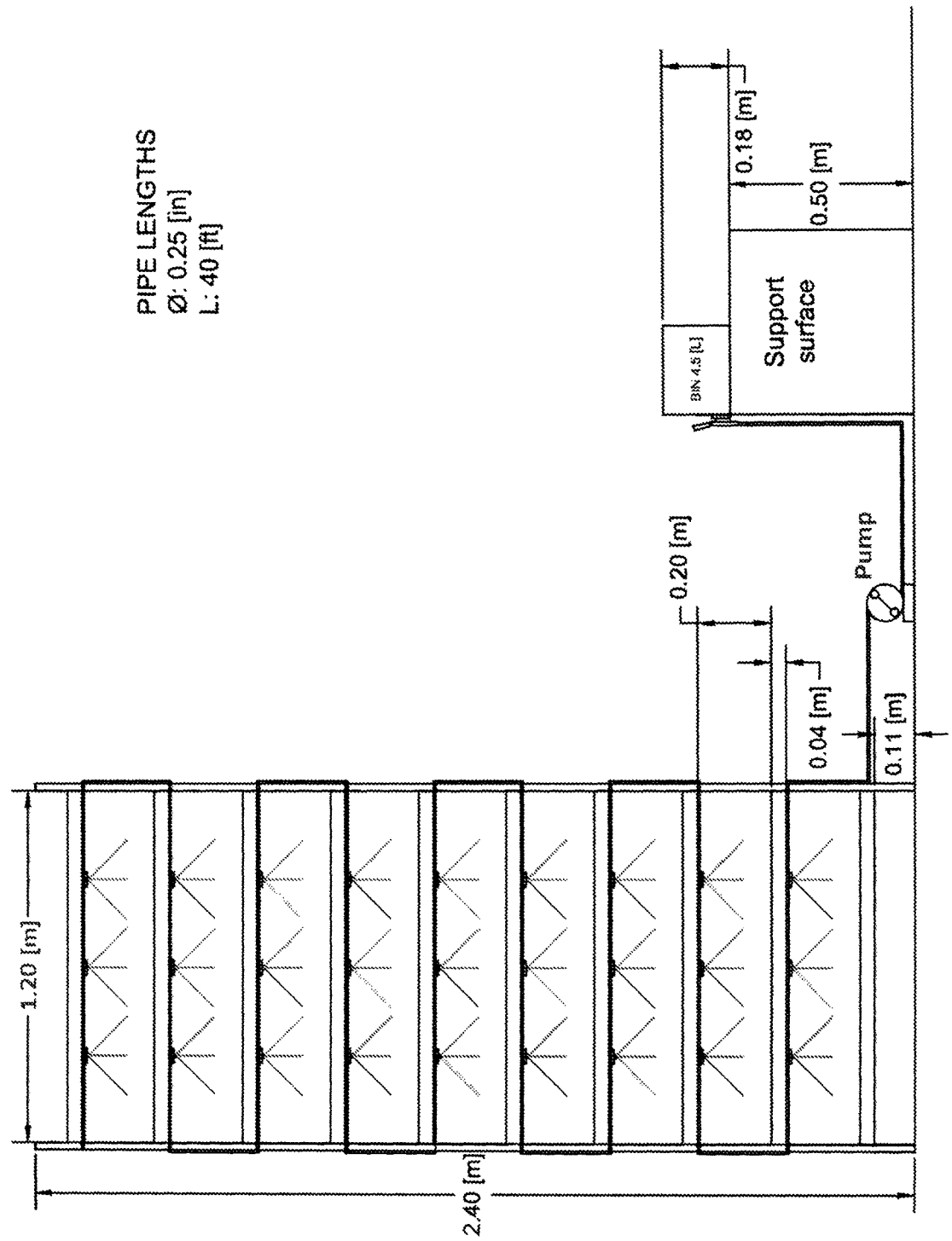
FIG. 39A shows a drawing of a frontal view of an example of an in situ nano-crosslinking irrigation system. Considering the total height is 2.40 m, the number of beds is 9, with a space between them of 26.66 cm; however, this will depend on the number of beds on the shelves.
Figure 39B:
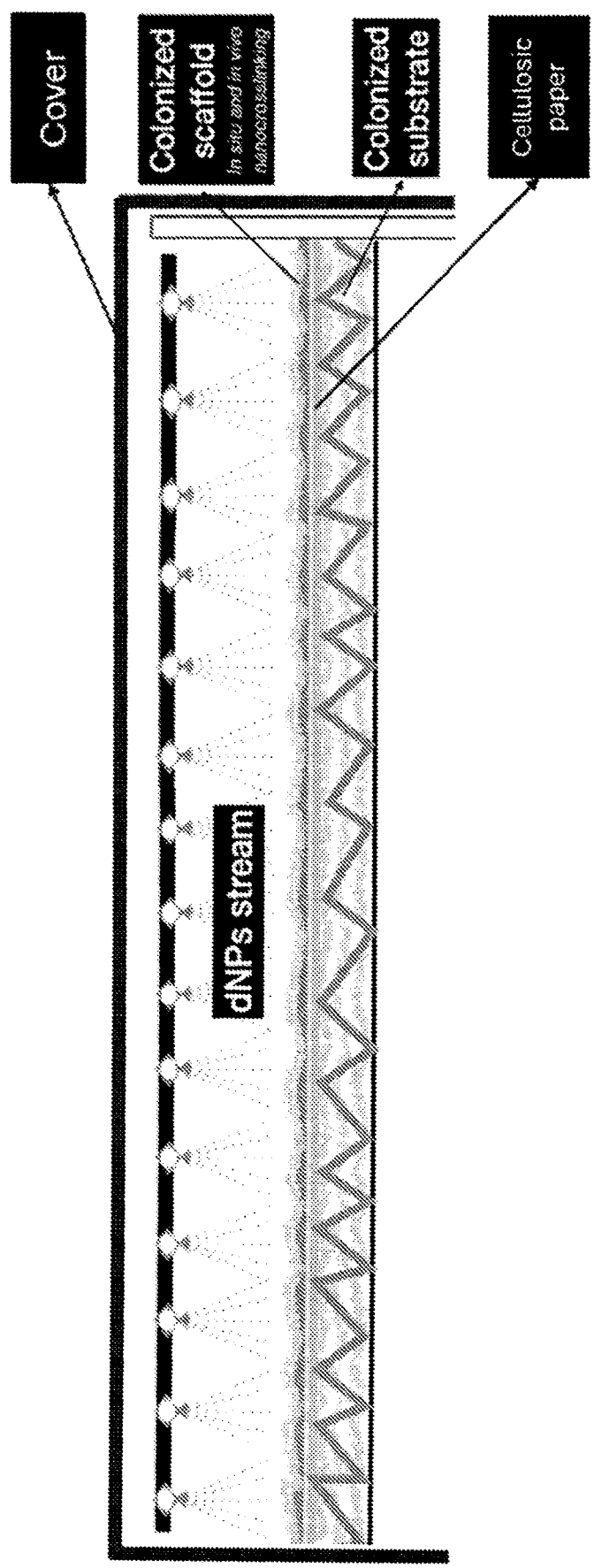
FIG. 39B shows a drawing of a lateral view of an in situ nano-crosslinking irrigation system. Note the structural scheme of the proposed fermentation continuum system including placing the following layers over shelves' beds: (i) a solid-state fermentation substrate > (ii) an eco-friendly cellulosic paper > and (iii) a selective and nanobiocide scaffold, which by be referred to herein as a sandwich-type fermentation process.
Figure 40A:
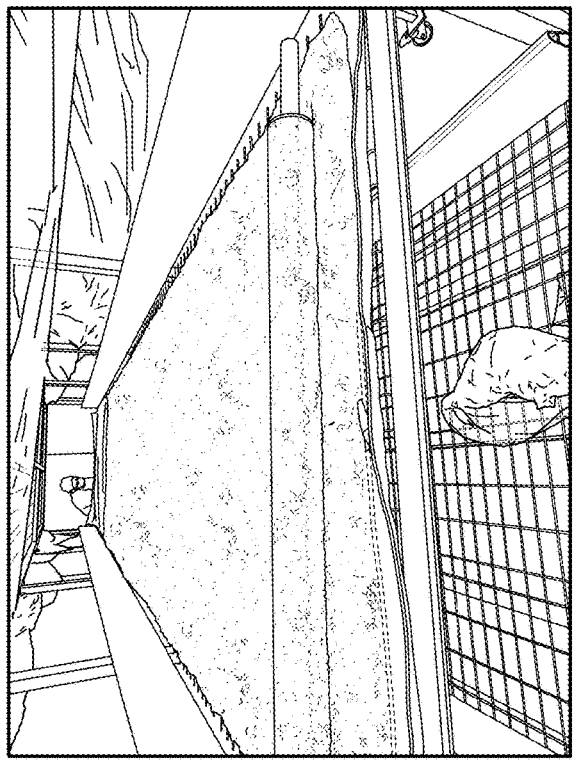
FIGS. 40A-40E show pictures of an example of a shelf in a mushroom farm facility adapted for the "fermentation continuum system".
Figure 40B:
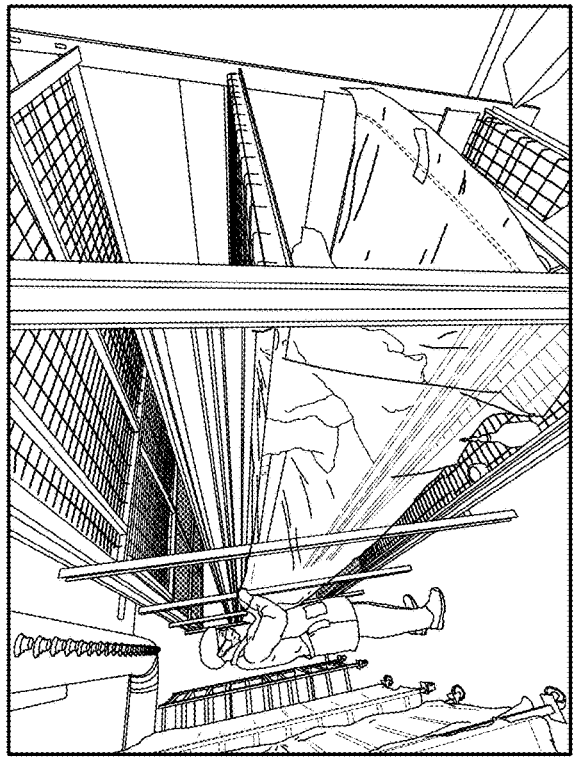
Figure 40C:
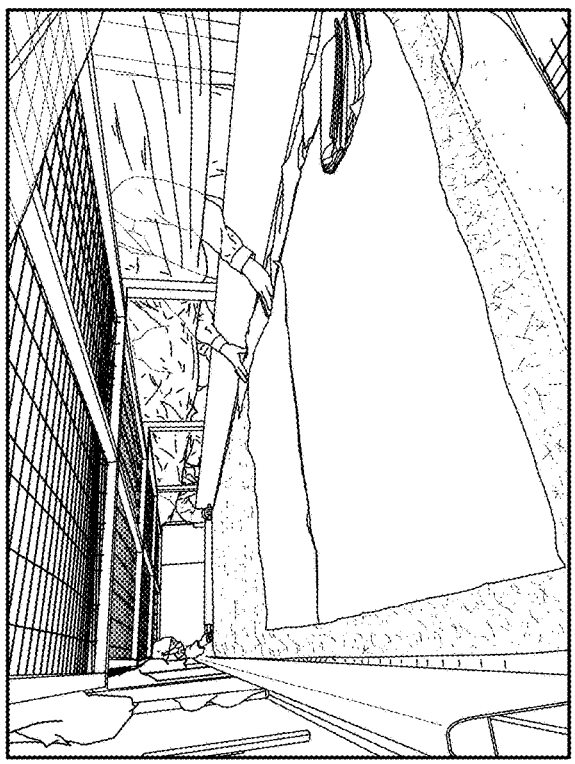
Figure 40D:
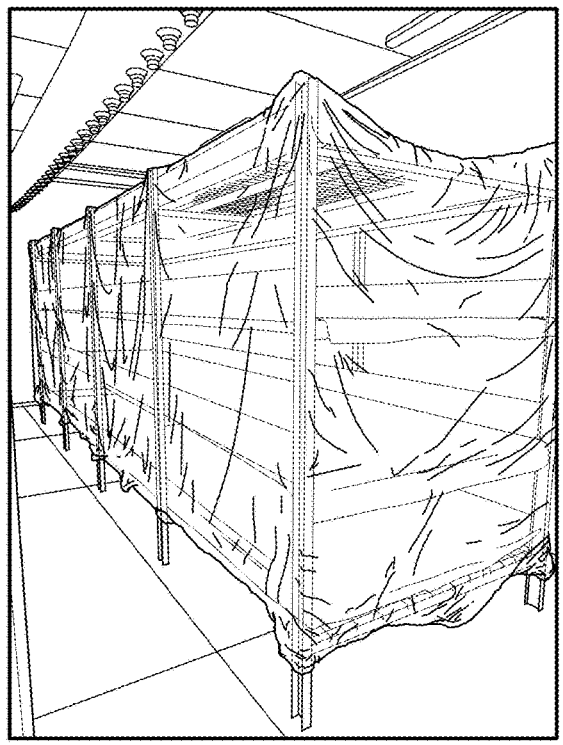
Figure 40E:
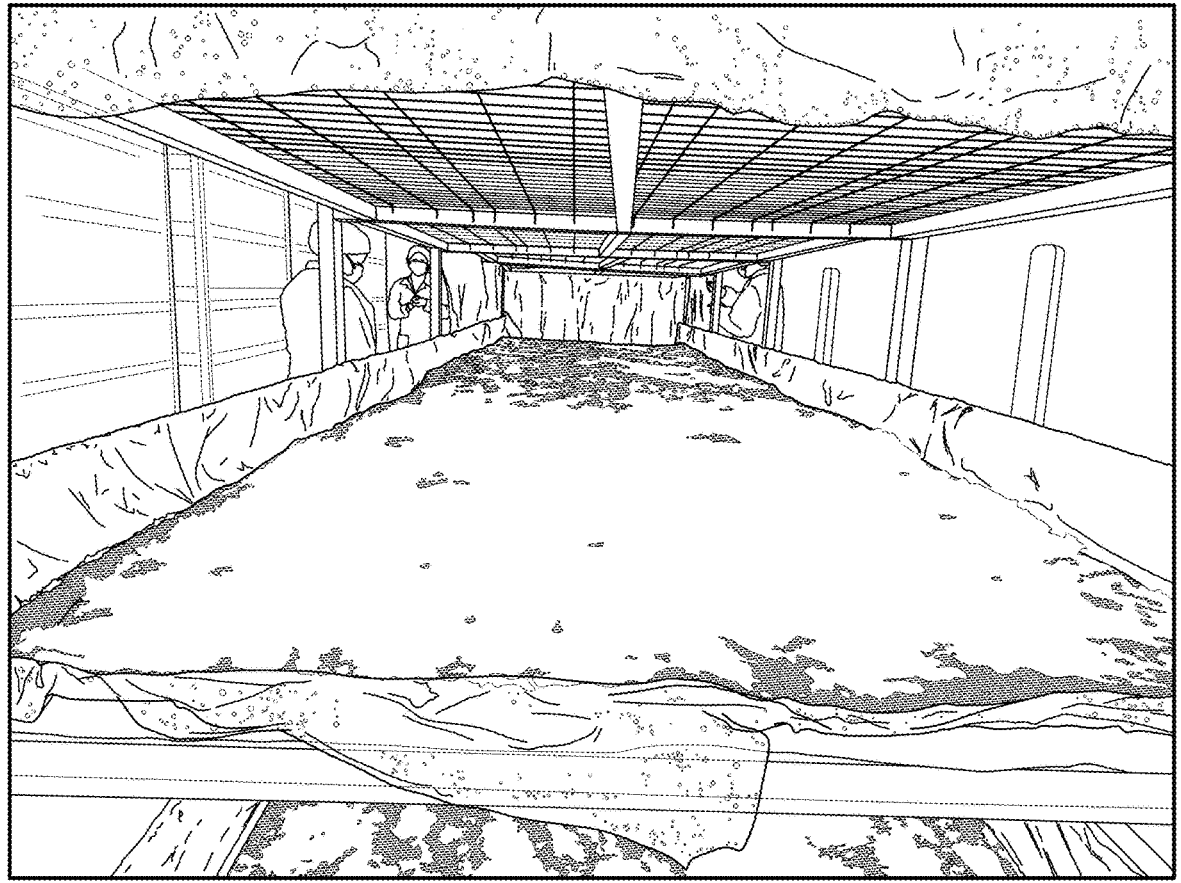

FIG. 38 shows an example of the Stress-Strain curve of each sample. The ultimate tensile strength and the elongation at break are obtained from the section of the curve where the TS value drops to zero. The material is composed of both the scaffold and the mycelium, the scaffold being responsible for the ultimate tensile strength and elongation, while the intertwined mycelium joins the scaffold during the rupture. The analysis of stress-strain curves for this type of composite reveals the behavior of all the layers or different components in the material. As expected, without support, mycelium's TS value lies below 1 MPa at elongations around 10 to 20% (graph as 10 to 20 mm). The inset in FIG. 38 shows the zoom in the elongation range of 0 to 40 mm. The control shows a small break at 26% of elongation, with a tensile strength of 0.8 MPa. In experiment 1, where the iron content is 0.1%/mm$^2$, the slope is slightly higher up to 10% of elongation, and the mycelium layer breaks at 4 smaller steps, with the final break (before the scaffold) at 25% (with a TS of around 0.6 MPa). Finally, the experiments where the iron content increased to 0.25%/mm$^2$ revealed a drastic increase in both elongation at break and tensile strength. In this case, the break occurred at 28% with a TS of 1.4 MPa, evidencing that the reinforcement with the nanoparticles increased the interaction with the scaffold and between the hyphae.

The proposed mycotextiles self-generation in mushroom farm facilities comprise a "continuous fermentation system", considering three different layers: (i) a solid-state fermentation substrate>(ii) an eco-friendly cellulosic paper, and (iii) a selective and nanobiocide scaffold (schematized in FIG. 8). As demonstrated in the previous examples, the application of the dispersion of nanoparticles may occur by spraying to achieve an effect on the morphology and, therefore, mechanical properties. In this regard, the incorporation of the dNPs should be performed by using automated irrigation systems.

The irrigation system in the mushroom industry is essential to maintain optimal humidity conditions. Generally, a sprinkler irrigation system is used to maintain moisture in the air and substrate. Sprinklers are strategically installed on the roof or walls of the greenhouse to spray finely atomized water. An automatic control system could monitor temperature, humidity, oxygen and carbon dioxide levels and activate sprinklers to ensure a constant and adequate humidity level. This is achieved by using specific humidity sensors and a controller that adjusts the frequency and duration of watering. The irrigation system could be with a single pipeline moving along the length of the bed or a longitudinal pipeline distributing several nozzles along the length of the bed. The amount of nanoparticles (Q/g) deposited in the growing mycelium layer will be determined for the concentration of the dispersion (C/gL$^{-1}$), the flow (F/Lmin$^{-1}$) and time (t/min). FIG. 39A shows a frontal view of an in situ nano-crosslinking irrigation system designed for 1.20×15 m beds. The pipeline is distributed along the external side shelf up to the determined height of the shelf. Considering the total height is 2.40 m, the number of beds is 9 with a space between them of 26.66 cm (this will depend on the number of beds on the shelves). Besides the pipeline, a liquid pump to transport the mixtures having the viscosities described above and the different nozzles that will disperse the nanoparticles along the surface of the prototypes are the main components present in this first design.

Therefore, the system is a "continuous fermentation system" where the bed is filled with the inoculated substrate and "sandwich-type elements" are placed at the top of the bed (FIGS. 40A-40E). An automatic irrigation system is placed above the fermentation system to control the irrigation of the dispersed nanoparticles (dNPs), which performs an in situ and in vivo nano crosslinking of the hyphae while the fungus is growing onto the scaffold.

All publications and patent applications mentioned in this specification are herein incorporated by reference in their entirety to the same extent as if each individual publication or patent application was specifically and individually indicated to be incorporated by reference. Furthermore, it should be appreciated that all combinations of the foregoing concepts and additional concepts discussed in greater detail below (provided such concepts are not mutually inconsistent) are contemplated as being part of the inventive subject matter disclosed herein and may be used to achieve the benefits described herein.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like. For example, any of the methods described herein may be performed, at least in part, by an apparatus including one or more processors having a memory storing a non-transitory computer-readable storage medium storing a set of instructions for the processes(s) of the method.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

As described herein, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The processor as described herein can be configured to perform one or more steps of any method disclosed herein. Alternatively or in combination, the processor can be configured to combine one or more steps of one or more methods as disclosed herein.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under", or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

In general, any of the apparatuses and methods described herein should be understood to be inclusive, but all or a sub-set of the components and/or steps may alternatively be exclusive and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of forming a mycotextile at an industrial scale in a non-innocuous environment, the method comprising:
    generating a solid-state fermentation substrate (SSFS) seeded with a selected fungal strain;
    placing the solid-state fermentation substrate on a shelf;
    placing a nutritionally-enriched and nanobiocidal scaffold onto the SSFS;
    growing the selected fungal strain into the scaffold to form a mycelium mat;
    adding functionalized nanoparticles on the growing mycelium mat, wherein the selected fungal strain is selected to grow with the functionalized nanoparticles and wherein the nanoparticles are functionalized with a plant protein;
    placing a cover over the growing mycelium mat;
    harvesting the mycelium mat; and
    processing the mycelium mat to form the mycotextile;
    wherein the plant protein used for functionalization of the nanoparticles is zein.

2. The method of claim 1, wherein adding functionalized nanoparticles comprises adding additives containing growth inducers and functionalized nanoparticles on the growing mycelium mat, and wherein the additive enables both the increase of fungal growth and the in situ nano-crosslinking.

3. The method of claim 1, wherein placing a cover over the growing mycelium mat comprises placing the cover around the shelf.

4. The method of claim 1, wherein harvesting the mycelium mat comprises harvesting an elongated length of mycelium mat using an automated system.

5. The method of claim 1, wherein the selected fungal strain is an SCC-0006 fungal strain.

6. The method of claim 1, wherein the solid-state fermentation substrate comprises a lignocellulosic material.

7. The method of claim 6, wherein the lignocellulosic material comprises one or more organic amendments and/or additives as a mycelium growth inducer.

8. The method of claim 1, further comprising placing a sheet of cellulosic paper over the substrate.

9. The method of claim 8, wherein the sheet of cellulosic paper is between 0.1 to 1 mm thick.

10. The method of claim 1, wherein the nanobiocide scaffold layer contains growth inducers and biocide nanoparticles to induce, respectively, mycelial colonization and a homogeneity of the mycelial colonization onto the scaffold and to mitigate environmental contamination in the fermentation processes.

11. The method of claim 1, wherein adding the functionalized nanoparticles onto the growing mycelium mat comprises promoting in situ and in vivo nano-crosslinking by spraying a stabilized nanoparticle dispersion onto the growing mycelium mat.

12. The method of claim 1, wherein the functionalized nanoparticles comprise functionalized iron oxide nanoparticles.

13. The method of claim 11, wherein the stabilized nanoparticle dispersion includes a dispersing agent, a thickener and a liquid phase.

14. The method of claim 11, wherein the stabilized nanoparticle dispersion is automatically sprayed onto the growing mycelium mat during the fermentation process at a determined frequency, volume, flux and concentration.

15. The method of claim 11, wherein spraying the stabilized nanoparticle dispersion further comprises inducing a twofold increase in mycelium density and mechanical strength by improving the interconnection of the hyphae network.

16. The method of claim 3, wherein placing the cover comprises placing the cover vertically around the shelf to control humidity levels and the oxygen and carbon dioxide concentrations inside the shelf.

17. The method of claim 3, wherein the cover has between 0 to 40 microns of thickness and within 0 to 200 microperforations per square foot.

18. The method of claim 11, wherein processing the harvested mycelium mat comprises one or more of: applying an internal wetting composition to the mycelium mat; dyeing the mycelium mat; applying an external barrier composition to the mycelium mat; and applying pressure to add determined patterns.

19. A method of forming a mycotextile at an industrial scale in a non-innocuous environment, the method comprising:

- generating a solid-state fermentation substrate (SSFS) seeded with a selected fungal strain;
- placing the solid-state fermentation substrate on a shelf;
- placing a nutritionally-enriched and nanobiocidal scaffold onto the SSFS;
- growing the selected fungal strain into the scaffold to form a mycelium mat;
- adding one or more additives containing growth inducers and functionalized nanoparticles on the growing mycelium mat, wherein the nanoparticles are functionalized with a plant protein and wherein the selected fungal strain is selected for increased fungal growth and in situ nano-crosslinking in the presence of the functionalized nanoparticles;
- placing a cover over the growing mycelium mat;
- harvesting the mycelium mat; and
- processing the mycelium mat to form the mycotextile;
- wherein the plant protein used for functionalization of the nanoparticles is zein.

20. A method of forming a mycotextile at an industrial scale in a non-innocuous environment, the method comprising:

- generating a solid-state fermentation substrate (SSFS) seeded with a selected fungal strain;
- placing the solid-state fermentation substrate on a bed on each of a plurality of shelves;
- placing a nutritionally-enriched and nanobiocidal scaffold onto the SSFS;
- growing the selected fungal strain into the scaffold to form a mycelium mat on each bed of the plurality of shelves;
- adding one or more additives as growth inducers containing functionalized nanoparticles on the growing mycelium mat to enable both the increase of fungal growth and in situ nano-crosslinking, wherein the nanoparticles are functionalized with a plant protein and wherein the selected fungal strain is selected to grow with the functionalized nanoparticles;
- placing one or more covers over the plurality of shelves;
- harvesting the mycelium mat as elongated strips from each bed of the one or more shelves; and
- processing the mycelium mat to form the mycotextile;
- wherein the plant protein used for functionalization of the nanoparticles is zein.

* * * * *